United States Patent
Berkely et al.

(10) Patent No.: US 11,013,585 B2
(45) Date of Patent: May 25, 2021

(54) DENTAL SYRINGE TIP DEVICES, SYSTEMS AND METHODS

(71) Applicant: Donovan Winston Berkely, Irvine, CA (US)

(72) Inventors: Donovan Winston Berkely, Irvine, CA (US); Bryan M. Wasylucha, Irvine, CA (US)

(73) Assignee: Donovan Winston Berkely, Irvine, CA (US)

( * ) Notice: Subject to any disclaimer, the term of this patent is extended or adjusted under 35 U.S.C. 154(b) by 201 days.

(21) Appl. No.: 14/459,130

(22) Filed: Aug. 13, 2014

(65) Prior Publication Data
US 2015/0050613 A1     Feb. 19, 2015

Related U.S. Application Data

(60) Provisional application No. 61/914,285, filed on Dec. 10, 2013, provisional application No. 61/895,901, (Continued)

(51) Int. Cl.
*A61C 17/02* (2006.01)
*A61C 1/08* (2006.01)
*A61C 17/022* (2006.01)

(52) U.S. Cl.
CPC .......... *A61C 17/0202* (2013.01); *A61C 1/088* (2013.01); *A61C 17/02* (2013.01); *A61C 17/022* (2013.01); *A61C 17/0217* (2013.01)

(58) Field of Classification Search
CPC . A61C 17/0202; A61C 17/022; A61C 1/0061; A61C 3/025; A61C 17/02; A61C 17/16; A61C 17/0217
See application file for complete search history.

(56) References Cited

U.S. PATENT DOCUMENTS

| 1,858,056 A | 5/1932 | Pieper |
| 2,094,888 A | 10/1937 | Hooper |

(Continued)

FOREIGN PATENT DOCUMENTS

| FR | 2 639 534 A1 | 6/1990 |
| WO | WO 00/35370 | 6/2000 |

(Continued)

OTHER PUBLICATIONS

Invitation to Pay Additional Search Fees in co-pending International Application No. PCT/US2014/050966, dated Oct. 31, 2014 in 6 pages.

(Continued)

*Primary Examiner* — Jan Christopher L Merene
(74) *Attorney, Agent, or Firm* — Knobbe, Martens, Olson & Bear, LLP

(57) ABSTRACT

A dental syringe tip system for attachment to a dental syringe. The dental syringe tip system can include components such as an outer core, an inner core, and a carrier which can be combined in a multitude of combinations to achieve different fluid flow characteristics, such as discharge pressure and discharge pattern, through the dental syringe tip. The outer core and inner core can have passages designed to modify fluid flow characteristics. In addition, the outer core and inner core can have additional connectors for receiving fluids from sources other than a dental syringe. Some or all of the components can be separate to be assembled by a manufacturer or an end-user. Assembly of multiple components can be facilitated by retention features located on the components.

14 Claims, 46 Drawing Sheets

Related U.S. Application Data filed on Oct. 25, 2013, provisional application No. 61/866,444, filed on Aug. 15, 2013.

(56) References Cited

U.S. PATENT DOCUMENTS

| | | | |
|---|---|---|---|
| 3,121,426 A * | 2/1964 | Yoshida | A61C 17/0217 128/200.19 |
| 3,254,646 A | 6/1966 | Martin et al. | |
| 3,375,823 A | 4/1968 | Pamplin | |
| 3,424,156 A | 1/1969 | Smith | |
| 3,698,088 A | 10/1972 | Austin, Jr. | |
| 3,874,083 A | 4/1975 | Buckley | |
| 4,026,025 A | 5/1977 | Hunt | |
| 4,248,589 A | 2/1981 | Lewis | |
| 4,515,564 A | 5/1985 | Lohn | |
| 4,522,597 A * | 6/1985 | Gallant | A61C 3/025 433/216 |
| 4,592,728 A | 6/1986 | Davis | |
| 4,810,194 A | 3/1989 | Snedden | |
| 4,907,744 A * | 3/1990 | Jousson | A61C 17/0202 137/625.44 |
| 4,975,058 A * | 12/1990 | Woodward | A61B 1/24 433/126 |
| D316,600 S | 4/1991 | Austin, Jr. et al. | |
| 5,045,055 A | 9/1991 | Gonser et al. | |
| 5,049,071 A | 9/1991 | Davis et al. | |
| 5,067,899 A | 11/1991 | Paschal | |
| 5,100,319 A * | 3/1992 | Baum | A61C 17/0202 433/80 |
| 5,192,206 A | 3/1993 | Davis et al. | |
| 5,204,004 A | 4/1993 | Johnston et al. | |
| 5,230,624 A | 7/1993 | Wolf et al. | |
| 5,234,338 A | 8/1993 | Young | |
| 5,236,356 A | 8/1993 | Davis et al. | |
| 5,242,300 A | 9/1993 | Esrock | |
| 5,254,103 A | 10/1993 | Heuillon | |
| 5,286,065 A | 2/1994 | Austin et al. | |
| 5,306,146 A | 4/1994 | Davis et al. | |
| 5,322,440 A | 6/1994 | Steele | |
| 5,336,202 A | 8/1994 | Bailly et al. | |
| 5,342,195 A | 8/1994 | Davis et al. | |
| D352,354 S | 11/1994 | Davis et al. | |
| 5,376,003 A | 12/1994 | Rizkalla | |
| 5,391,145 A * | 2/1995 | Dorsey, III | A61M 1/0064 137/596.2 |
| 5,460,619 A | 10/1995 | Esrock | |
| 5,468,148 A | 11/1995 | Ricks | |
| 5,489,205 A | 2/1996 | Davis et al. | |
| 5,554,025 A | 9/1996 | Kinsel | |
| 5,591,389 A | 1/1997 | Esrock | |
| 5,616,028 A | 4/1997 | Hafele et al. | |
| 5,658,144 A | 8/1997 | Tinder et al. | |
| 5,772,433 A | 6/1998 | Esrock | |
| 5,833,456 A | 11/1998 | Davis et al. | |
| 5,848,893 A | 12/1998 | Martin et al. | |
| 5,882,194 A | 3/1999 | Davis et al. | |
| 5,882,197 A | 3/1999 | Davis et al. | |
| D409,305 S | 5/1999 | Martin et al. | |
| 5,899,692 A | 5/1999 | Davis et al. | |
| 5,908,296 A | 6/1999 | Kipke et al. | |
| 5,927,975 A | 7/1999 | Esrock | |
| 5,961,326 A | 10/1999 | Johnston et al. | |
| 6,048,200 A | 4/2000 | Martin et al. | |
| 6,079,979 A | 6/2000 | Rlitano | |
| 6,093,020 A | 7/2000 | Pond et al. | |
| 6,113,391 A | 9/2000 | Esrock | |
| 6,149,429 A | 11/2000 | Bukowski | |
| 6,159,007 A | 12/2000 | Sorensen | |
| 6,238,211 B1 | 5/2001 | Esrock | |
| 6,250,921 B1 | 6/2001 | Esrock | |
| RE37,324 E | 8/2001 | Esrock | |
| 6,283,750 B1 | 9/2001 | Esrock | |
| 6,319,001 B1 | 11/2001 | Esrock | |
| 6,322,361 B1 | 11/2001 | Esrock | |
| 6,382,970 B1 | 5/2002 | Foster | |
| 6,390,815 B1 | 5/2002 | Pond | |
| 6,419,485 B1 | 7/2002 | Pond | |
| 6,464,498 B1 | 10/2002 | Pond | |
| 6,500,000 B1 | 12/2002 | Segal | |
| 6,533,578 B2 | 3/2003 | Segal | |
| 6,824,385 B1 | 11/2004 | Bain et al. | |
| 7,025,755 B2 * | 4/2006 | Epstein | A61B 17/00491 137/625.4 |
| 7,431,587 B2 | 10/2008 | Pond | |
| 7,993,135 B2 | 8/2011 | Nesbitt et al. | |
| 8,662,470 B2 | 3/2014 | Klecker et al. | |
| 8,926,502 B2 | 1/2015 | Levy et al. | |
| 9,993,142 B2 | 6/2018 | Salman et al. | |
| D832,443 S | 10/2018 | Berkely | |
| D832,444 S | 10/2018 | Berkely | |
| D841,817 S | 2/2019 | Berkely | |
| D842,480 S | 3/2019 | Berkely | |
| D875,257 S | 2/2020 | Berkely | |
| D875,258 S | 2/2020 | Berkely | |
| D894,401 S | 8/2020 | Berkely | |
| D895,807 S | 9/2020 | Berkely | |
| 2001/0041321 A1 | 11/2001 | Segal | |
| 2004/0224281 A1 | 11/2004 | Bain et al. | |
| 2005/0032017 A1 | 2/2005 | Levy | |
| 2005/0089816 A1 * | 4/2005 | Krisch | A61C 3/025 433/88 |
| 2006/0024640 A1 | 2/2006 | Pond et al. | |
| 2006/0063976 A1 | 3/2006 | Alzenfeld et al. | |
| 2006/0234185 A1 | 10/2006 | Ziemba | |
| 2007/0106119 A1 | 5/2007 | Hirata et al. | |
| 2008/0002402 A1 | 1/2008 | Mandikos | |
| 2009/0202961 A1 | 8/2009 | Fani et al. | |
| 2009/0208899 A1 | 8/2009 | Pond et al. | |
| 2010/0273123 A1 | 10/2010 | Mecher | |
| 2010/0286659 A1 | 11/2010 | Terrill et al. | |
| 2010/0298640 A1 | 11/2010 | Oneda et al. | |
| 2011/0143304 A1 | 6/2011 | Jamnia et al. | |
| 2011/0275026 A1 | 11/2011 | Smith | |
| 2012/0253121 A1 | 10/2012 | Kitano | |
| 2013/0109916 A1 | 5/2013 | Levy | |
| 2013/0172670 A1 | 7/2013 | Levy et al. | |
| 2013/0260333 A1 | 10/2013 | Berkely | |
| 2013/0316299 A1 | 11/2013 | Berkely | |
| 2014/0329198 A1 | 11/2014 | Esrock | |
| 2015/0024335 A1 | 1/2015 | Sabourin | |
| 2015/0209124 A1 | 7/2015 | Berkely | |
| 2018/0214245 A1 | 8/2018 | Medin | |
| 2019/0105140 A1 | 4/2019 | Berkely | |

FOREIGN PATENT DOCUMENTS

| | | |
|---|---|---|
| WO | WO 2000/33762 | 6/2000 |
| WO | WO 2013/151961 | 10/2013 |
| WO | WO 2015/023799 | 2/2015 |

OTHER PUBLICATIONS

U.S. Appl. No. 13/841,280, 2013/0316299, Air/Water Dental Syringe Tip Adapter Systems and Conversion Methods, filed Mar. 15, 2013.
U.S. Appl. No. 13/907,296, 2013/0260333, Seamless Air/Water Dental Syringe Tip Adapter Systems and Conversion Methods, filed May 31, 2013.
International Search Report and Written Opinion in International Application No. PCT/US2014/050966, dated Aug. 24, 2015 in 16 pages.
Official Communication in EP Application No. 14758044.3 dated Mar. 9, 2018 in 5 pages.
Luzzani Dental, Mini Mate, dated at least Feb. 25, 2016, in 1 page.
Luzzani Dental, Mini Light, dated at least Feb. 25, 2016, in 1 page.
Summons to attend oral proceedings pursuant to Rule 115(1) EPC dated Jun. 4, 2020 in European Application No. 14 758 044.3 in 8 pages.

(56) References Cited

OTHER PUBLICATIONS

Communication pursuant to Article 94(3) EPC dated Dec. 10, 2020 in European Application No. 14 758 044.3 in 5 pages.

* cited by examiner

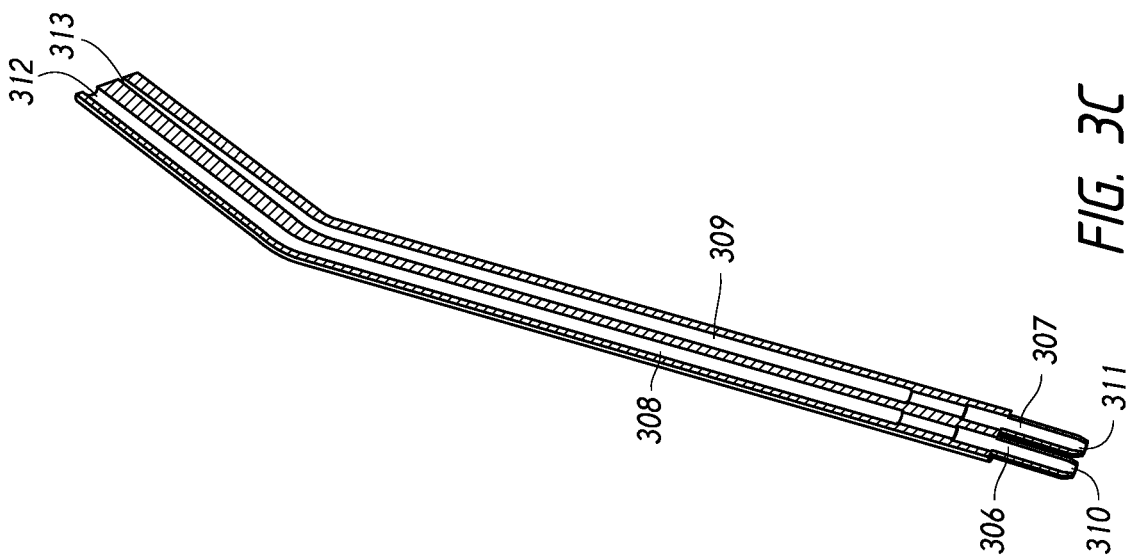
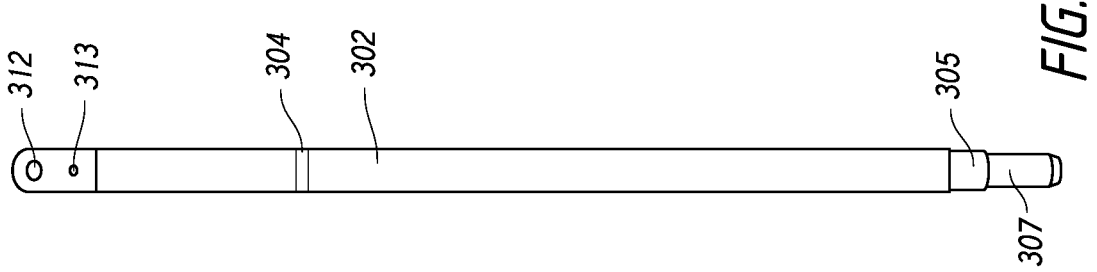
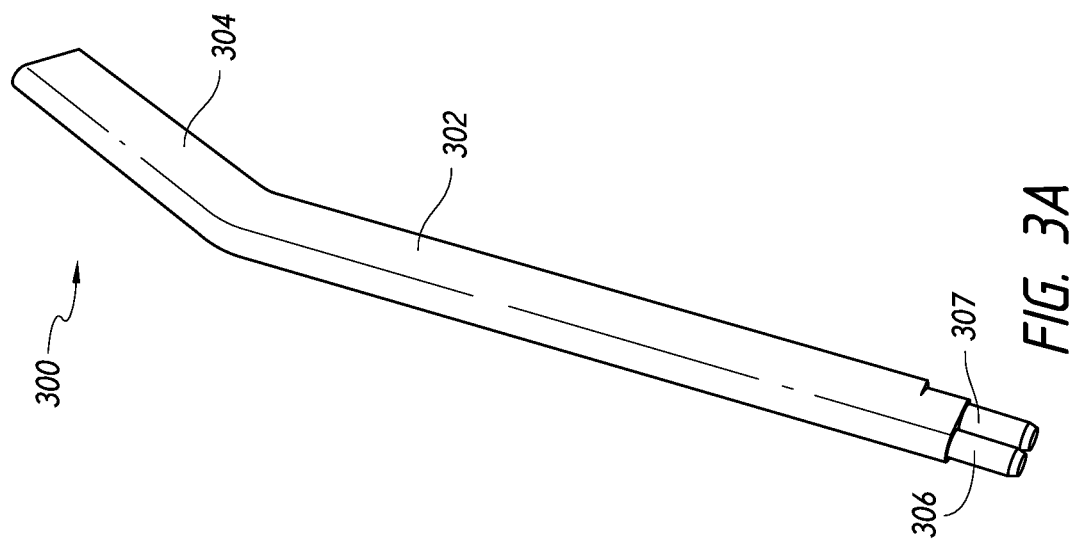

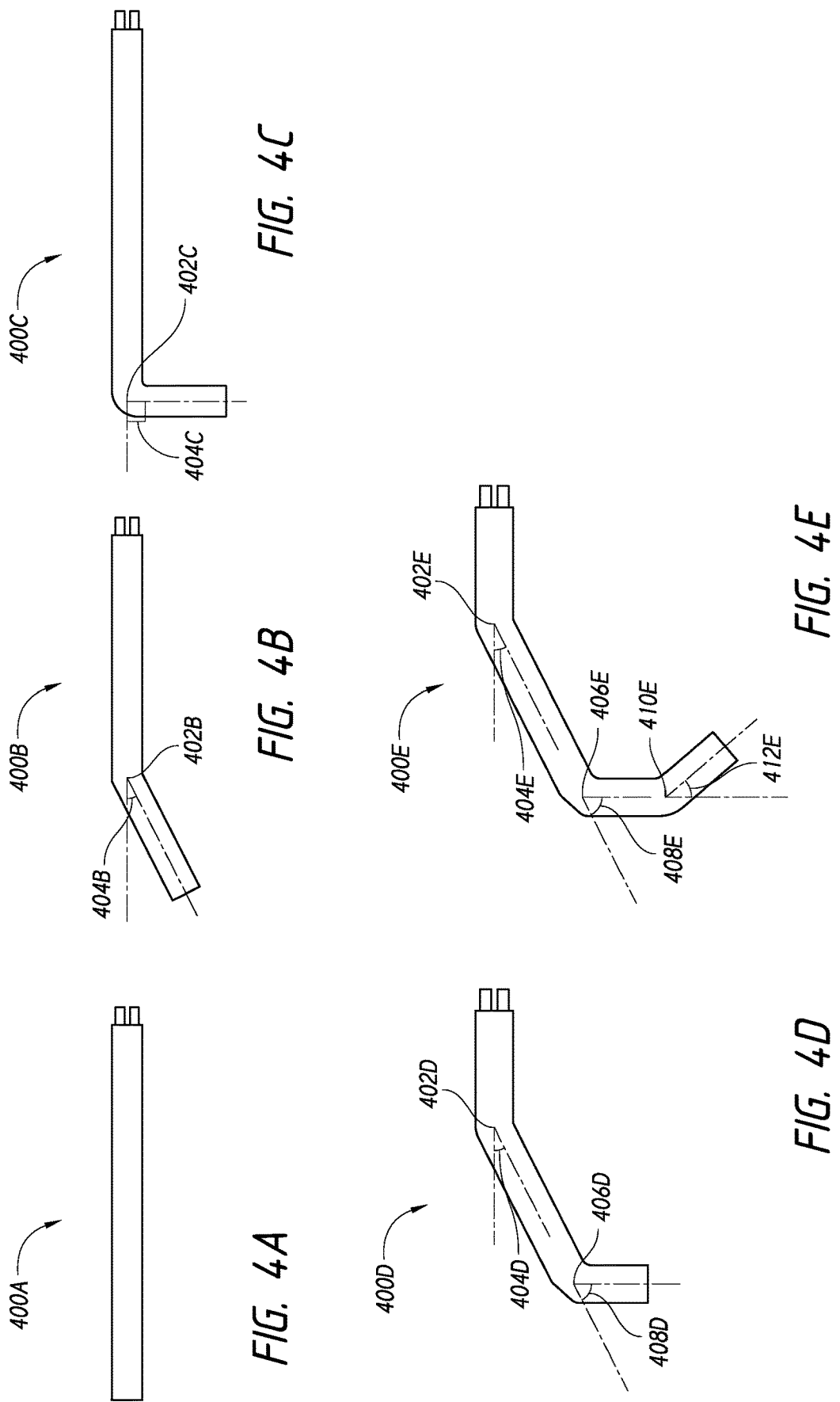

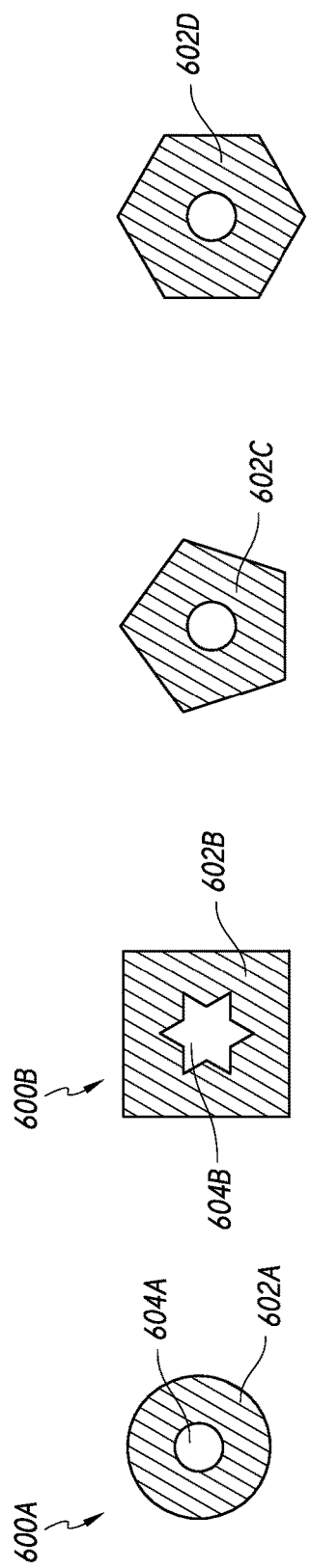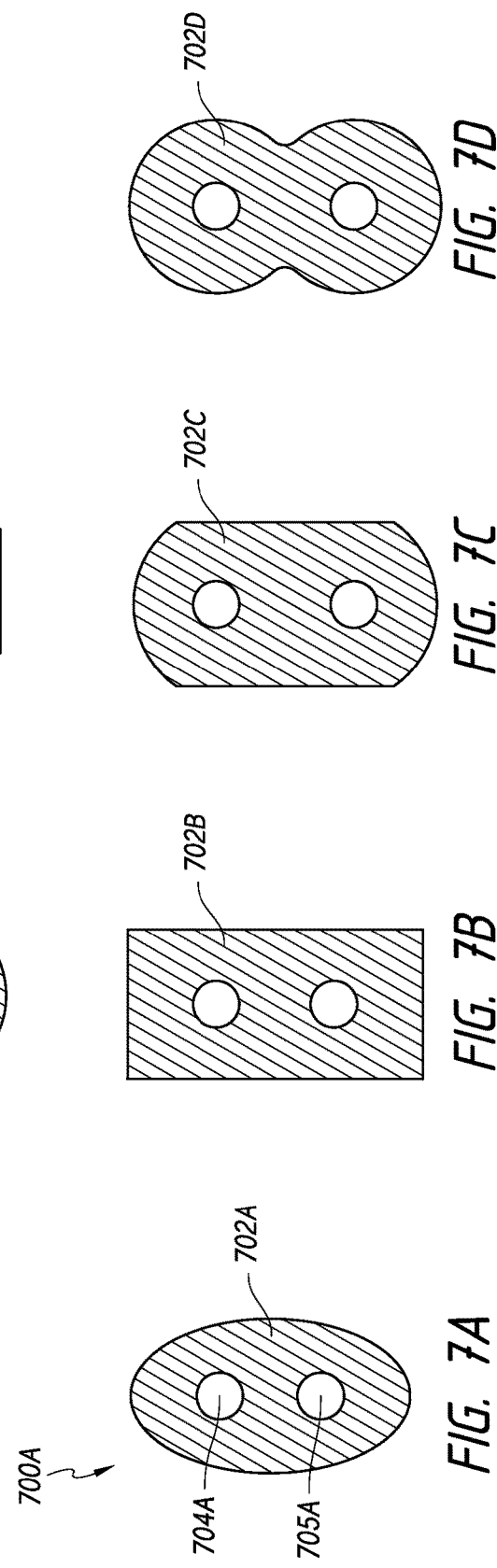

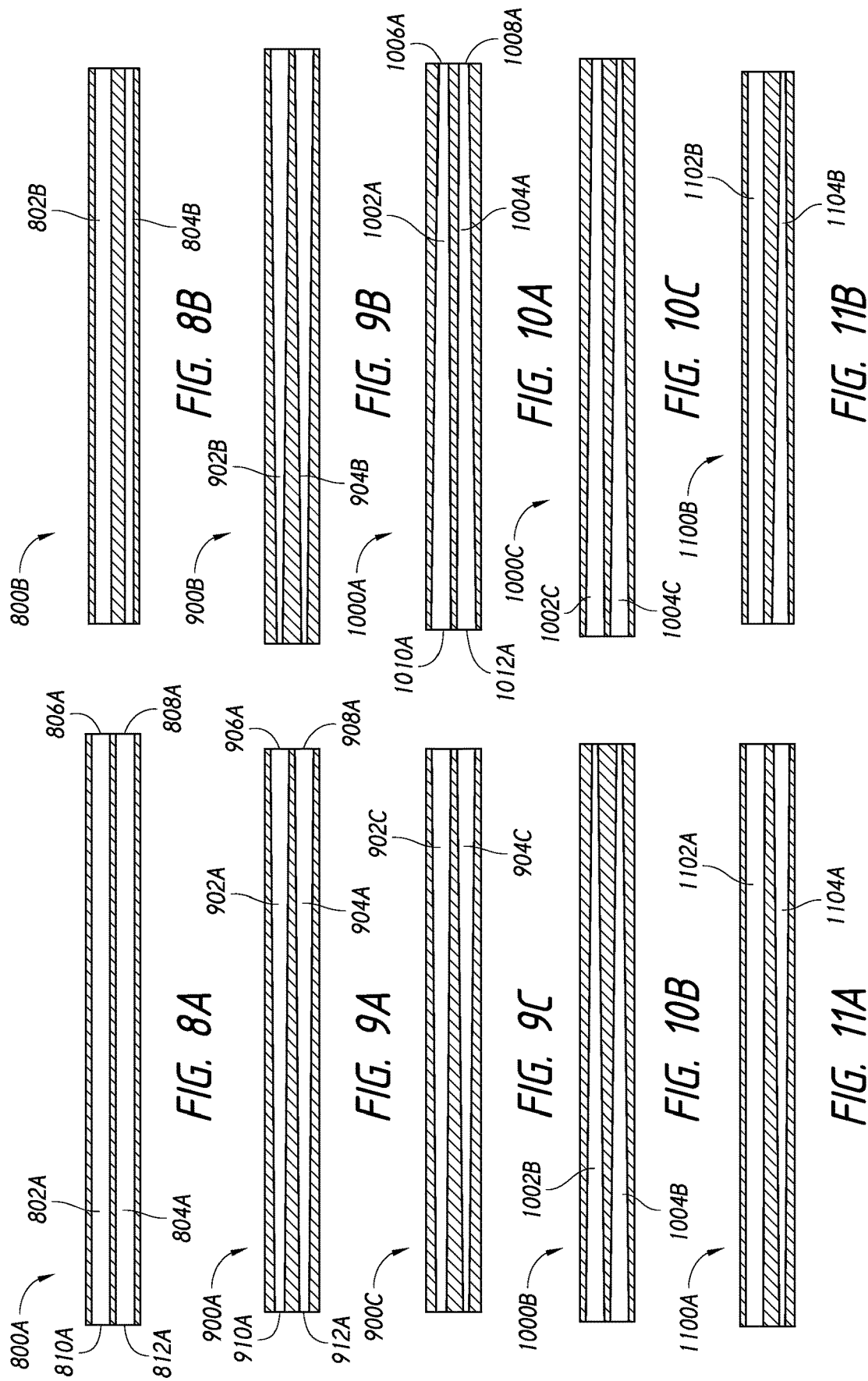

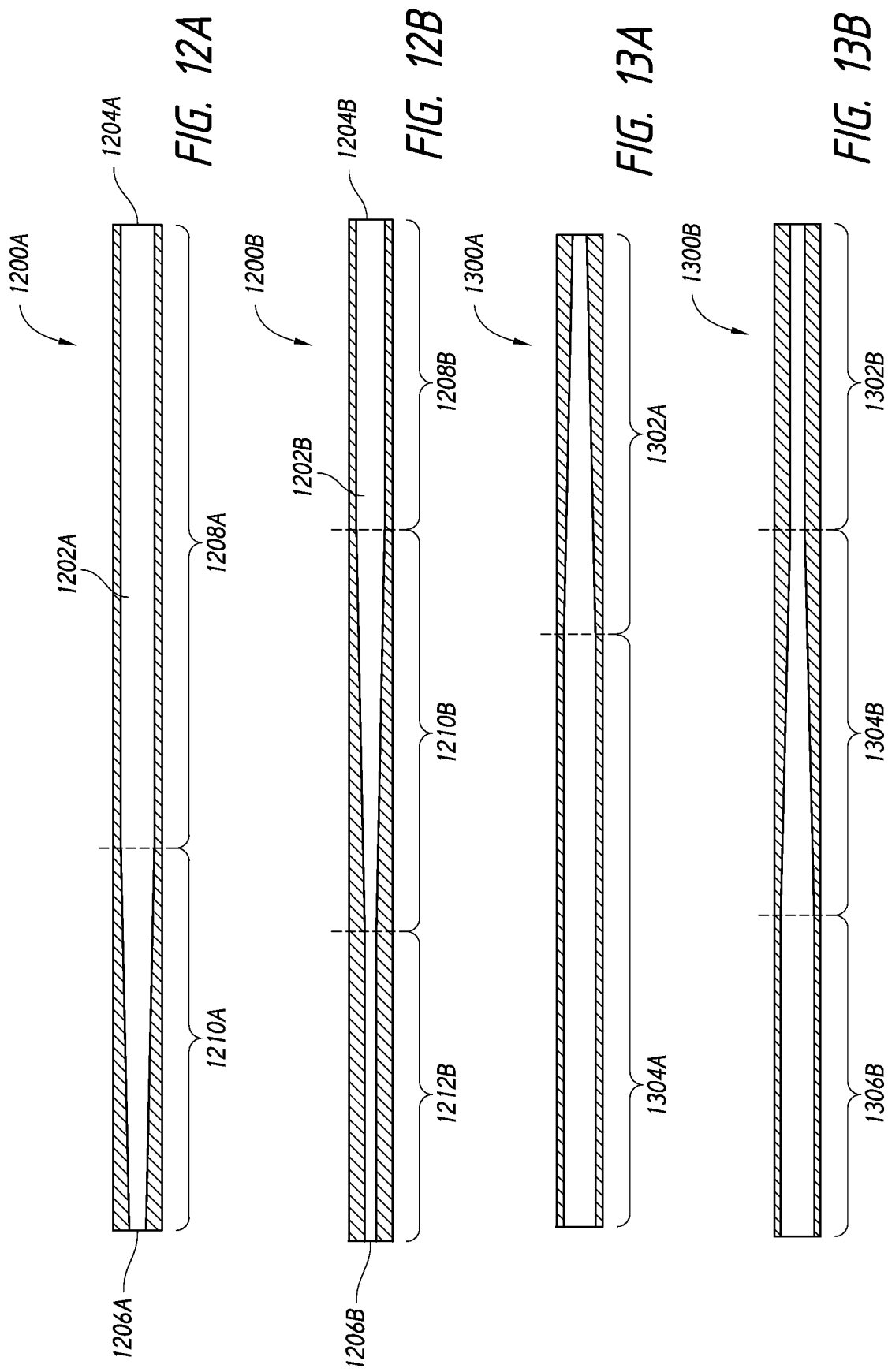

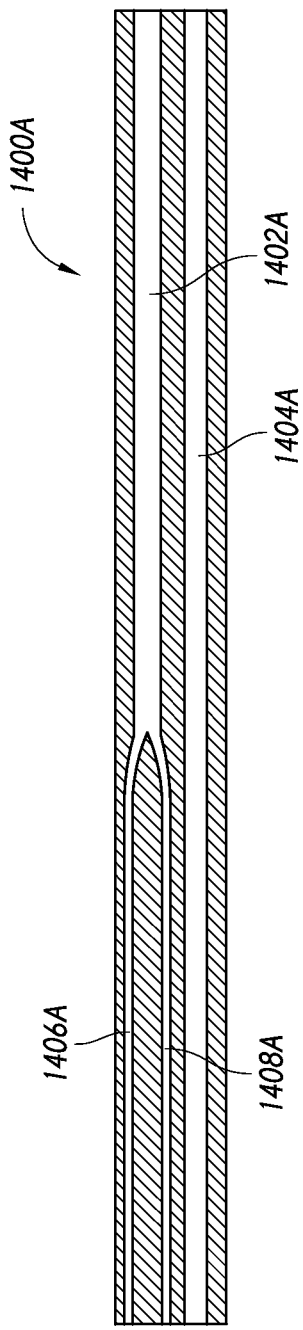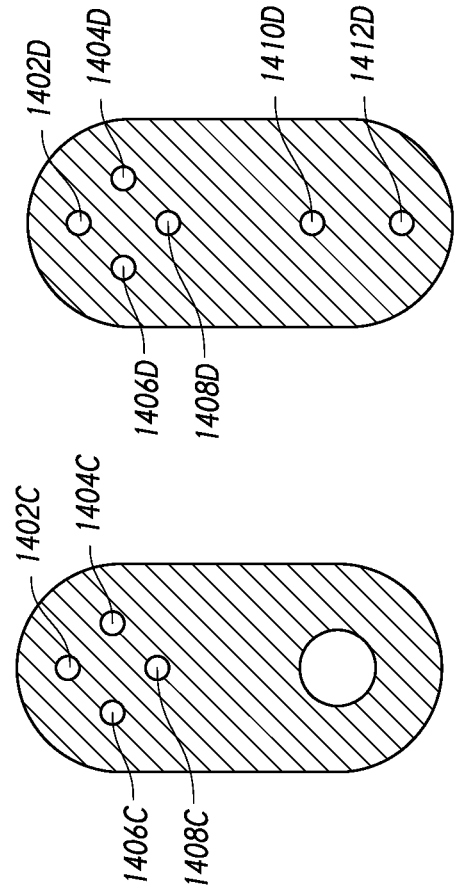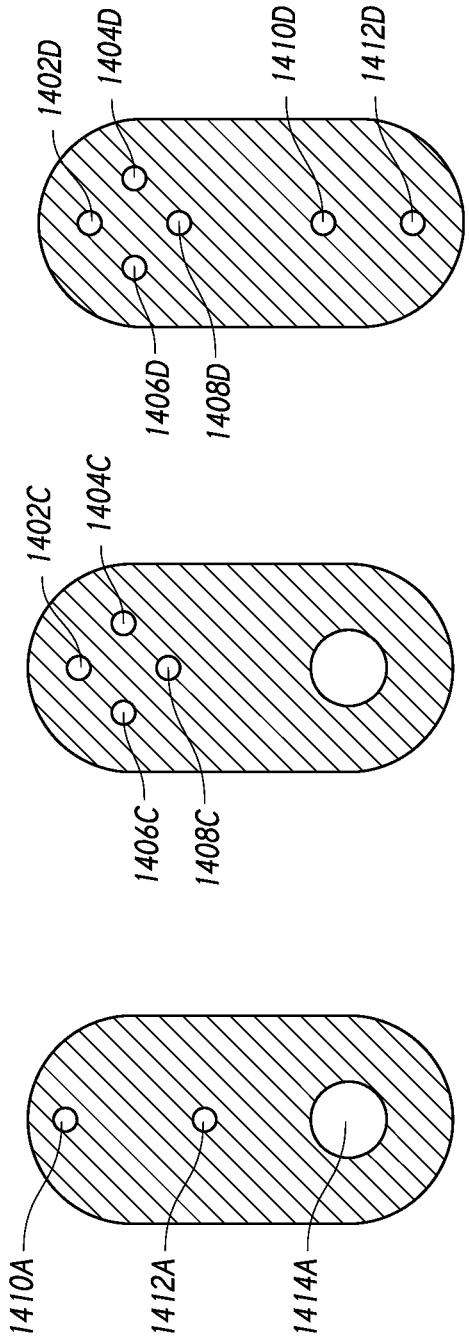

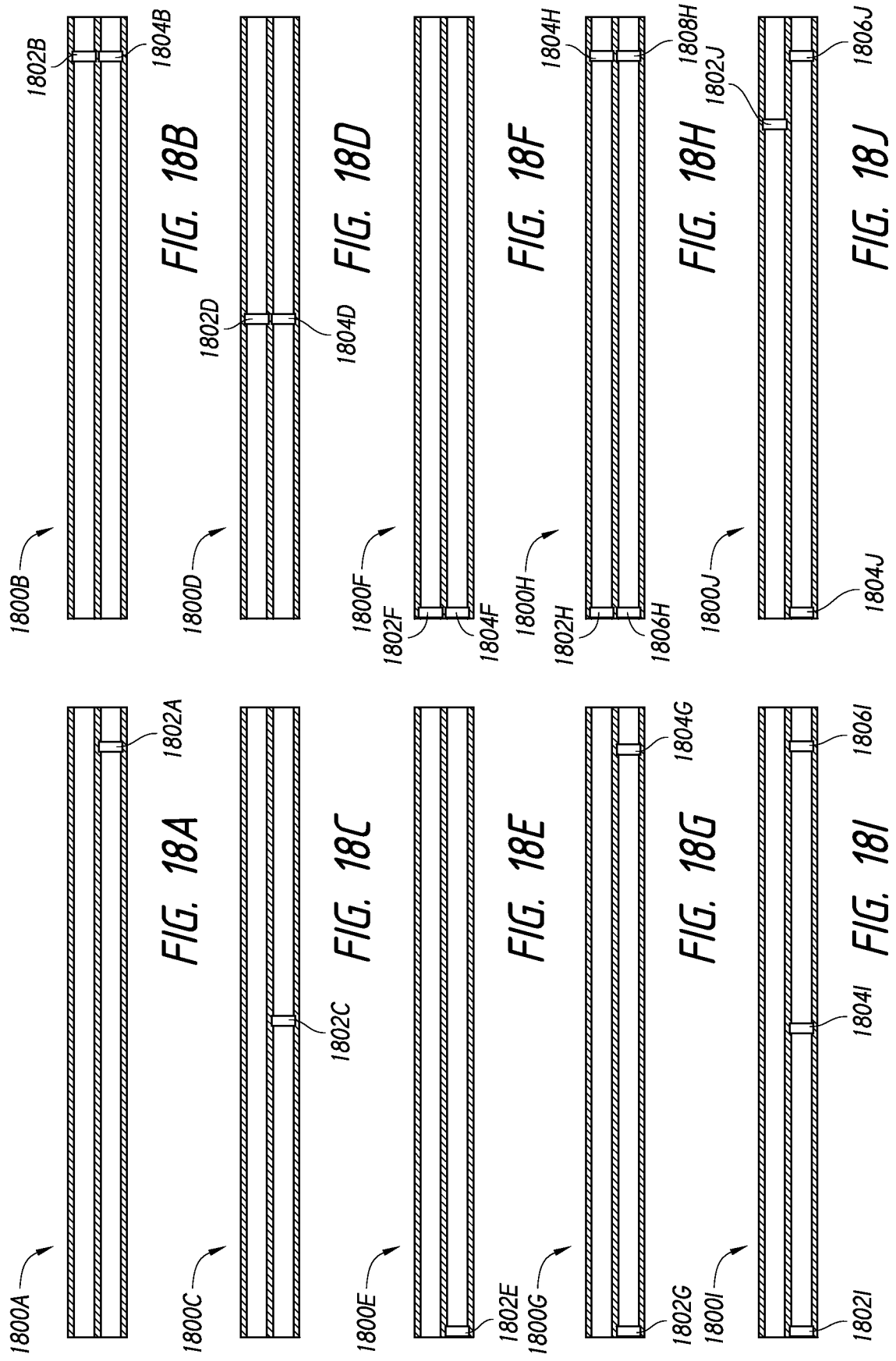

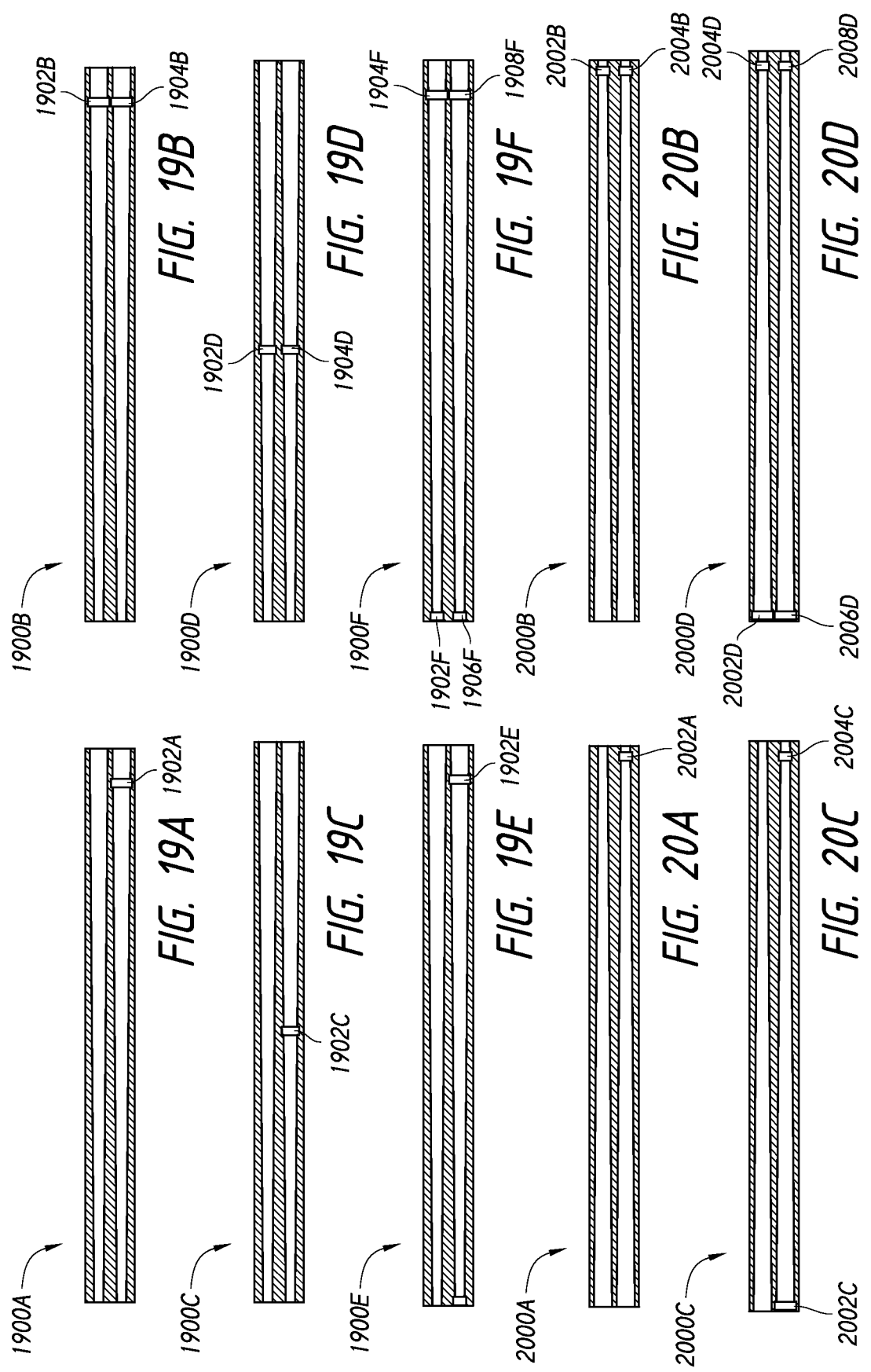

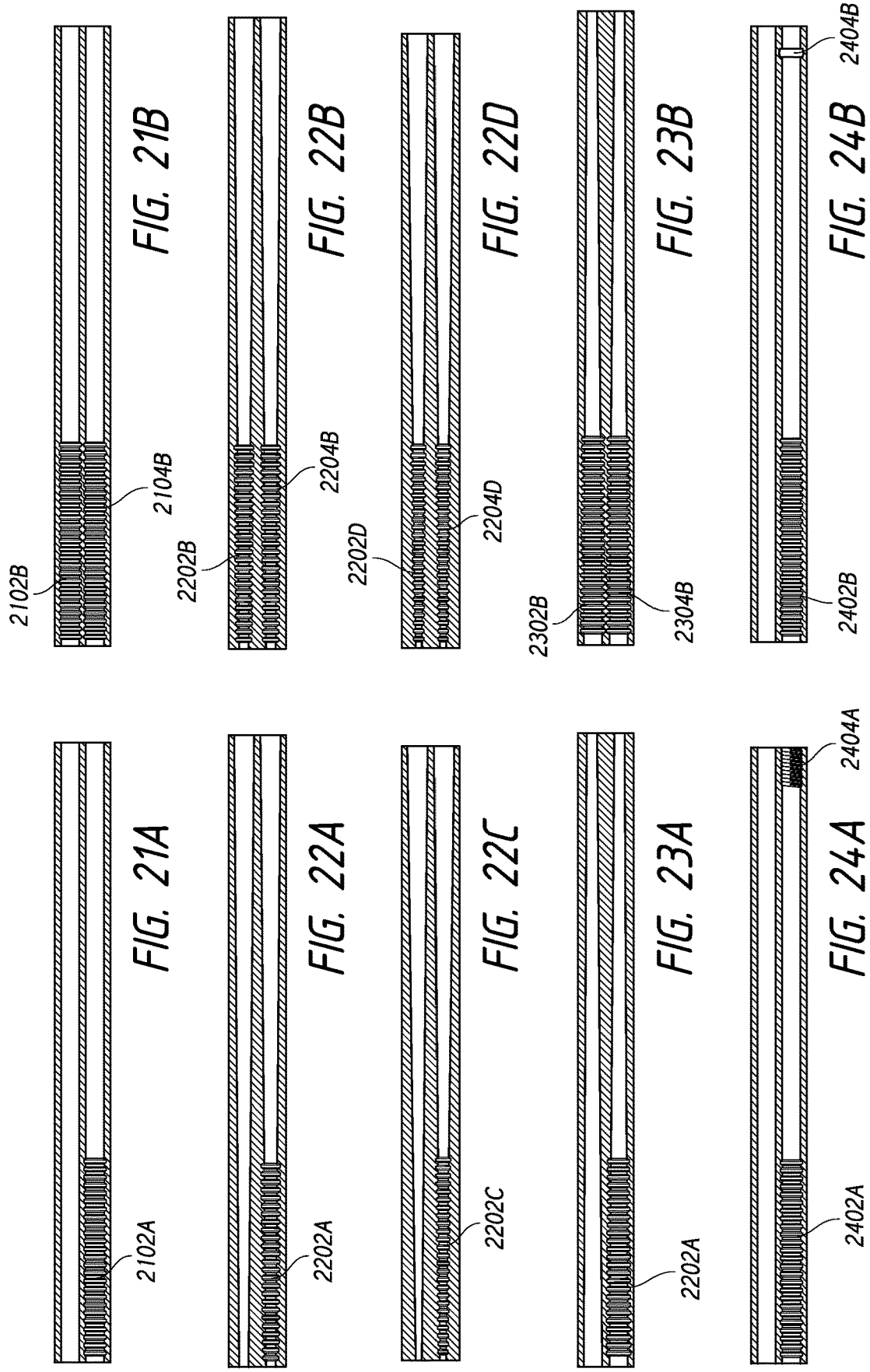

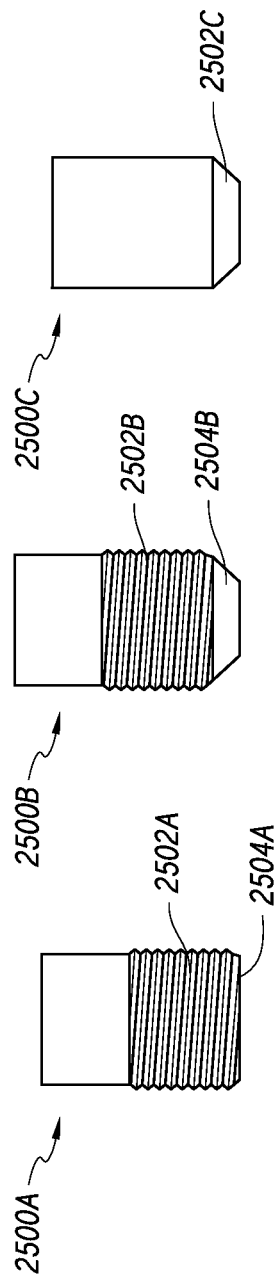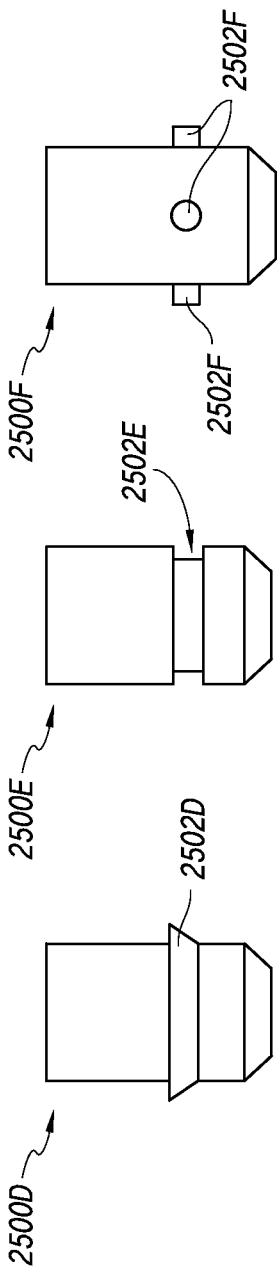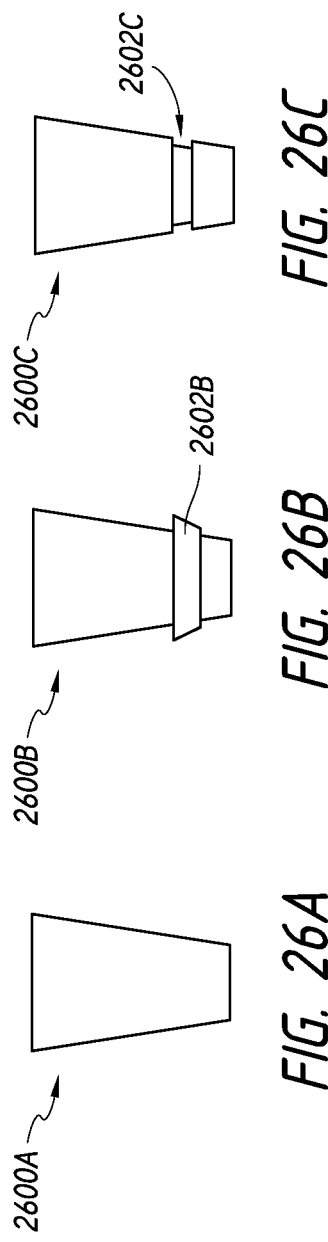

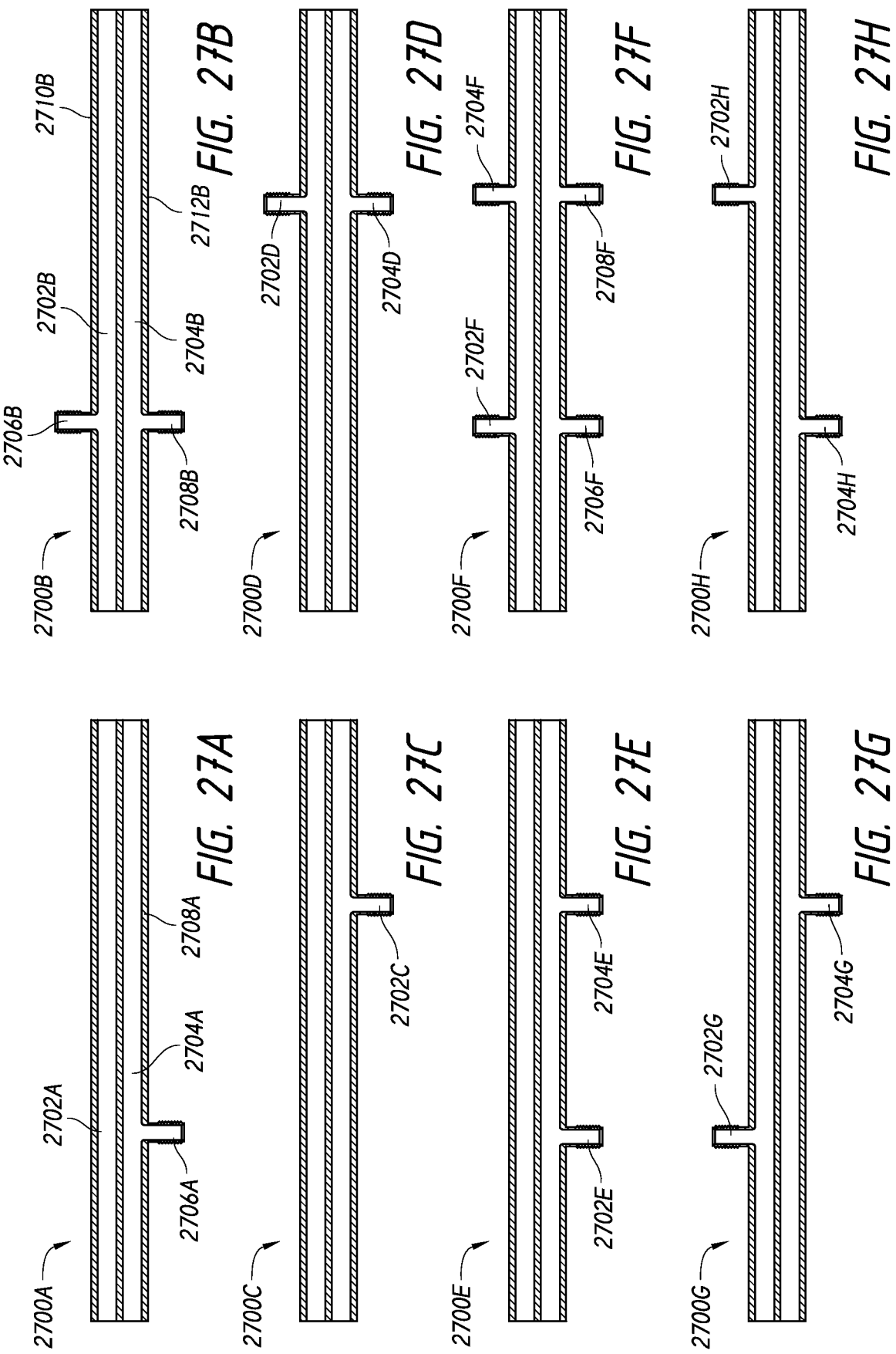

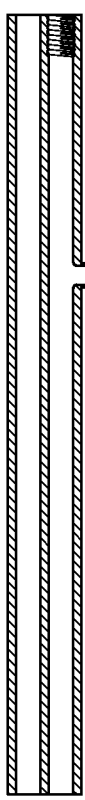
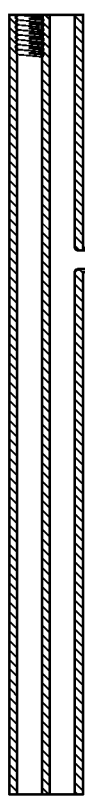
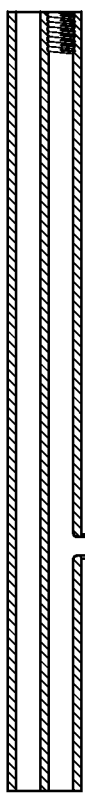
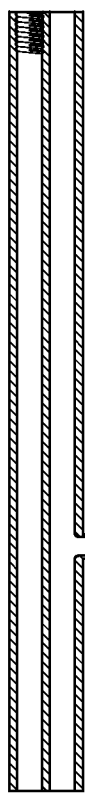
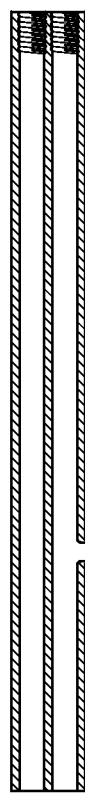

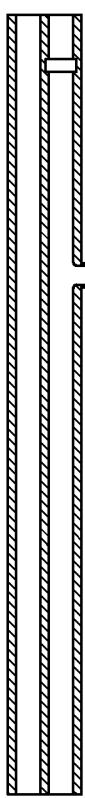
FIG. 29A  FIG. 29B
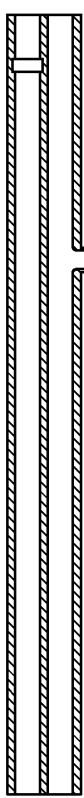
FIG. 29C  FIG. 29D
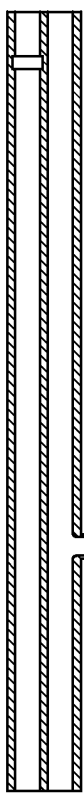
FIG. 29E  FIG. 29F
FIG. 29G  FIG. 29H
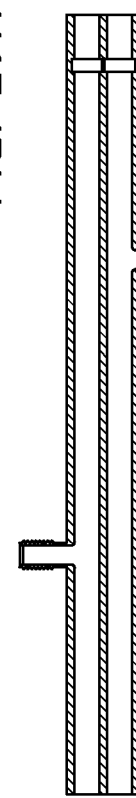
FIG. 29I  FIG. 29J
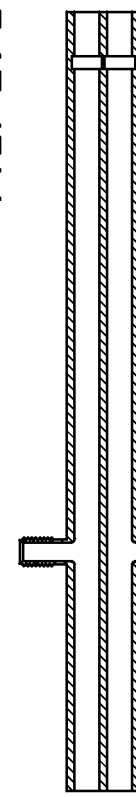

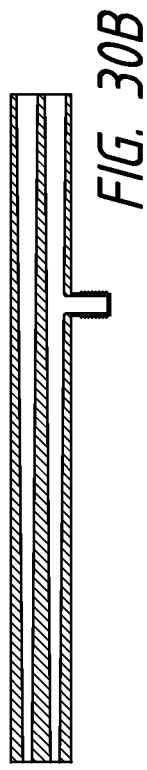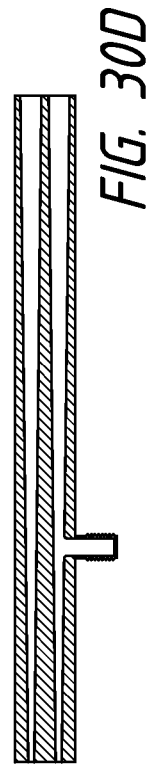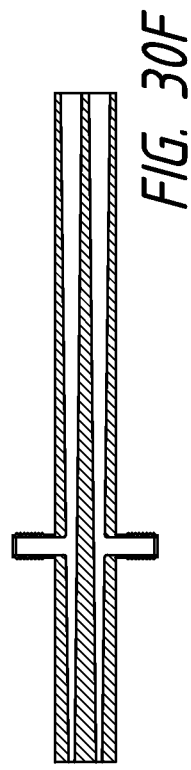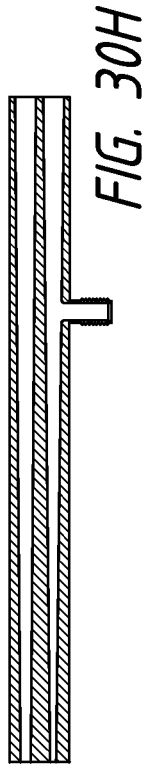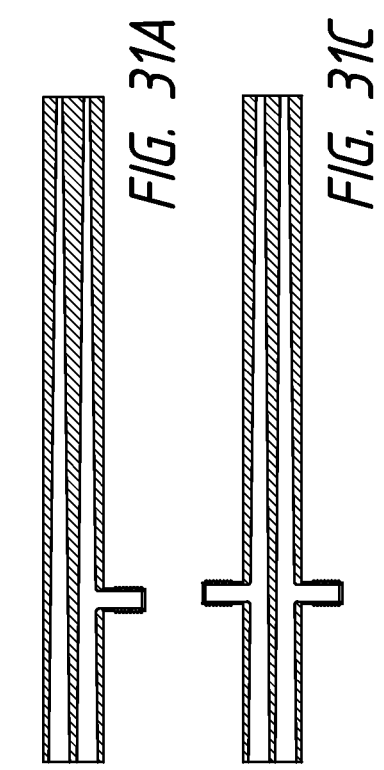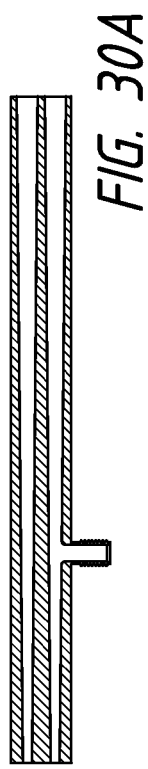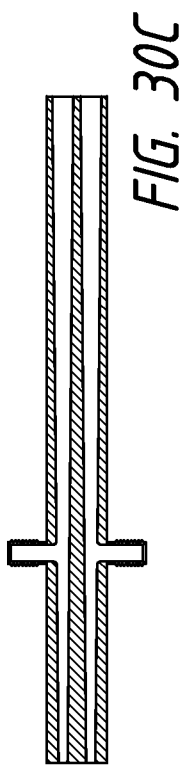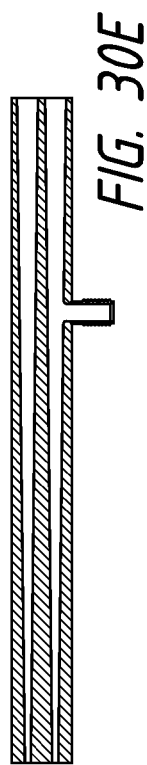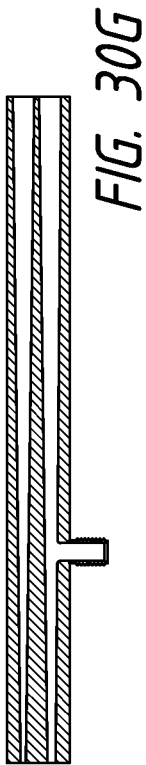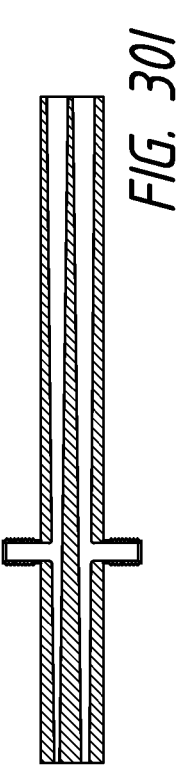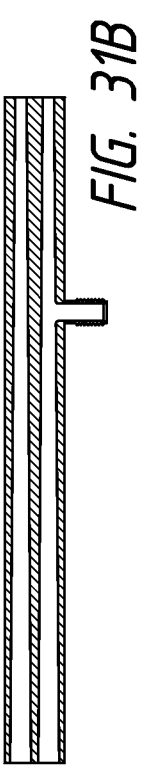

FIG. 32A
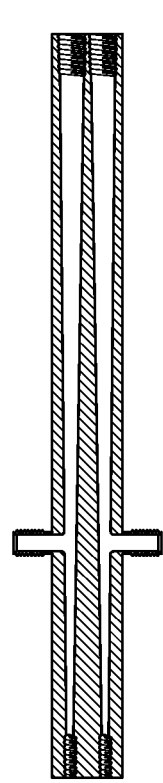
FIG. 32B
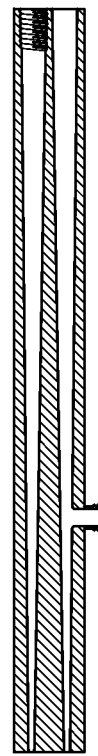
FIG. 32C
FIG. 32D
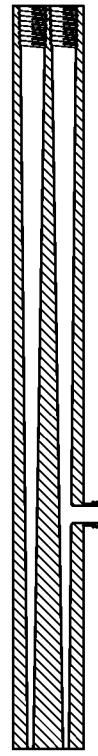
FIG. 32E
FIG. 32F
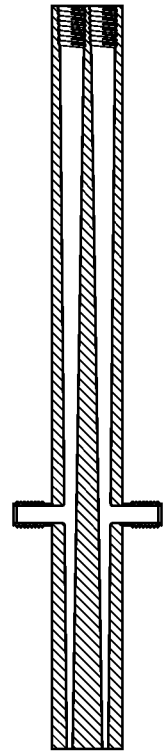
FIG. 32G
FIG. 32H

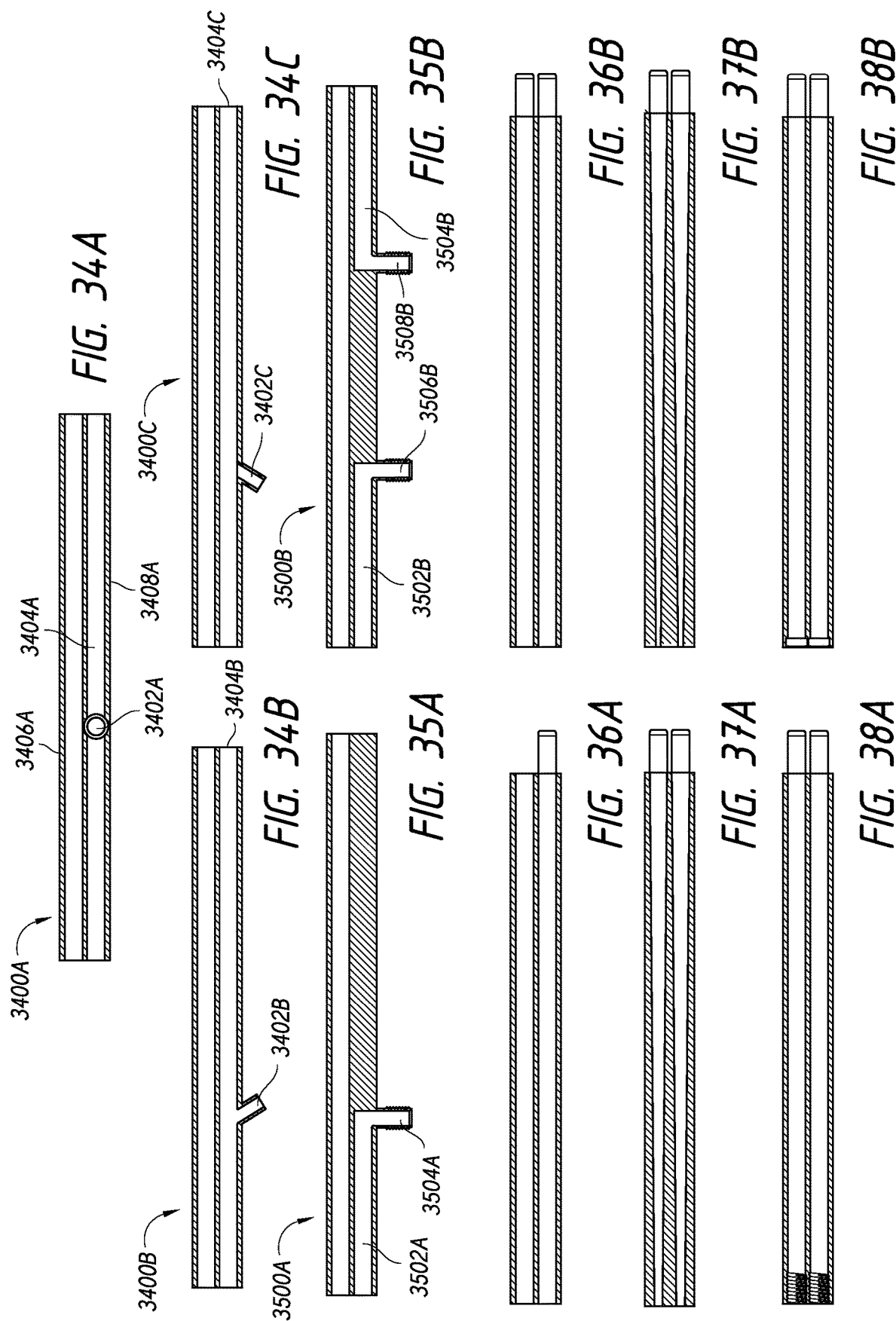

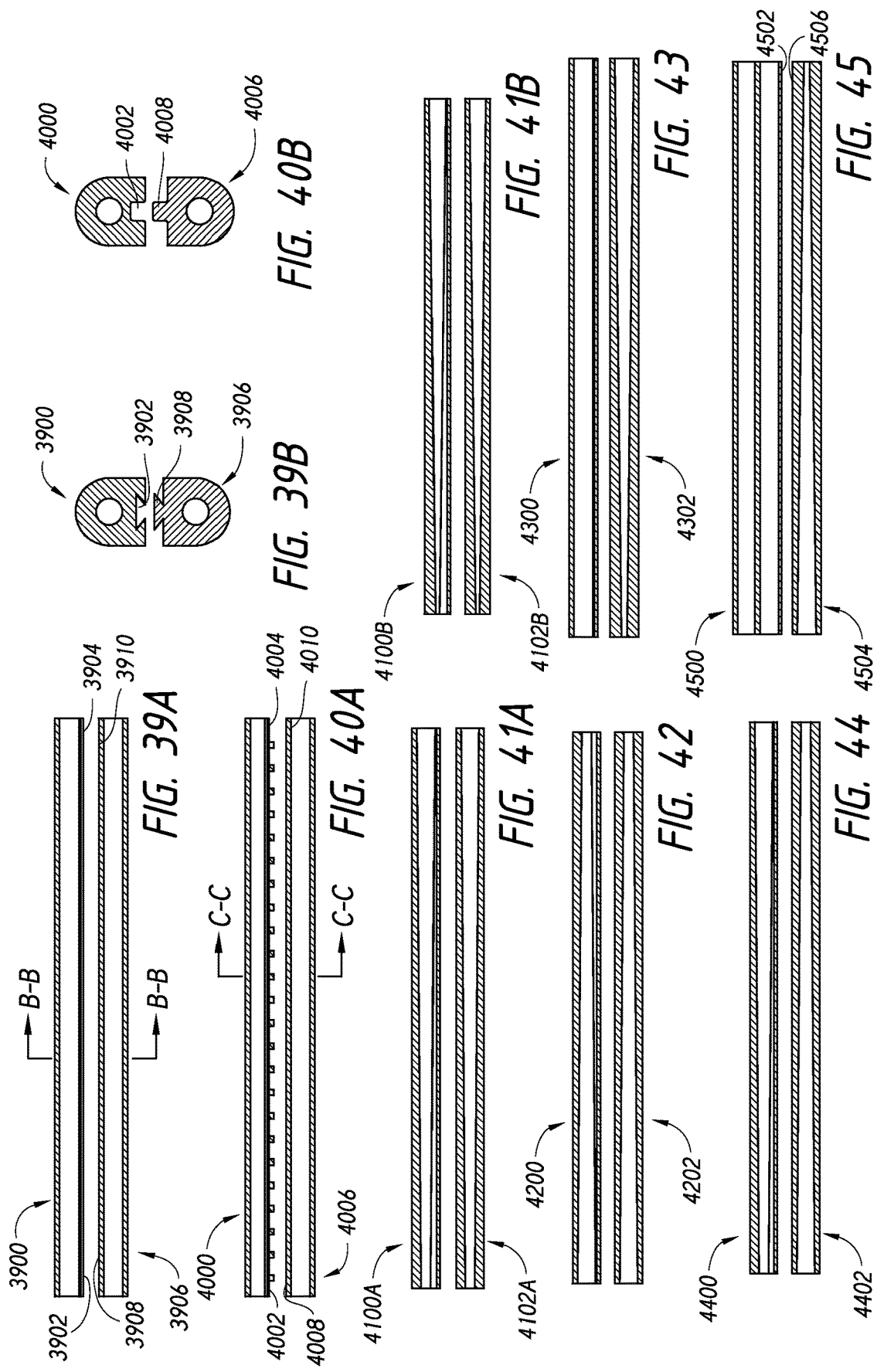

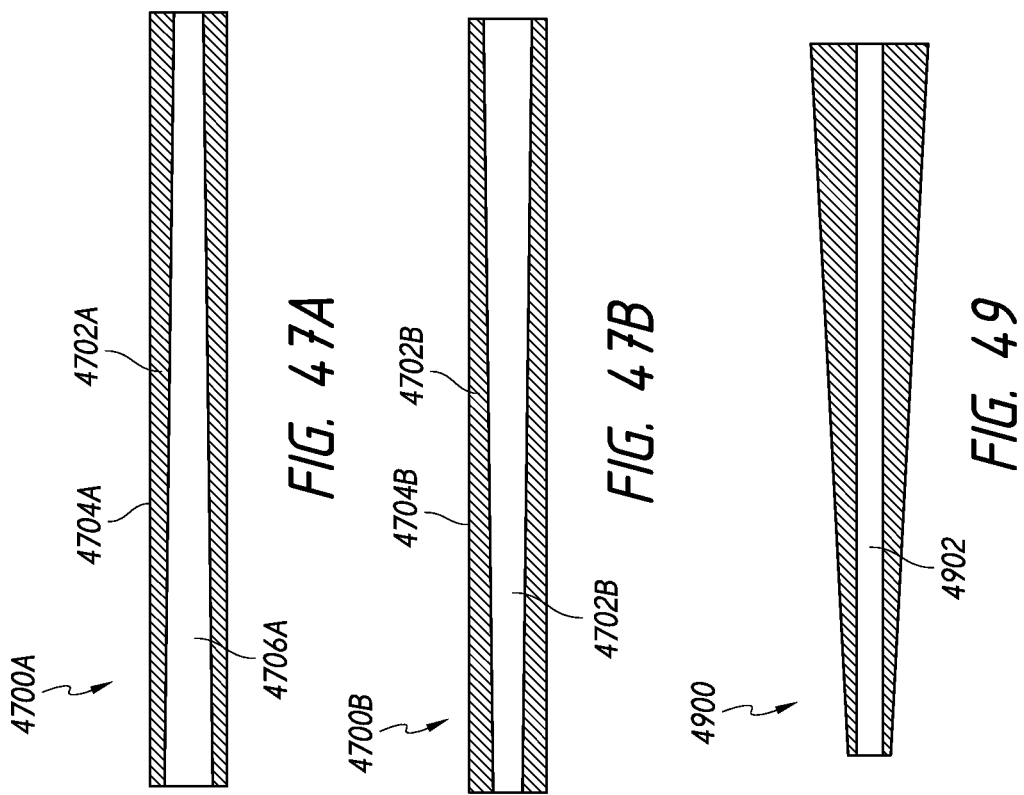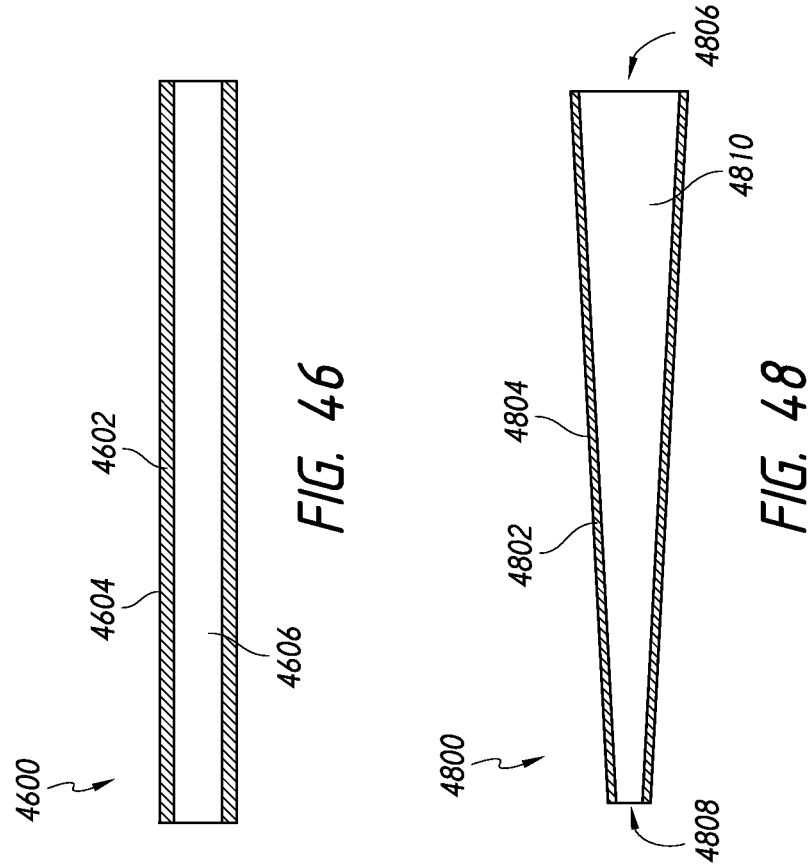

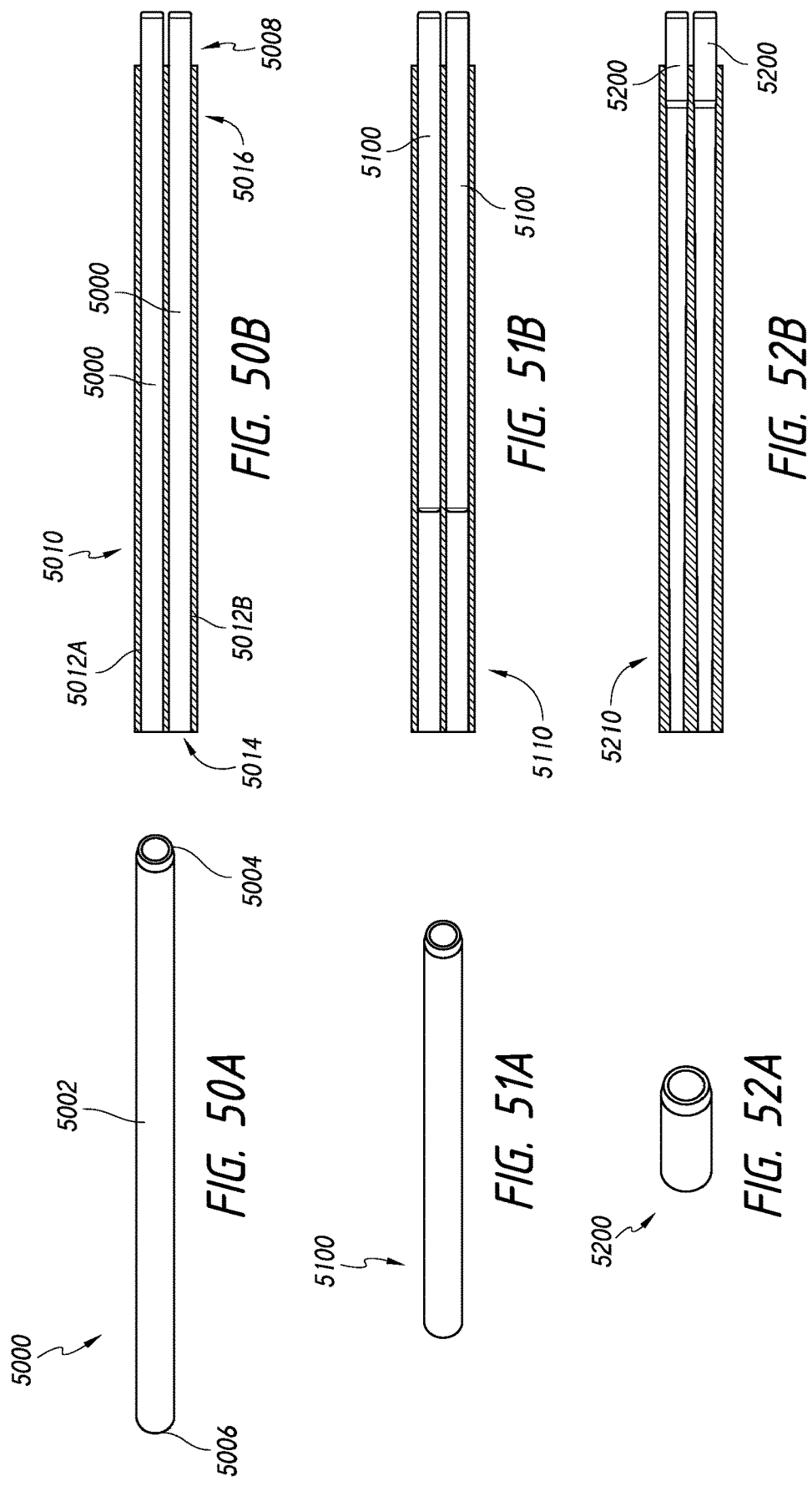

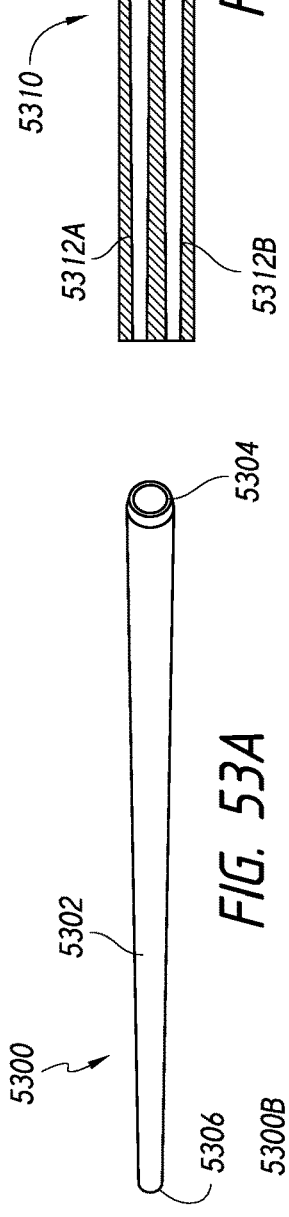
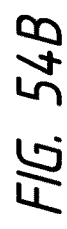
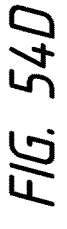

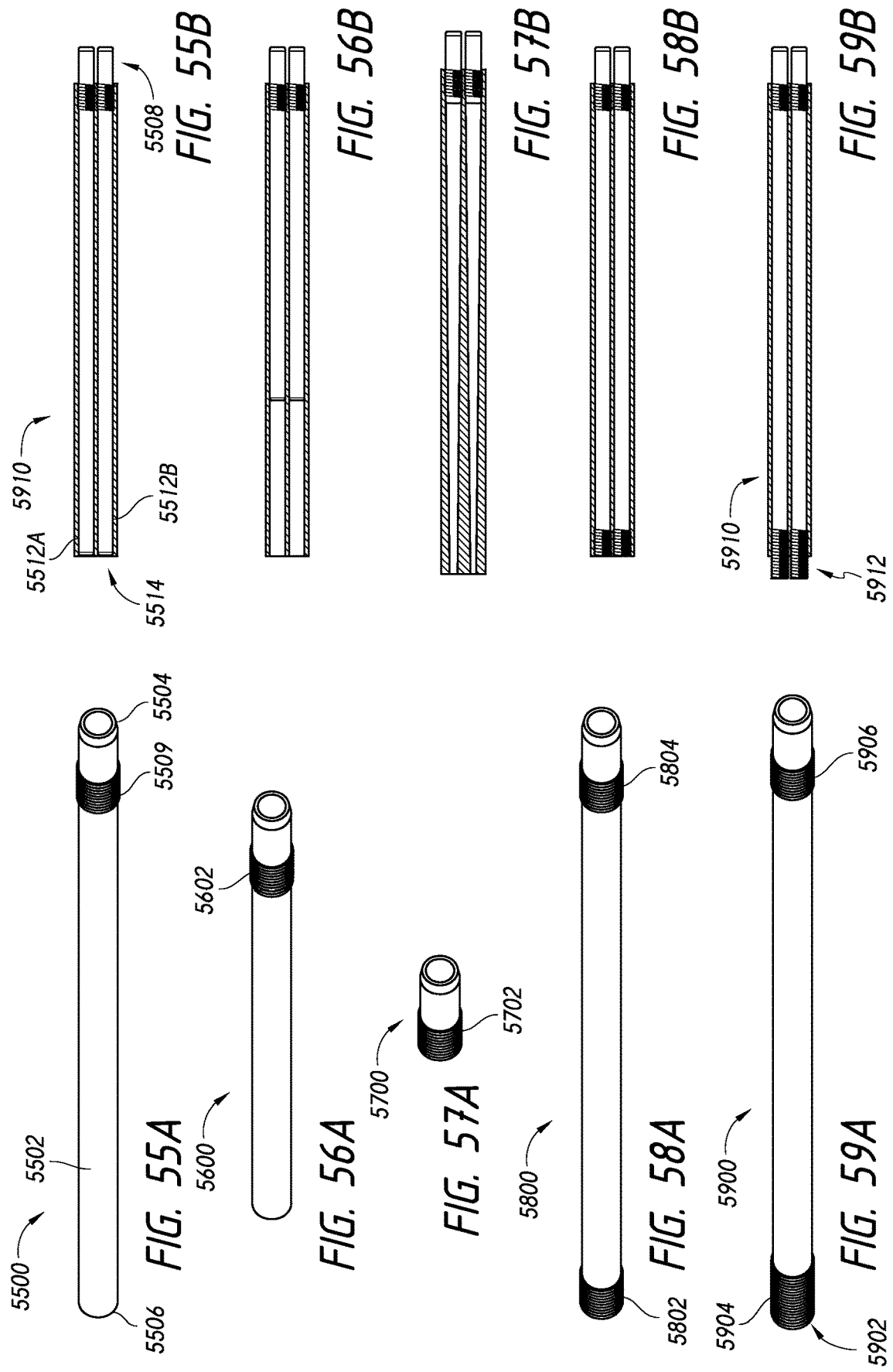

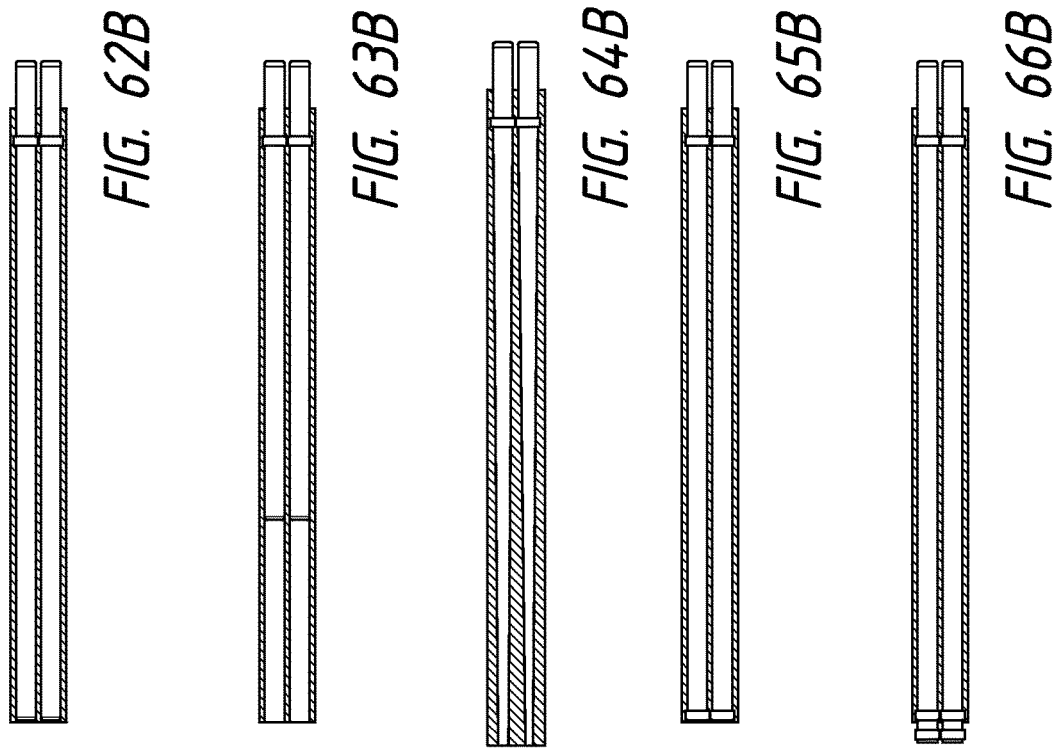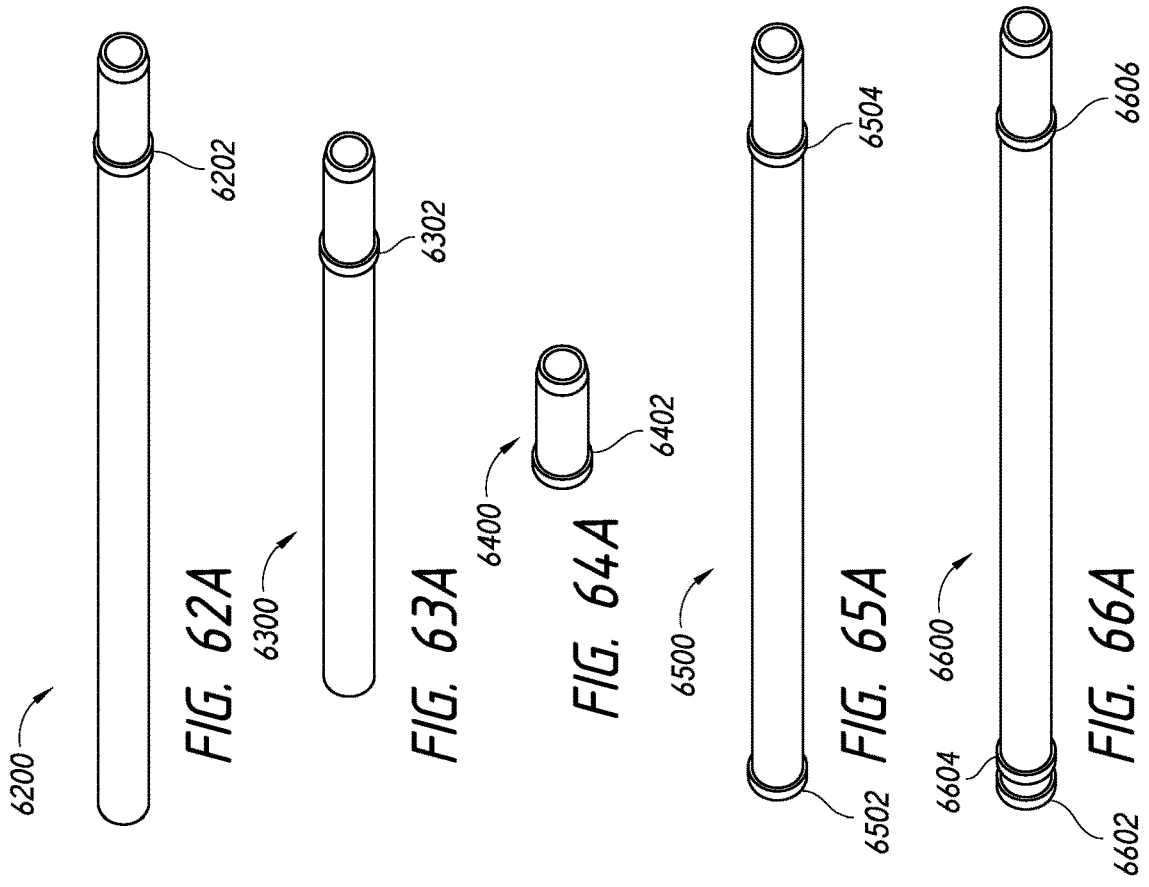

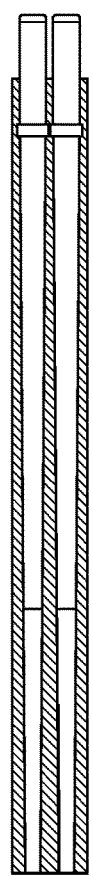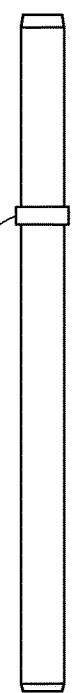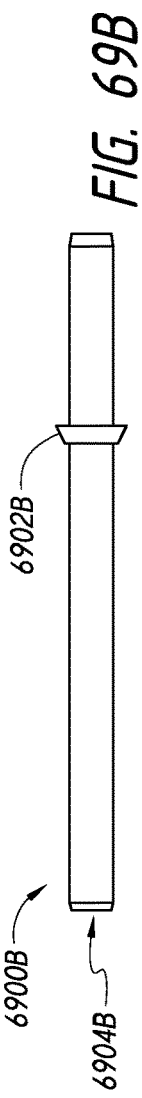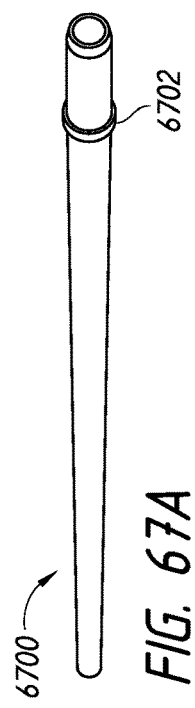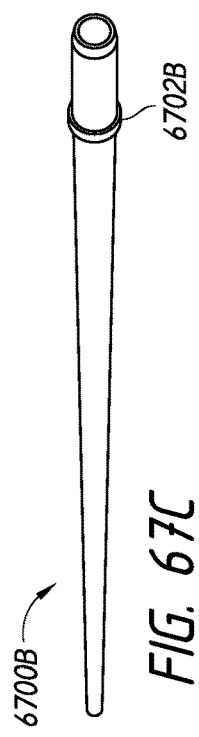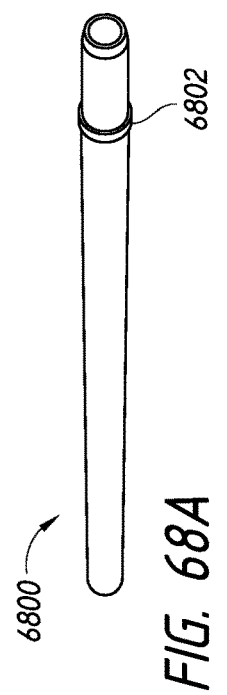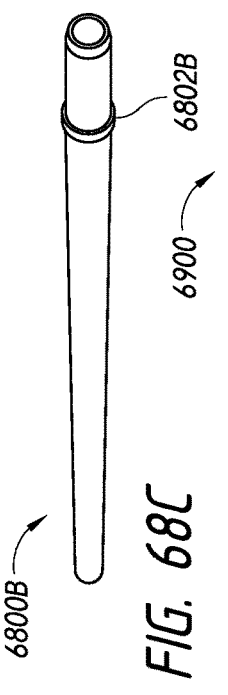

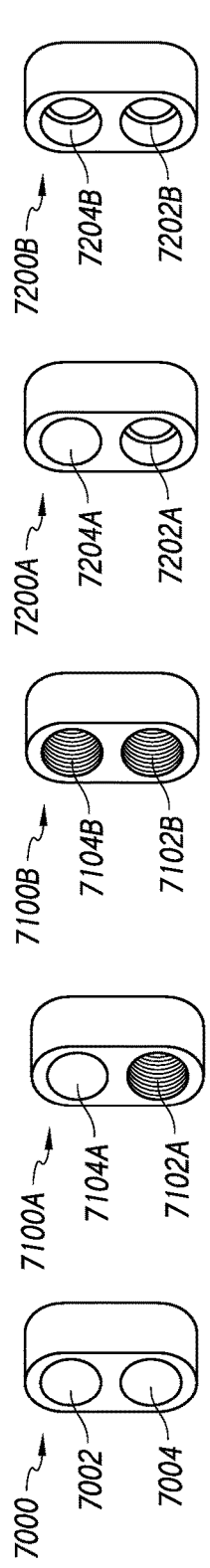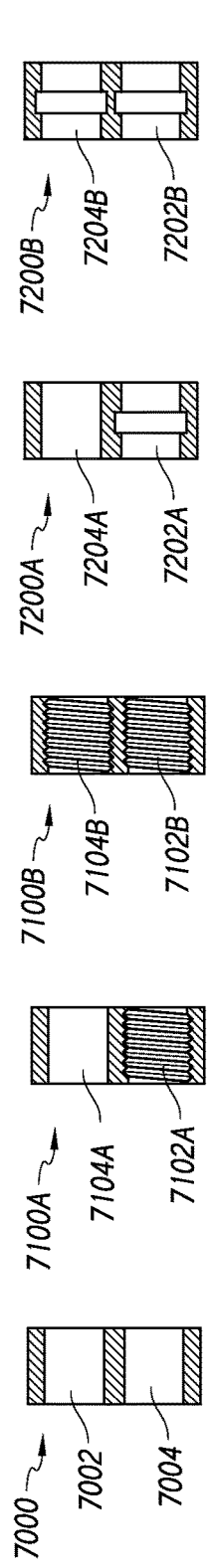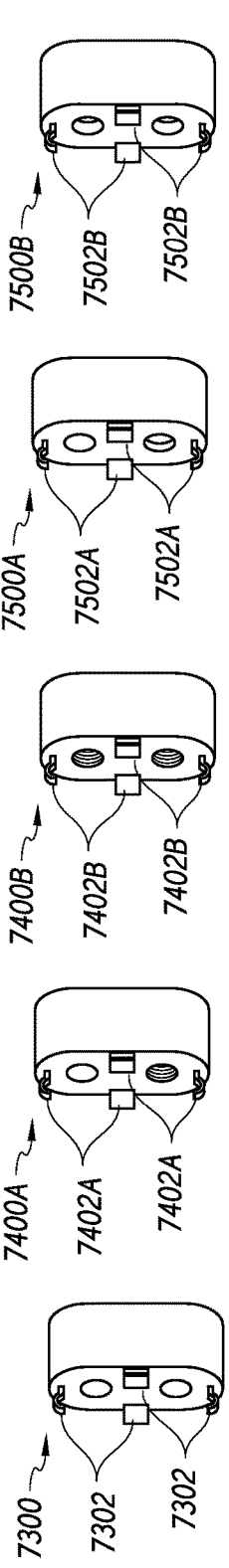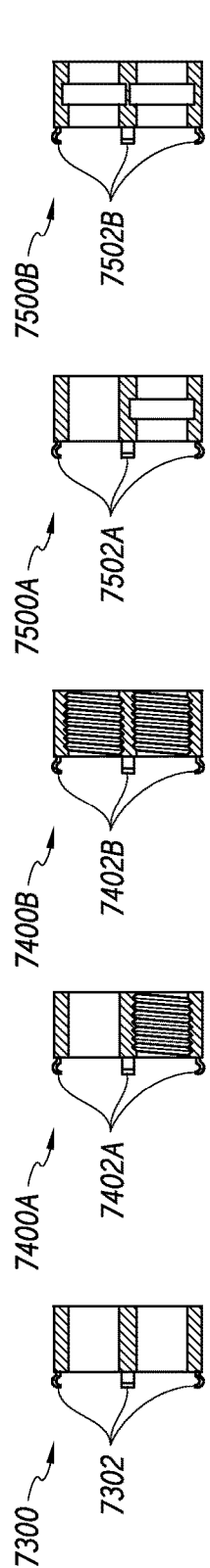

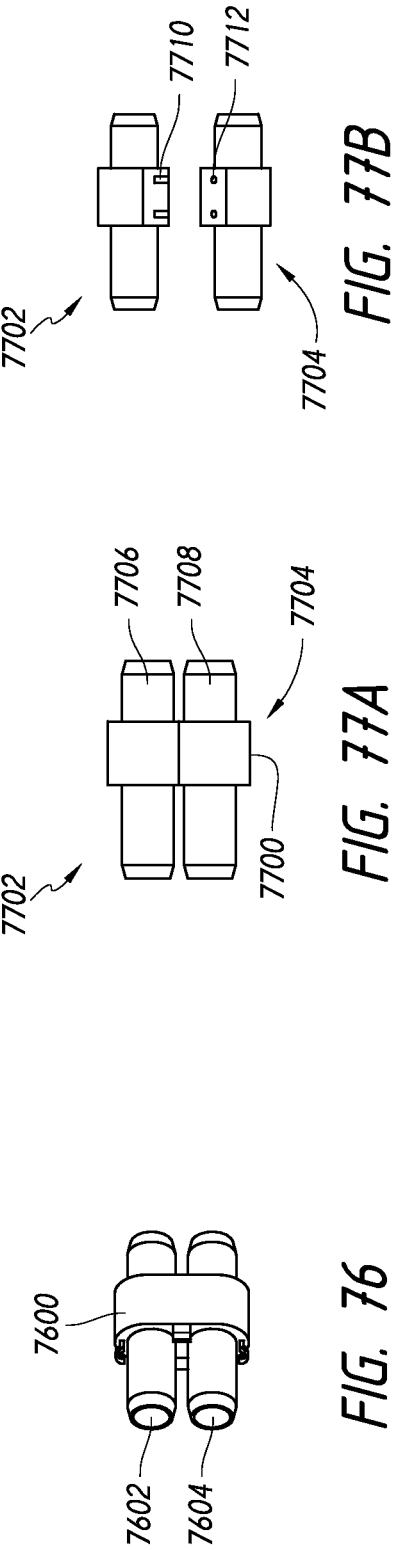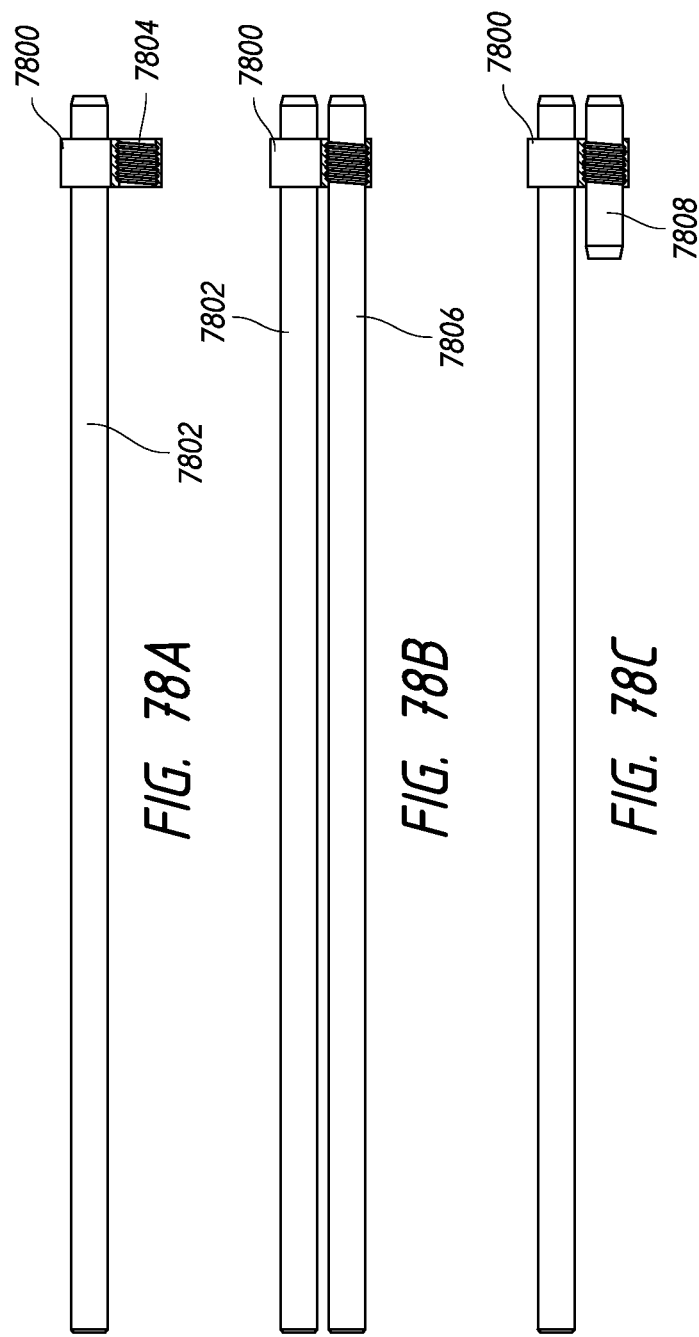

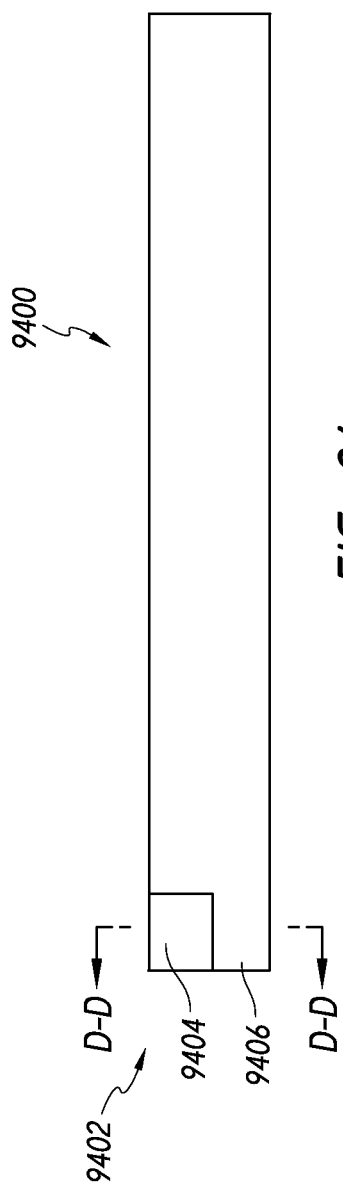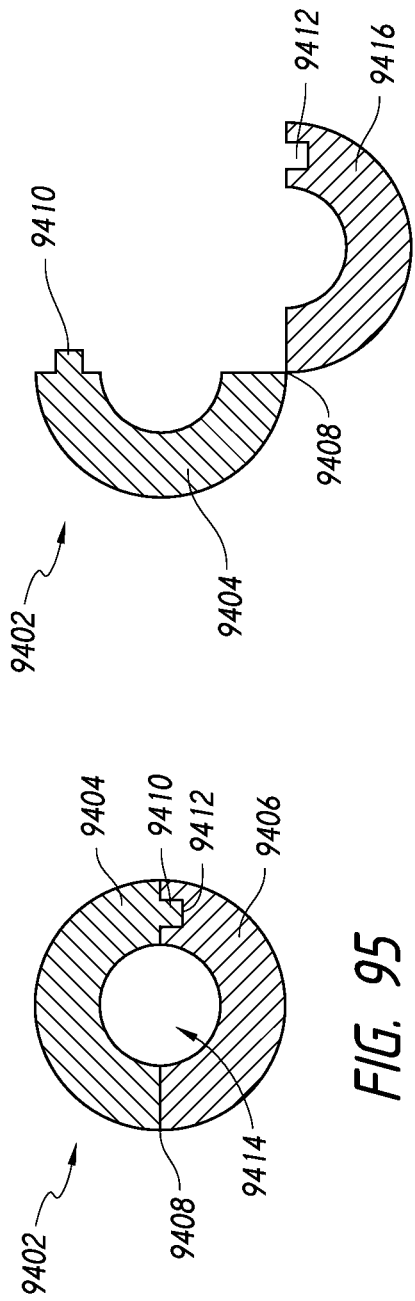

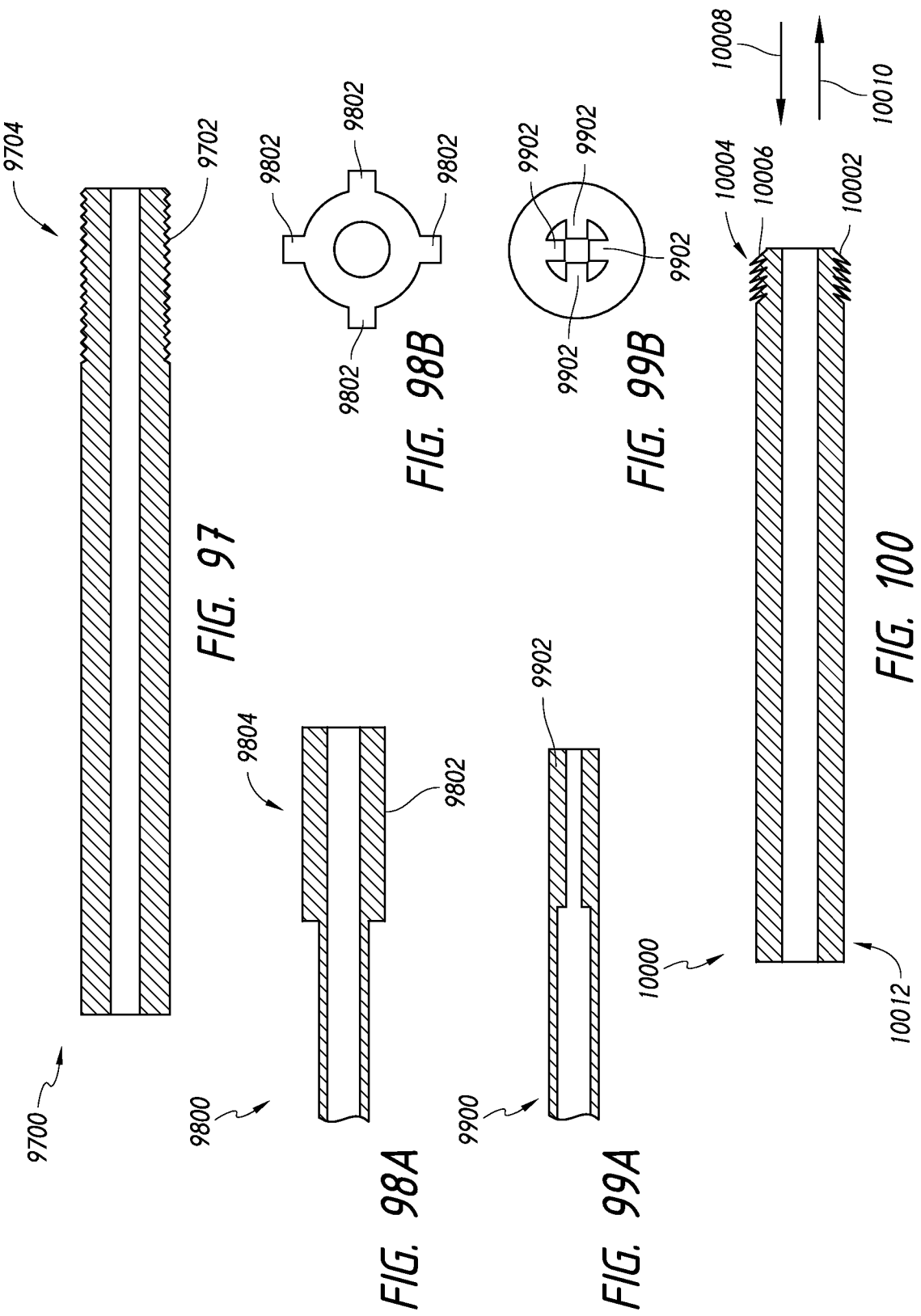

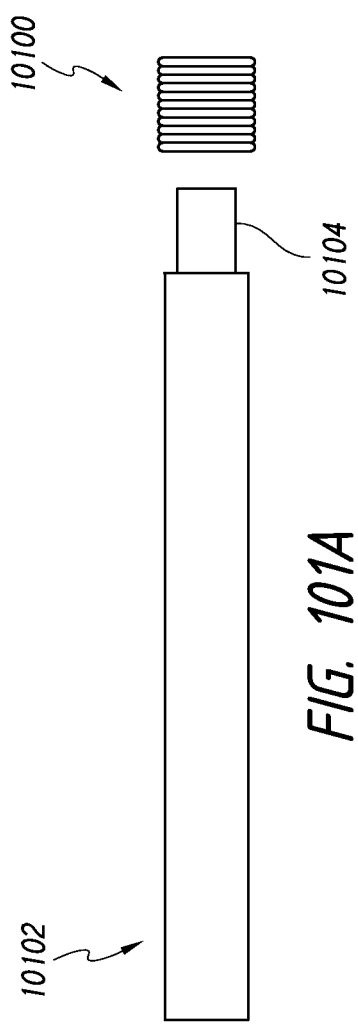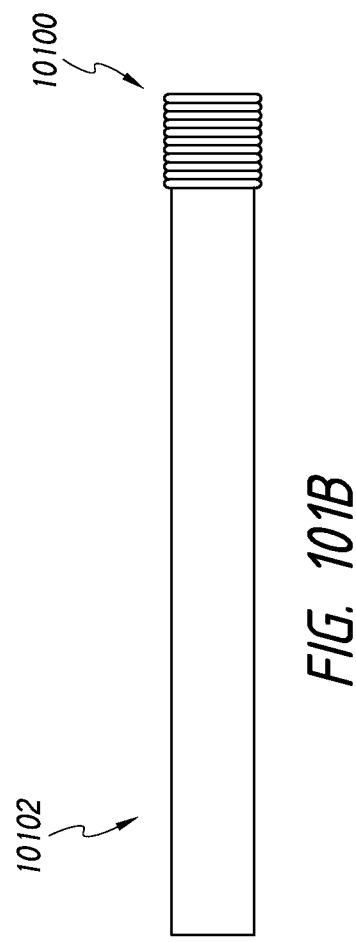
FIG. 101A
FIG. 101B

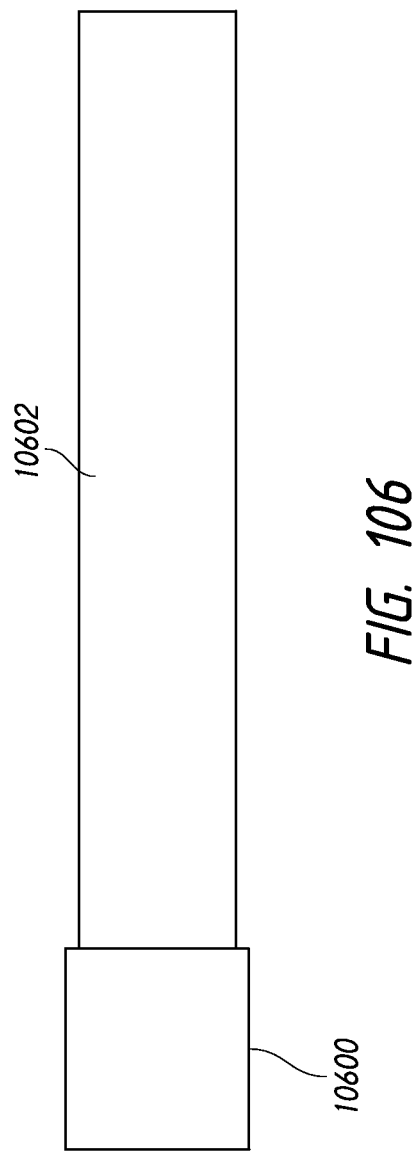

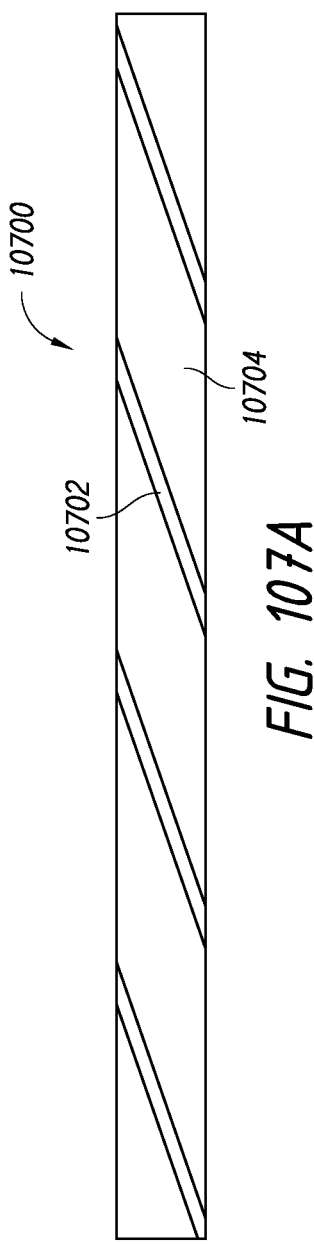
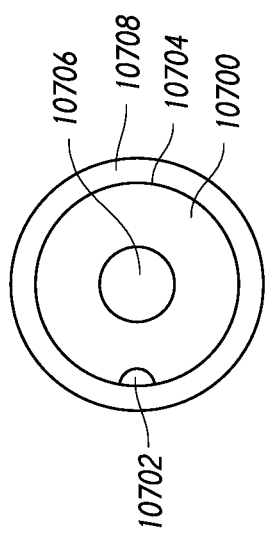
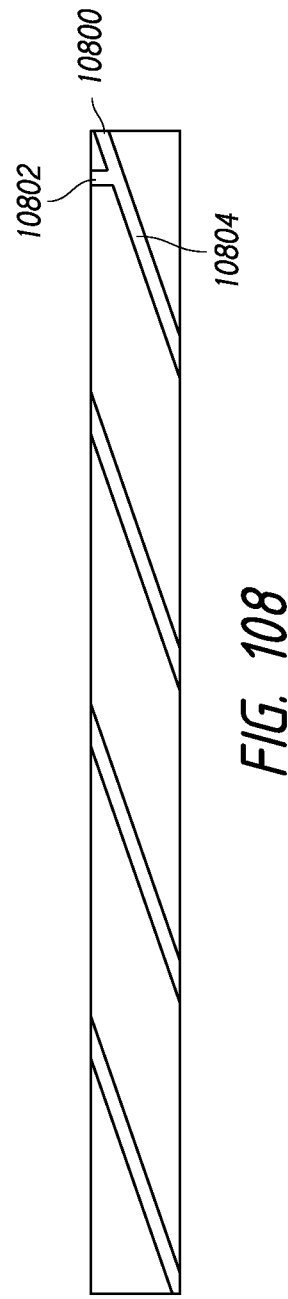
FIG. 107A
FIG. 107B
FIG. 108

DENTAL SYRINGE TIP DEVICES, SYSTEMS AND METHODS

RELATED APPLICATIONS

The present application claims priority to U.S. Provisional Application No. 61/914,285, filed Dec. 10, 2013, U.S. Provisional Application No. 61/895,901, filed Oct. 25, 2013, and U.S. Provisional Application No. 61/866,444, filed Aug. 15, 2013, the entire contents of each of which is hereby expressly incorporated by reference and is to be considered a part of this specification.

BACKGROUND

1. Field

The present inventions relates to dental systems, methods and devices for dental syringes.

2. Description of the Related Art

The dental syringe is a multi-purpose dental apparatus which is often used by dentists, dental assistants, dental hygienists, and other such personnel for a wide-range of dental visits. The dental syringe often includes both a water port and a pressurized air port and can be used for providing irrigation to a target site, clearing or removing debris from a target site, drying a target site for bonding with another dental apparatus, and a variety of other uses. Generally, such dental syringes include a syringe tip which directs the flow of water and air from the dental syringe to the target site. Due to the proximity of the syringe tip with the target location, it is inevitable that at least some contaminants from the patient, such as bacteria, viruses, and bodily fluids, will contact and contaminate the syringe tip. Accordingly, there is a need to develop devices, systems, and methods which significantly reduce, or eliminate, such a risk of spreading these contaminants between patients while still being cost-effective for a dental practitioner. While disposable devices do exist, there is a need for further improvement of these disposable devices.

SUMMARY

One aspect of the dental systems, methods and devices described herein is the recognition of a need for customizable syringe tips. Dental syringes are often limited to a fixed level of fluid pressure such as a fixed water output pressure from the water port and fixed air pressure output from the pressurized air port. Accordingly, the discharge pattern and discharge pressure of air and water is generally fixed by the design of the dental syringe used. However, in many instances, it may be desirable to obtain a more optimal discharge pattern and discharge pressure based on the specific dental procedure being performed. Furthermore, it may be the case that during a dental procedure, a dental professional may prefer to use multiple discharge patterns and discharge pressures during the course of the procedure. As such, one feature of the dental systems, methods and devices described herein is the ability to customize the syringe tip for a variety of discharge pressures and/or patterns.

Another aspect of the dental systems, methods and devices described herein is the recognition of a need to reduce the likelihood of fluid leakage from one passage to a second passage. For example, some dental syringes and tips can leak water into the designated pressurized air port. This can result in some amount of water being ejected from the pressurized air port when the operator intended that only pressurized air be released. As should be apparent, this can pose potentially significant issues when leaked fluid is ejected from an improper port. As such, one feature of the dental systems, methods and devices described herein is a reduction, or potential elimination, of leakage from one fluid channel to another fluid channel.

In one arrangement, a syringe tip includes a first outer core having a proximal end and a distal end, the outer core having a first proximal aperture at the proximal end and a first distal aperture at the distal end, and a first passage connecting the first proximal aperture with the first distal aperture and defining a first interior surface, and a first inner core having an elongate member having a proximal end and a distal end, the first inner core having a first proximal aperture at the proximal end, a first distal aperture at the distal end, and a first passage connecting the first proximal aperture and the first distal aperture, wherein the first inner core is designed to be received and retained within the passage of the first outer core.

In some arrangements, the following features can be combined separately, or together with, the arrangement above. In some arrangements, the first proximal aperture of the first outer core and the first distal aperture of the first outer core can be unequal and the first passage of the first outer core can taper. In some arrangements, the first passage of the first outer core can include multiple tapering stages. In some arrangements, a second outer core can be included which has a proximal aperture, a distal aperture, and a passage. In some arrangements, the first outer core and the second outer core can have an interlock feature. In some arrangements, the first passage of the first outer core can separate into multiple passages. In some arrangements, the first outer core can have retention features. In some arrangements, the first inner core can have corresponding retention features. In some arrangements, the first inner core can extend into a full length of the first passage of the first outer core. In some arrangements, the first inner core can extend into a partial length of the first passage of the first outer core. In some arrangements, the syringe tip can have at least one bending feature. In some arrangements, the first outer core and/or the first inner core can have a connector in fluid communication with the passage of the first outer core and/or the first inner core. In some arrangements, a carrier can be included.

In some arrangements, a syringe tip includes a first outer core having an elongate member having proximal end and a distal end, the first outer core having a first proximal aperture at the proximal end, a first distal aperture at the distal end, and a first passage connecting the first proximal aperture with the first distal aperture and defining a first interior surface of the first outer core and a set of connectors at a proximal end of the elongate member, the protruding members designed to connect to ports of at least one of a dental syringe or an adaptor, wherein the diameter of the first proximal aperture is not equal to the diameter of the first distal aperture and wherein the passage tapers from the proximal aperture to the distal aperture.

In some arrangements, a syringe tip includes an outer core comprising an elongate member having a proximal end and a distal end, the first outer core having a proximal aperture at the proximal end, a distal aperture at the distal end, and a passage connecting the proximal aperture with the distal aperture and defining an interior surface of the outer core and a carrier assembly including a carrier and an inner core, the inner core coupled with the carrier, the carrier assembly configured to be inserted into the passage of the outer core.

In some arrangements, a method for preparing a syringe tip can include the steps of providing a first outer core having at least one passage, at least one inner core configured to be received with the at least one passage, and at least one carrier configured to couple with at least one inner core and inserting the inner core and carrier into the at least one passage of the first outer core.

Further features and advantages of the present invention will become apparent from the detailed description of preferred embodiments which follows, when considered together with the attached drawings and claims.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 3A is a perspective view an embodiment of an angled syringe tip having an outer core with a partially rounded rectangular cross-section, two connectors located at a proximal end, and an offset feature.

FIG. 3B is a front view of the angled syringe tip of FIG. 3A.

FIG. 3C is a cross-sectional view of the angled syringe tip of FIG. 3A.

FIG. 4A is a side view of an embodiment of a syringe tip having a straight design.

FIG. 4B is a side view of an embodiment of a syringe tip having a single bend design, the bend having an acute angle.

FIG. 4C is a side view of an embodiment of a syringe tip having a single bend design, the bend having a right angle.

FIG. 4D is a side view of an embodiment of a syringe tip having a double bend design, the bends having acute angles.

FIG. 4E is a side view of an embodiment of a syringe tip having a triple bend design, the bends having acute angles.

FIG. 6A is a front cross-sectional view of an embodiment of a syringe tip having an outer core with a circular cross section and circular opening.

FIG. 6B is a front cross-sectional view of an embodiment of a syringe tip having an outer core with a square cross section and multi-pointed opening.

FIG. 6C is a front cross-sectional view of an embodiment of a syringe tip having an outer core with a pentagonal cross section and circular opening.

FIG. 6D is a front cross-sectional view of an embodiment of a syringe tip having an outer core with a hexagonal cross section and circular opening.

FIG. 6E is a front cross-sectional view of an embodiment of a syringe tip having an outer core with a circular cross section and cross-shaped opening.

FIG. 6F is a front cross-sectional view of an embodiment of a syringe tip having an outer core with a pentagonal cross section and triangular opening.

FIG. 7A is a front cross-sectional view of an embodiment of a syringe tip having an outer core with an oval cross section and two circular openings.

FIG. 7B is a front cross-sectional view of an embodiment of a syringe tip having an outer core with a rectangular cross section and two circular openings.

FIG. 7C is a front cross-sectional view of an embodiment of a syringe tip having an outer core with a rounded rectangular cross section and two circular openings.

FIG. 7D is a front cross-sectional view of an embodiment of a syringe tip having an outer core with an "8-shaped" cross section and two circular openings.

FIG. 8A is a side, cross-sectional view of an embodiment of a syringe tip having an outer core with two equal diameter, no-taper passages.

FIG. 8B is a side cross-sectional view of an embodiment of a syringe tip having an outer core with two unequal diameter, no-taper passages.

FIG. 9A is a side cross-sectional view of an embodiment of a syringe tip having an outer core with two narrowing taper passages.

FIG. 9B is a side cross-sectional view of another embodiment of a syringe tip having an outer core with two narrowing taper passages.

FIG. 9C is a side cross-sectional view of another embodiment of a syringe tip having an outer core with two narrowing taper passages having different degrees of taper.

FIG. 10A is a side cross-sectional view of an embodiment of a syringe tip having an outer core with two expanding taper passages.

FIG. 10B is a side cross-sectional view of another embodiment of a syringe tip having an outer core with two expanding taper passages.

FIG. 10C is a side cross-sectional view of another embodiment of a syringe tip having an outer core with two expanding taper passages having different degrees of taper.

FIG. 11A is a side cross-sectional view of an embodiment of a syringe tip having an outer core with a no-taper passage and a narrowing taper passage.

FIG. 11B is a side cross-sectional view of an embodiment of a syringe tip having an outer core with a no-taper passage and an expanding taper passage.

FIG. 12A is a side cross-sectional view of an embodiment of a syringe tip having an outer core with two-staged tapering, the first stage having a no-taper passage and the second stage having a narrowing taper passage.

FIG. 12B is a side cross-sectional view of an embodiment of a syringe tip having an outer core with three-staged tapering, the first stage having a no-taper passage, the second stage having a narrowing taper passage, and the third stage having a no-taper passage.

FIG. 13A is a side cross-sectional view of an embodiment of a syringe tip having an outer core with two-staged tapering, the first stage having a no-taper passage and the second stage having an expanding taper passage.

FIG. 13B is a side cross-sectional view of an embodiment of a syringe tip having an outer core with three-staged tapering, the first stage having a no-taper passage, the second stage having an expanding taper passage, and the third stage having a no-taper passage.

FIG. 14A is a side cross-sectional view of an embodiment of a syringe tip having an outer core with a passage which splits into multiple sub-passages.

FIG. 14B is a front cross-sectional view of the embodiment of FIG. 14A.

FIG. 14C is a front cross-sectional view of an embodiment of a syringe tip having an outer core with four top openings and a single bottom opening.

FIG. 14D is front cross-sectional view of an embodiment of a syringe tip having an outer core with four top openings and two bottom openings.

FIGS. 15A-J are side cross-sectional views of embodiments of a syringe tip having an outer core with two no-taper passages and threaded retention features located at various positions of the passages.

FIGS. 16A-F are side cross-sectional views of embodiments of a syringe tip having an outer core with two narrowing taper passages and threaded retention features located at various positions of one or both of the passages.

FIGS. 17A-D are side cross-sectional views of embodiments of a syringe tip having an outer core with two expanding taper passages and threaded retention features located at various positions of one or both of the passages.

FIGS. 18A-J are side cross-sectional views of embodiments of a syringe tip having an outer core with two no-taper passages and clip mechanism retention features located at various positions of one or both of the passages.

FIGS. 19A-F are side cross-sectional views of embodiments of a syringe tip having an outer core with two narrowing taper passages and clip mechanism retention features located at various positions of one or both of the passages.

FIGS. 20A-D are side cross-sectional views of embodiments of a syringe tip having an outer core with two expanding taper passages and clip mechanism retention features located at various positions of one or both of the passages.

FIGS. 21A-B are side cross-sectional view of embodiments of a syringe tip having an outer core with two no-taper passages and injectable threading retention feature located on one or both of the passages.

FIGS. 22A-D are side cross-sectional view of embodiments of a syringe tip having an outer core with two narrowing taper passages and injectable threading retention feature located on one or both of the passages.

FIGS. 23A-B are side cross-sectional view of embodiments of a syringe tip having an outer core with two expanding taper passages and injectable threading retention feature located on one or both of the passages.

FIG. 24A is side cross-sectional view of embodiments of a syringe tip having an outer core with two no-taper passages, an injectable threading retention feature, and a threaded retention feature.

FIG. 24B is side cross-sectional view of embodiments of a syringe tip having an outer core with two no-taper passages, an injectable threading retention feature, and a clip mechanism retention feature.

FIG. 25A is a side view of an embodiment of a port connector having a threaded outer surface.

FIG. 25B is a side view of an embodiment of a port connector having a threaded outer surface and beveled connecting edge.

FIG. 25C is a side view of an embodiment of a port connector having a beveled connecting edge.

FIG. 25D is a side view of an embodiment of a port connector having a beveled leading edge and clip mechanism retention feature in the form of a ramp.

FIG. 25E is a side view of an embodiment of a port connector having a beveled leading edge and a clip mechanism retention feature in the form of a slot.

FIG. 25F is a side view of an embodiment of a port connector having a beveled leading edge and multiple protruding retention features.

FIG. 26A is a side view of an embodiment of a tapered port connector.

FIG. 26B is a side view of an embodiment of a tapered port connector having a clip mechanism retention feature in the form of a ramp.

FIG. 26C is a side view of an embodiment of a tapered port connector having a clip mechanism retention feature in the form of a slot.

FIGS. 27A-H are side cross-sectional views of embodiments of a syringe tip having an outer core with two no-taper passages, one or both of the passages having connectors located at various positions.

FIGS. 28A-J are side cross-sectional views of embodiments of a syringe tip having an outer core with two no-taper passages, one or both of the passages having connectors and threaded retention features located at various positions.

FIGS. 29A-J are side cross-sectional views of embodiments of a syringe tip having an outer core with two no-taper passages, one or both of the passages having connectors and clip mechanism retention features located at various positions.

FIGS. 30A-I are side cross-sectional views of embodiments of a syringe tip having an outer core with two narrowing taper passages, one or both of the passages having connectors located at various positions.

FIGS. 31A-C are side cross-sectional views of embodiments of a syringe tip having an outer core with two expanding taper passages, one or both of the passages having connectors located at various positions.

FIGS. 32A-H are side cross-sectional views of embodiments of a syringe tip having an outer core with two narrowing taper passages, one or both of the passages having connectors and threaded retention features located at various positions.

FIG. 34A is a side cross-sectional view of an embodiment of a syringe tip having an outer core with two passages and a connector located on a lateral side of the outer core.

FIG. 34B is a side cross-sectional view of an embodiment of a syringe tip having an outer core with two passages and a connector angled towards the proximal end.

FIG. 34C is a side cross-sectional view of an embodiment of a syringe tip having an outer core with two passages and a connector angled towards the distal end.

FIG. 35A is a side cross-sectional view of an embodiment of a syringe tip having an outer core with a passage and a partial passage at a connector.

FIG. 35B is a side cross-sectional view of an embodiment of a syringe tip having an outer core with a passage and two partial passages at two connectors.

FIG. 36A is a side cross-sectional view of an embodiment of a syringe tip having an outer core with two passages and a connector.

FIG. 36B is a side cross-sectional view of an embodiment of a syringe tip having an outer core with two passages and two connectors.

FIGS. 37A-B are side cross-sectional views of embodiments of a syringe tip having an outer core with two narrowing taper passages and two connectors.

FIGS. 38A-B are side cross-sectional views of embodiments of a syringe tip having an outer core with two passages, connectors, and retention features.

FIG. 39A is a side cross-sectional view of an embodiment of a syringe tip having two outer cores each with a single passage and a dovetail interlock mechanism.

FIG. 39B is a sectional view of the embodiment of the syringe tip of FIG. 39A along line B-B.

FIG. 40A is a side cross-sectional view of an embodiment of a syringe tip having two outer cores each with a single passage and a dowel-fit interlock mechanism.

FIG. 40B is a sectional view of the embodiment of the syringe tip of FIG. 40A along line C-C.

FIGS. 41A-B are side cross-sectional views of embodiments of a syringe tip having two outer cores each with a single, narrowing taper passage and a dovetail interlock mechanism.

FIG. 42 is a side cross-sectional view of an embodiment of a syringe tip having two outer cores each with a single, expanding taper passage and a dovetail interlock mechanism.

FIG. 43 is a side cross-sectional view of an embodiment of a syringe tip having an outer core with a no-taper passage and an outer core with a narrowing taper passage, each with a dovetail interlock mechanism.

FIG. 44 is a side cross-sectional view of an embodiment of a syringe tip having an outer core with a narrowing taper passage and an outer core with an expanding taper passage, each with a dovetail interlock mechanism.

FIG. 45 is a side cross-sectional view of an embodiment of a syringe tip having an outer core with two no-taper passages and an outer core with an expanding taper passage, each with a dovetail interlock mechanism.

FIG. 46 is a side cross-sectional view of a no-taper inner core having constant wall thickness.

FIGS. 47A-B are side cross-sectional views of a no-taper inner core having variable wall thickness.

FIG. 48 is a side cross-sectional view of an embodiment of a narrowing taper inner core having constant wall thickness.

FIG. 49 is a side cross-sectional view of an embodiment of a narrowing taper inner core having variable wall thickness.

FIG. 50A is a perspective view of an embodiment of a full length, no-taper inner core.

FIG. 50B is a side, partial cross-sectional view of the inner core of FIG. 50A within an outer core having two no-taper passages.

FIG. 51A is a perspective view of an embodiment of a partial length, no-taper inner core.

FIG. 51B is a side, partial cross-sectional view of the inner core of FIG. 51A within an outer core having two no-taper passages.

FIG. 52A is a perspective view of another embodiment of a partial length, no-taper inner core.

FIG. 52B is a side, partial cross-sectional view of the inner core of FIG. 52A within an outer core having two narrowing taper passages.

FIG. 53A is a perspective view of an embodiment of a full length, narrowing taper inner core.

FIG. 53B is a side, partial cross-sectional view of the inner core of FIG. 53A within an outer core having two narrowing taper passages.

FIG. 53C is a perspective view of another embodiment of a full length narrowing taper inner core.

FIG. 53D is a side, partial cross-sectional view of the inner core of FIG. 53C within an outer core having two narrowing taper passages.

FIG. 54A is a perspective view of an embodiment of a partial length, narrowing taper inner core.

FIG. 54B is a side, partial cross-sectional view of the inner core of FIG. 54A within an outer core having two narrowing taper passages.

FIG. 54C is a perspective view of another embodiment of a partial length, narrowing taper inner core.

FIG. 54D is a side, partial cross-sectional view of the inner core of FIG. 54C within an outer core having two narrowing taper passages.

FIG. 55A is a perspective view of an embodiment of a full length, no-taper inner core having a threaded retention feature.

FIG. 55B is a side, partial cross-sectional view of the inner core of FIG. 55A within an outer core having two no-taper passages and threaded retention features.

FIG. 56A is a perspective view of an embodiment of a partial length, no-taper inner core having a threaded retention feature.

FIG. 56B is a side, partial cross-sectional view of the inner core of FIG. 56A within an outer core having two no-taper passages and threaded retention features.

FIG. 57A is a perspective view of another embodiment of a partial length, no-taper inner core having a threaded retention feature.

FIG. 57B is a side, partial cross-sectional view of the inner core of FIG. 57A within an outer core having two narrowing taper passages and threaded retention features.

FIG. 58A is a perspective view of an embodiment of a full length, no-taper inner core having multiple threaded retention features.

FIG. 58B is a side, partial cross-sectional view of the inner core of FIG. 58A within an outer core having two no-taper passages and multiple threaded retention features.

FIG. 59A is a perspective view of an embodiment of an extended length, no-taper inner core having multiple threaded retention features.

FIG. 59B is a side, partial cross-sectional view of the inner core of FIG. 59A within an outer core having two no-taper passages and multiple threaded retention features.

FIG. 60B is a side, partial cross-sectional view of the inner core of FIG. 60A within an outer core having two narrowing taper passages and threaded retention features.

FIG. 60C is a perspective view of another embodiment of a full length, narrowing taper inner core having a threaded retention feature.

FIG. 60D is a side, partial cross-sectional view of the inner core of FIG. 60C within an outer core having two narrowing taper passages and threaded retention features.

FIG. 61A is a perspective view of an embodiment of a partial length, narrowing taper inner core having a threaded retention feature.

FIG. 61B is a side, partial cross-sectional view of the inner core of FIG. 61A within an outer core having two narrowing taper passages and threaded retention features.

FIG. 61C is a perspective view of another embodiment of a partial length narrowing taper inner core having a threaded retention feature.

FIG. 61D is a side, partial cross-sectional view of the inner core of FIG. 61C within an outer core having two narrowing taper passages and threaded retention features.

FIG. 62A is a perspective view of an embodiment of a full length, no-taper inner core having a clip mechanism retention feature.

FIG. 62B is a side, partial cross-sectional view of the inner core of FIG. 62A within an outer core having two no-taper passages and clip mechanism retention features.

FIG. 63A is a perspective view of an embodiment of a partial length, no-taper inner core having a clip mechanism retention feature.

FIG. 63B is a side, partial cross-sectional view of the inner core of FIG. 63A within an outer core having two no-taper passages and clip mechanism retention features.

FIG. 64A is a perspective view of another embodiment of a partial length, no-taper inner core having a clip mechanism retention feature.

Figure 1A:
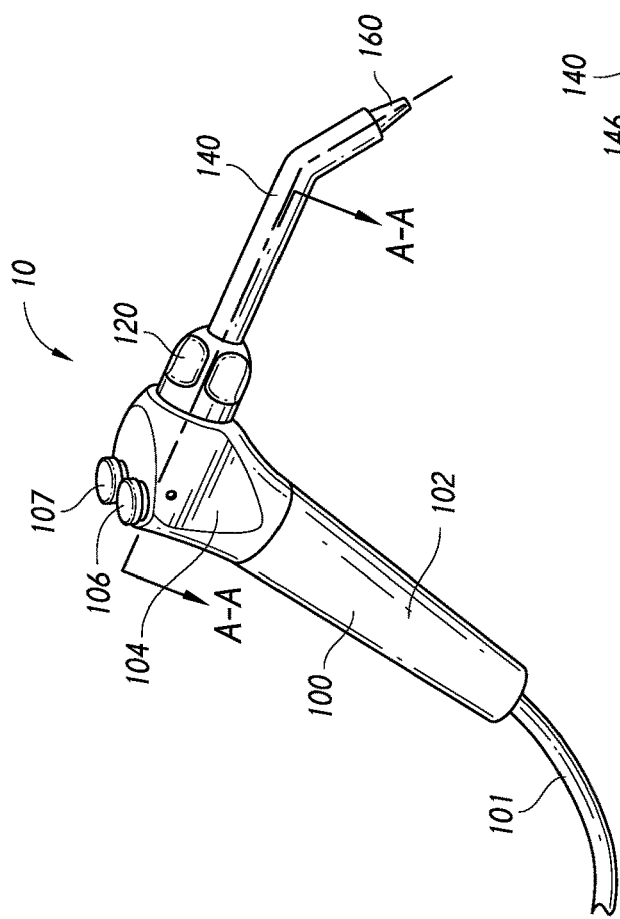
FIG. 1A is a perspective view of an embodiment of a dental syringe system having a dental syringe, an adaptor, a syringe tip, and a tip modification.

FIG. 64B is a side, partial cross-sectional view of the inner core of FIG. 64A within an outer core having two narrowing taper passages and clip mechanism retention features.

FIG. 65A is a perspective view of an embodiment of a full length, no-taper inner core having multiple clip mechanism retention features.

FIG. 65B is a side, partial cross-sectional view of the inner core of FIG. 65A within an outer core having two no-taper passages and multiple clip mechanism retention features.

FIG. 66A is a perspective view of an embodiment of an extended length, no-taper inner core having multiple clip mechanism retention features.

FIG. 66B is a side, partial cross-sectional view of the inner core of FIG. 66A within an outer core having two no-taper passages and multiple clip mechanism retention features.

FIG. 67A is a perspective view of an embodiment of a full length, narrowing taper inner core having a clip mechanism retention feature.

FIG. 67B is a side, partial cross-sectional view of the inner core of FIG. 67A within an outer core having two narrowing taper passages and clip mechanism retention features.

FIG. 67C is a perspective view of another embodiment of a full length, narrowing taper inner core having a clip mechanism retention feature.

FIG. 67D is a side, partial cross-sectional view of the inner core of FIG. 67C within an outer core having two narrowing taper passages and clip mechanism retention features.

FIG. 68A is a perspective view of an embodiment of a partial length, narrowing taper inner core having a clip mechanism retention feature.

FIG. 68B is a side, partial cross-sectional view of the inner core of FIG. 68A within an outer core having two narrowing taper passages and clip mechanism retention features.

FIG. 68C is a perspective view of another embodiment of a partial length narrowing taper inner core having a clip mechanism retention feature.

FIG. 68D is a side, partial cross-sectional view of the inner core of FIG. 68C within an outer core having two narrowing taper passages and clip mechanism retention features.

FIG. 69A is an embodiment of an inner core having a clip mechanism retention feature in the form of an annular protrusion.

FIG. 69B is an embodiment of an inner core having a clip mechanism retention feature in the form of a ramp.

FIG. 70A is a perspective view of an embodiment of a carrier having two holders.

FIG. 70B is a side cross-sectional view of the carrier of FIG. 70A.

FIG. 71A is a perspective view of an embodiment of a carrier having two holders with one holder having a threaded retention feature.

FIG. 71B is a side cross-sectional view of the carrier of FIG. 71A.

FIG. 71C is a perspective view of an embodiment of a carrier having two holders with both holders having threaded retention features.

FIG. 71D is a side cross-sectional view of the carrier of FIG. 71C.

FIG. 72A is a perspective view of an embodiment of a carrier having two holders with one holder having a clip mechanism retention feature.

FIG. 72B is a side cross-sectional view of the carrier of FIG. 72A.

FIG. 72C is a perspective view of an embodiment of a carrier having two holders with both holders having clip mechanism retention features.

FIG. 72D is a side cross-sectional view of the carrier of FIG. 72C.

FIG. 73A is a perspective view of an embodiment of a carrier having two holders and a clip mechanism.

FIG. 73B is a side cross-sectional view of the carrier of FIG. 73A.

FIG. 74A is a perspective view of an embodiment of a carrier having two holders and a clip mechanism with one holder having a threaded retention feature.

FIG. 74B is a side cross-sectional view of the carrier of FIG. 74A.

FIG. 74C is a perspective view of an embodiment of a carrier having two holders and a clip mechanism with both holders having threaded retention features.

FIG. 74D is a side cross-sectional view of the carrier of FIG. 74C.

FIG. 75A is a perspective view of an embodiment of a carrier having two holders and a clip mechanism with one holder having a clip mechanism retention feature.

FIG. 75B is a side cross-sectional view of the carrier of FIG. 75A.

FIG. 75C is a perspective view of an embodiment of a carrier having two holders and a clip mechanism with both holders having clip mechanism retention features.

FIG. 75D is a side cross-sectional view of the carrier of FIG. 90C.

FIG. 76 is a perspective view of an embodiment of a carrier having two partial length inner cores and a clip mechanism.

FIG. 77A is a side view of an embodiment of a two-piece carrier in an attached configuration.

FIG. 77B is a side view of an embodiment of a two-piece carrier in a detached configuration.

FIG. 78A is a side, partial cross-sectional view of an embodiment of a carrier having an integral, full length, no-taper inner core with a holder having a threaded retention feature.

FIG. 78B is a side, partial cross-sectional view of the carrier of FIG. 93A having a full length inner core attached.

FIG. 78C is a side, partial cross-sectional view of the carrier of FIG. 93A having a partial length inner core attached.

Figure 79:
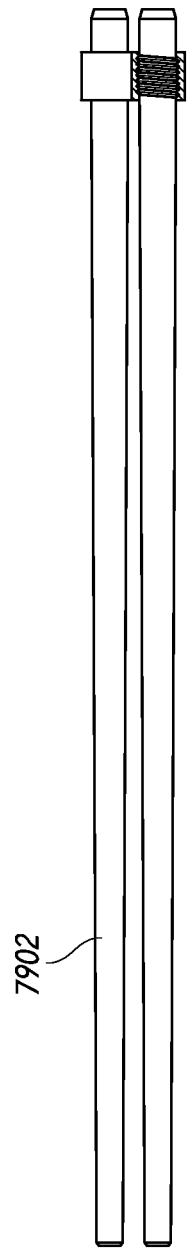

FIG. 79 is a side, partial cross-sectional view of an embodiment of a carrier having an integral, full length, narrowing taper inner core with a second full length, narrowing taper inner core attached.

Figure 80:
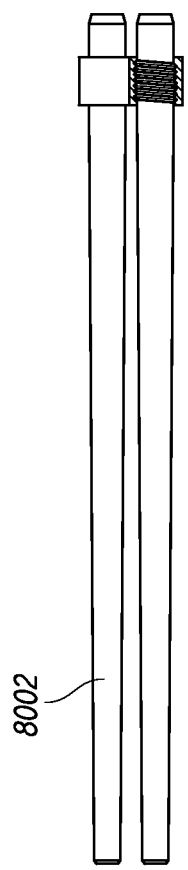

FIG. 80 is a side, partial cross-sectional view of an embodiment of a carrier having an integral, partial length inner core with a second partial length inner core attached.

Figure 81:
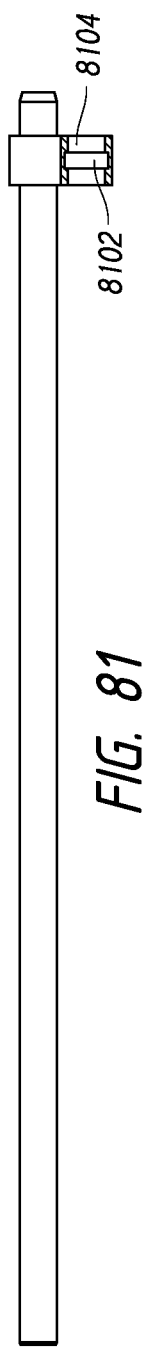

FIG. 81 is a side, partial cross-sectional view of an embodiment of a carrier having an integral, full length inner core with a holder having a clip mechanism retention feature.

Figure 82:
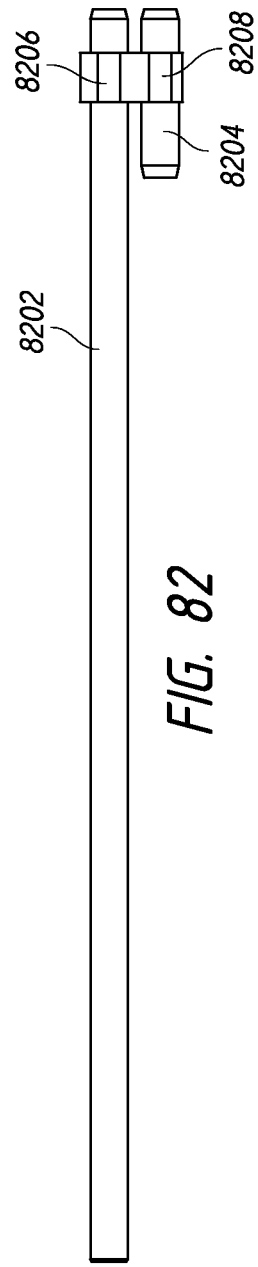

FIG. 82 is a side, partial cross-sectional view of an embodiment of a carrier having an integral, full length inner core and an integral, partial length inner core.

Figure 83:
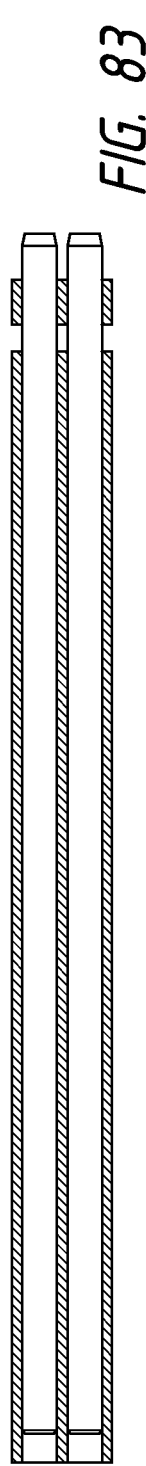

FIG. 83 is a side, partial cross-sectional view of an embodiment of a syringe tip system having an outer core with no-taper passages, full length, no-taper inner cores, and a carrier.

Figure 84A:
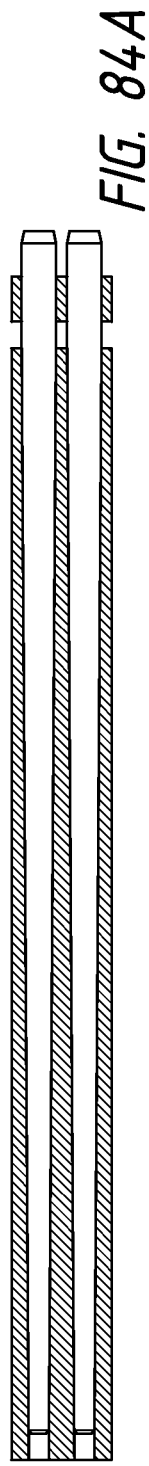

FIG. 84A is a side, partial cross-sectional view of an embodiment of a syringe tip system having an outer core with narrowing taper passages, full length, narrowing taper inner cores, and a carrier.

Figure 84B:
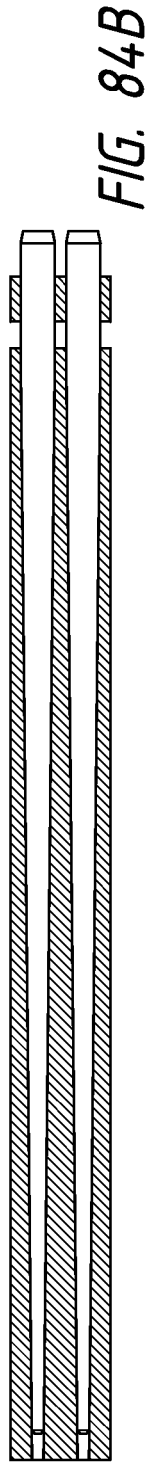

FIG. 84B is a side, partial cross-sectional view of another embodiment of a syringe tip system having an outer core with narrowing taper passages, full length, narrowing taper inner cores, and a carrier.

Figure 85:
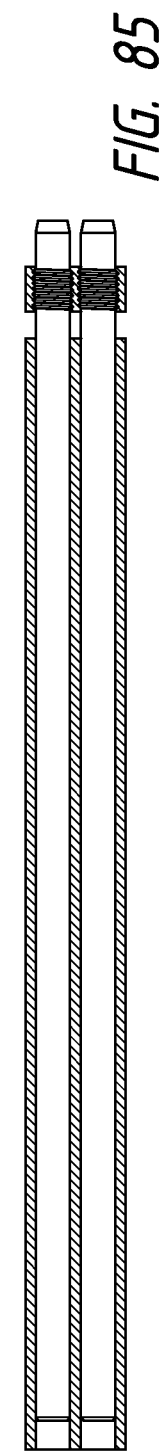

FIG. 85 is a side, partial cross-sectional view of another embodiment of a syringe tip system having an outer core with no-taper passages, full length, no-taper inner cores with threaded retention features, and a carrier with threaded retention features.

Figure 86A:
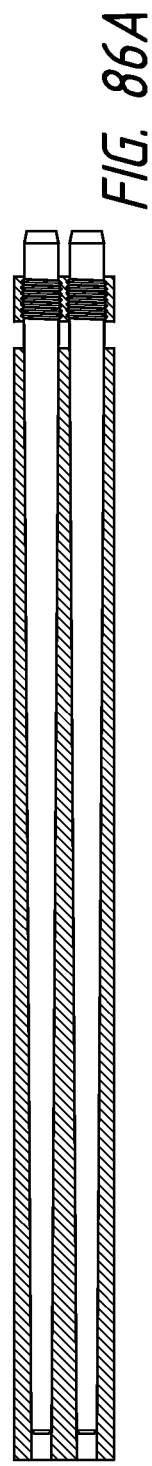

FIG. 86A is a side, partial cross-sectional view of an embodiment of a syringe tip system having an outer core with narrowing taper passages, full length, narrowing taper inner cores with threaded retention features, and a carrier with threaded retention features.

Figure 86B:
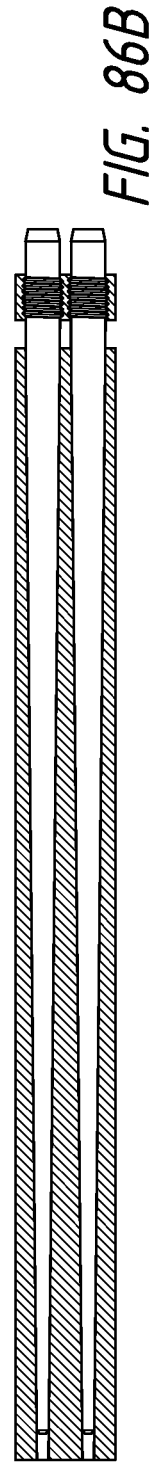

FIG. 86B is a side, partial cross-sectional view of another embodiment of a syringe tip system having an outer core with narrowing taper passages, full length, narrowing taper inner cores with threaded retention features, and a carrier with threaded retention features.

Figure 87:
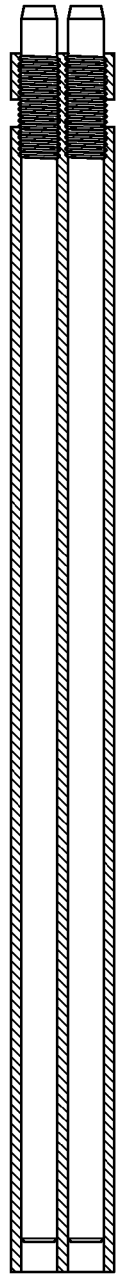

FIG. 87 is a side, partial cross-sectional view of an embodiment of a syringe tip system having an outer core with no-taper passages and threaded retention features, full length, no-taper inner cores with threaded retention features, and a carrier with threaded retention features.

Figure 88A:
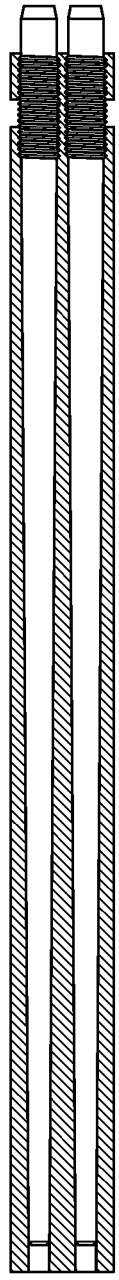

FIG. 88A is a side, partial cross-sectional view of an embodiment of a syringe tip system having an outer core with narrowing taper passages and threaded retention features, full length, narrowing taper inner cores with threaded retention features, and a carrier with threaded retention features.

Figure 88B:
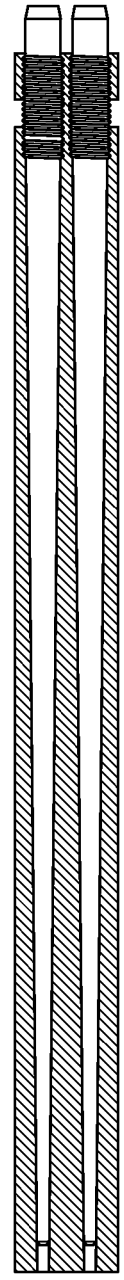

FIG. 88B is a side, partial cross-sectional view of another embodiment of a syringe tip system having an outer core with narrowing taper passages with threaded retention features, full length, narrowing taper inner cores with threaded retention features, and a carrier with threaded retention features.

Figure 89A:
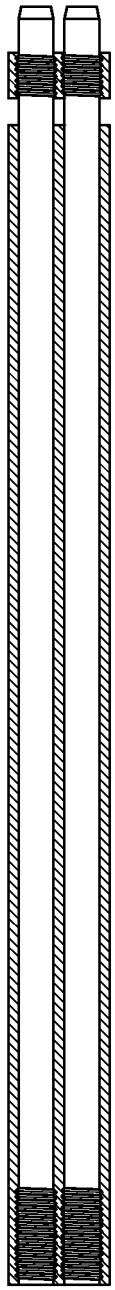

FIG. 89A is a side, partial cross-sectional view of an embodiment of a syringe tip system having an outer core with no-taper passages with threaded retention features, full length inner cores with threaded retention features, and a carrier with threaded retention features.

Figure 89B:
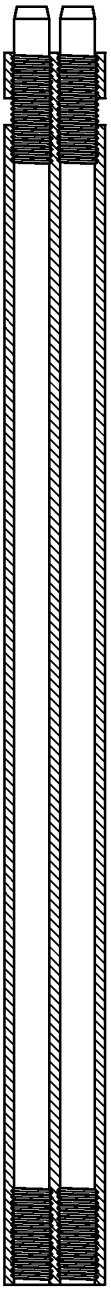

FIG. 89B is a side, partial cross-sectional view of another embodiment of a syringe tip system having an outer core with no-taper passages with threaded retention features, full length inner cores with threaded retention features, and a carrier with threaded retention features.

Figure 90:
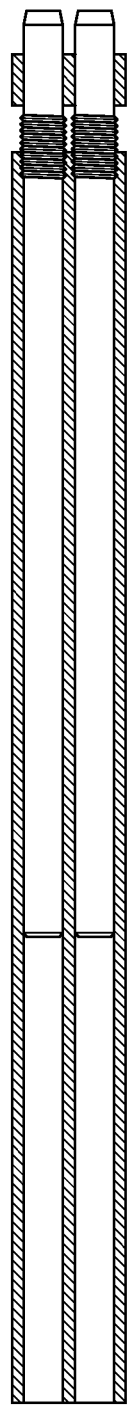

FIG. 90 is a side, partial cross-sectional view of an embodiment of a syringe tip system having an outer core with no-taper passages and threaded retention features, partial length, no-taper inner cores with threaded retention features, and a carrier.

Figure 91A:
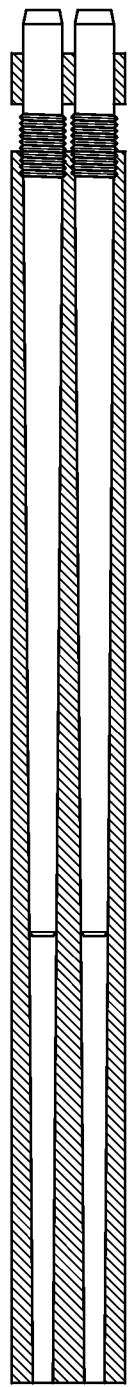

FIG. 91A is a side, partial cross-sectional view of an embodiment of a syringe tip system having an outer core with narrowing taper passages and threaded retention features, partial length, narrowing taper inner cores with threaded retention features, and a carrier.

Figure 91B:
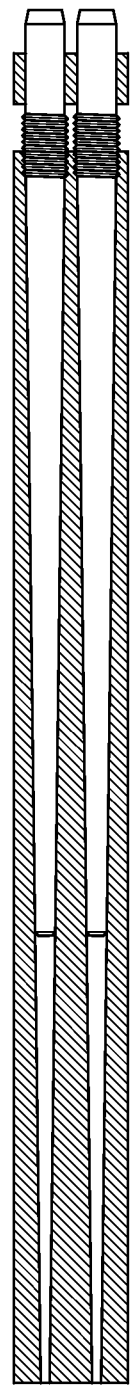

FIG. 91B is a side, partial cross-sectional view of another embodiment of a syringe tip system having an outer core with narrowing taper passages, partial length, narrowing taper inner cores, and a carrier.

Figure 92A:
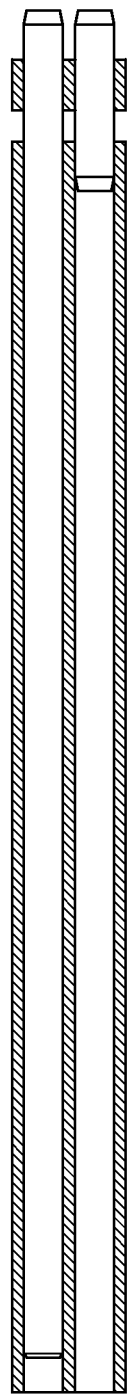

FIG. 92A is a side, partial cross-sectional view of an embodiment of a syringe tip system having an outer core, and a full length inner core and partial length inner core integrated in a carrier.

Figure 92B:
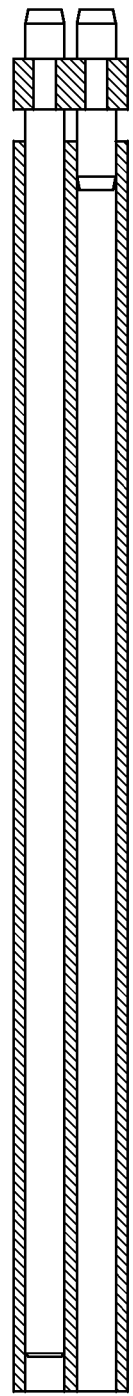

FIG. 92B is a cross-sectional view of the syringe tip system of FIG. 92A.

Figure 93:
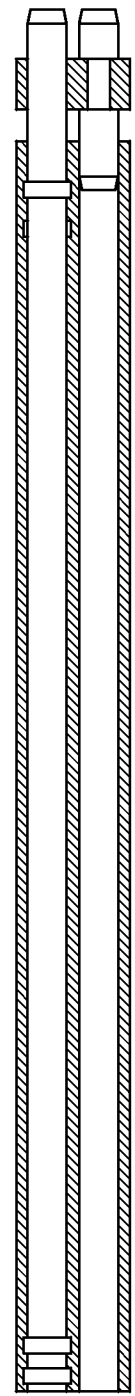

FIG. 93 is a side, partial cross-sectional view of a syringe tip system having an outer core, a full length inner core with clip mechanism retention features, and a partial length inner core integrated in a carrier.

FIG. 94 is a side view of an embodiment of a syringe tip having a hinged retention feature.

FIG. 95 is a sectional view of the embodiment of the syringe tip of FIG. 94 along line D-D in a first configuration.

FIG. 96 is a sectional view of the embodiment of the syringe tip of FIG. 94 along line D-D in a second configuration.

FIG. 97 is a side cross-sectional view of an embodiment of a syringe tip having an outer core with a ribbed retention feature along an outer surface.

FIG. 98A is a side cross-sectional view of an embodiment of a syringe tip having an outer core with a finned retention feature along an outer surface.

FIG. 98B is a front view of the proximal end of the syringe tip of FIG. 98A.

FIG. 99A is a side cross-sectional view of an embodiment of a syringe tip having an outer core with a finned retention feature along an inner surface.

FIG. 99B is a front view of the proximal end of the syringe tip of FIG. 99A.

FIG. 100 is a side cross-sectional view of an embodiment of a syringe tip having an outer core with a harpoon retention feature along an outer surface.

FIG. 101A is a side view of an embodiment of a syringe tip having a separate retention feature in a disconnected configuration.

FIG. 101B is a side view of an embodiment of a syringe tip having a separate retention feature in a connected configuration.

Figure 102A:
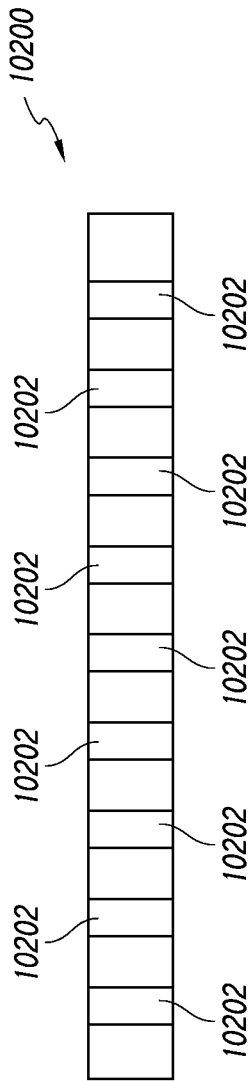

FIG. 102A is a top view of an embodiment of an outer core having transverse interlock features.

Figure 102B:
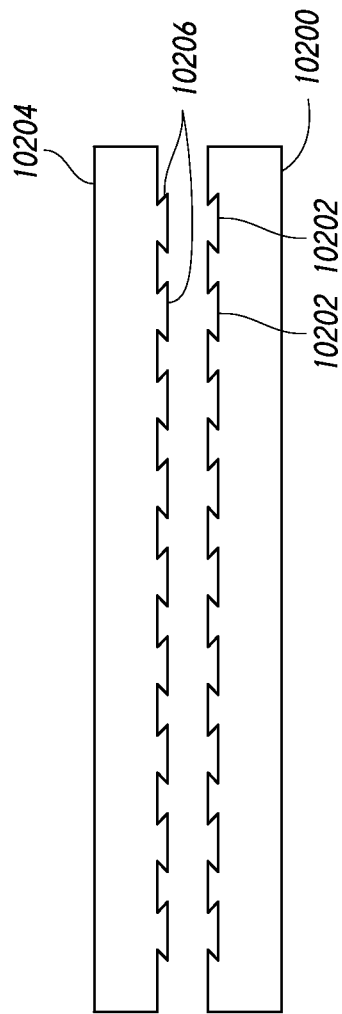

FIG. 102B is a side view of the outer core of FIG. 102A with an embodiment of an outer core having corresponding interlock features.

Figure 103:
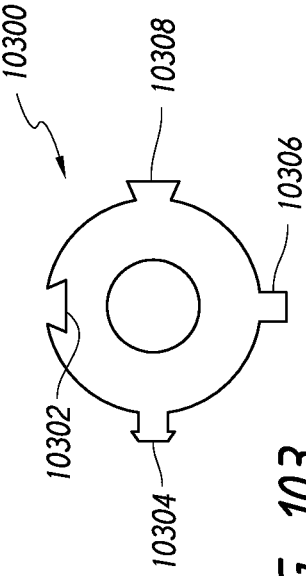

FIG. 103 is a front view of an embodiment of an outer core having multiple interlock features.

Figure 104:
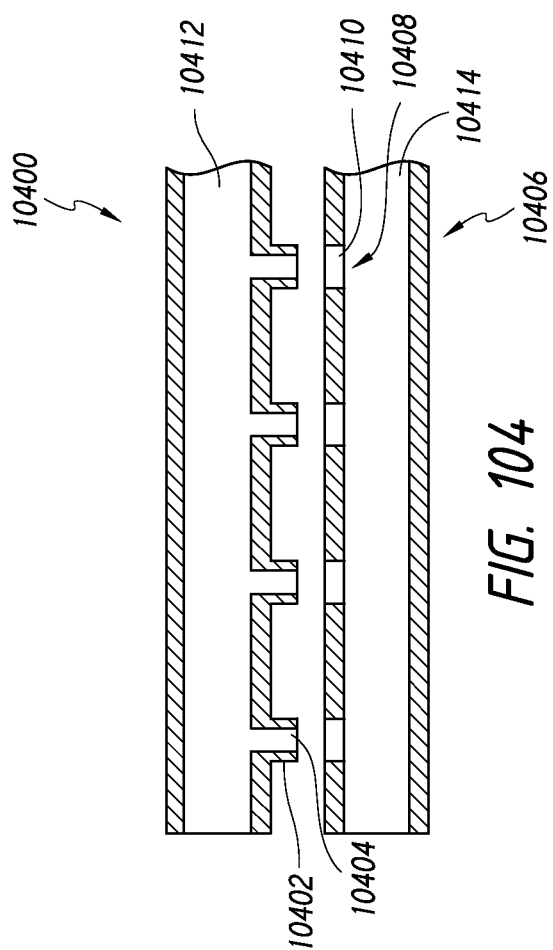

FIG. 104 is a side, cross-sectional view of an embodiment of a syringe tip having outer cores which include interlock features with passages.

Figure 105:
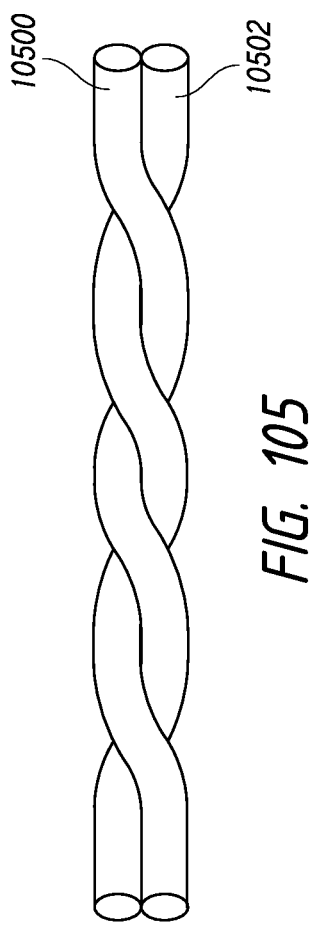

FIG. 105 is a side view of an embodiment of a syringe tip having outer cores with a helical shape.

FIG. 106 is a side view of an embodiment of an outer core having a coating applied to a portion of the outer core.

FIG. 107A is a side view of an embodiment of an inner core having channels along an outer surface.

FIG. 107B is a front view of the inner core of FIG. 107A inserted into an embodiment of an outer core.

FIG. 108 is a side view of an embodiment of an inner core having two channels which merge into a single channel.

Figure 109:
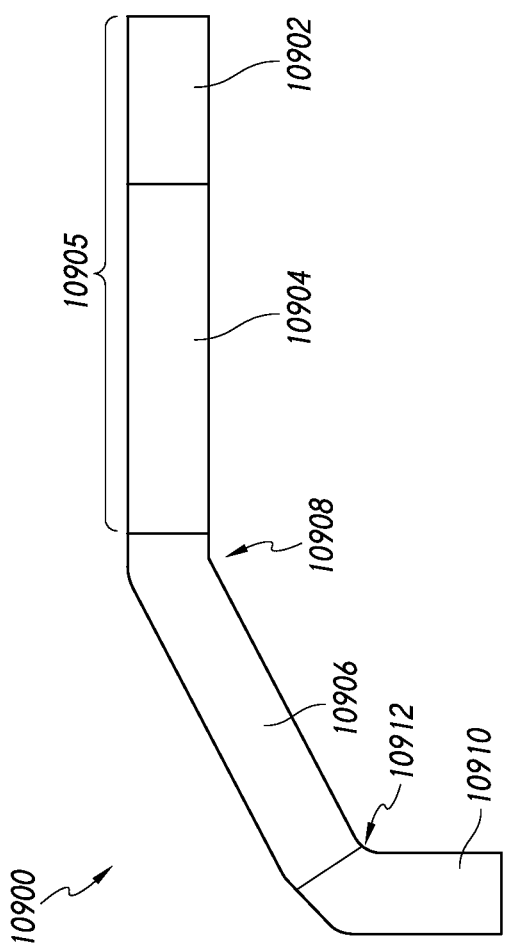

FIG. 109 is a side view of an embodiment of an outer core having multiple sub-components.

Figure 110:
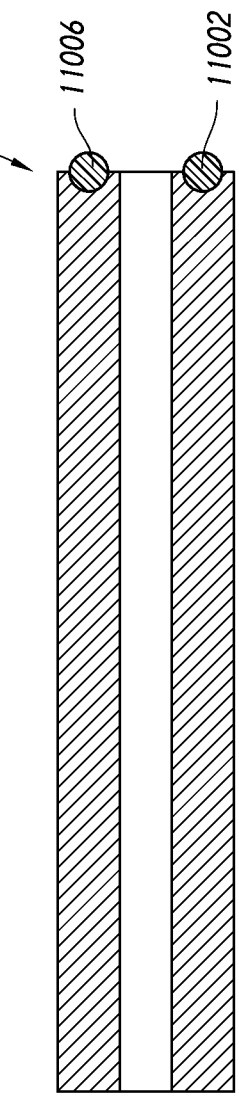

FIG. 110 is a side, cross-sectional view of an embodiment of an outer core having a sealing device.

DETAILED DESCRIPTION OF THE PREFERRED EMBODIMENT

As will be described, the present application relates to a syringe tip devices and system and methods for producing and using such a syringe tip device and system. It should be appreciated that while the figures and description herein often refers to syringe tips, which can be used on a dental syringe, in modified embodiments the syringe tips can be applied to other types of fluid flow devices in which a syringe tip can be used to direct the fluid flow from the fluid flow device. It should be appreciated that, for purposes of this disclosure, "fluid" includes gases, liquids, and solids capable of being transported via gas or liquid transport, such as solid powders and the like. For example, the term "fluid" can include abrasives, adhesives and other types of bonding chemicals, sealants, therapeutic agents such as anesthetics, medicines and antibiotics, CaOH pastes or powders, prophy paste, whitening gels, mouthwash, periodontal rinse solutions, and any other gas, liquid, solid or combination thereof.

Dental Syringe System

Figure 1B:
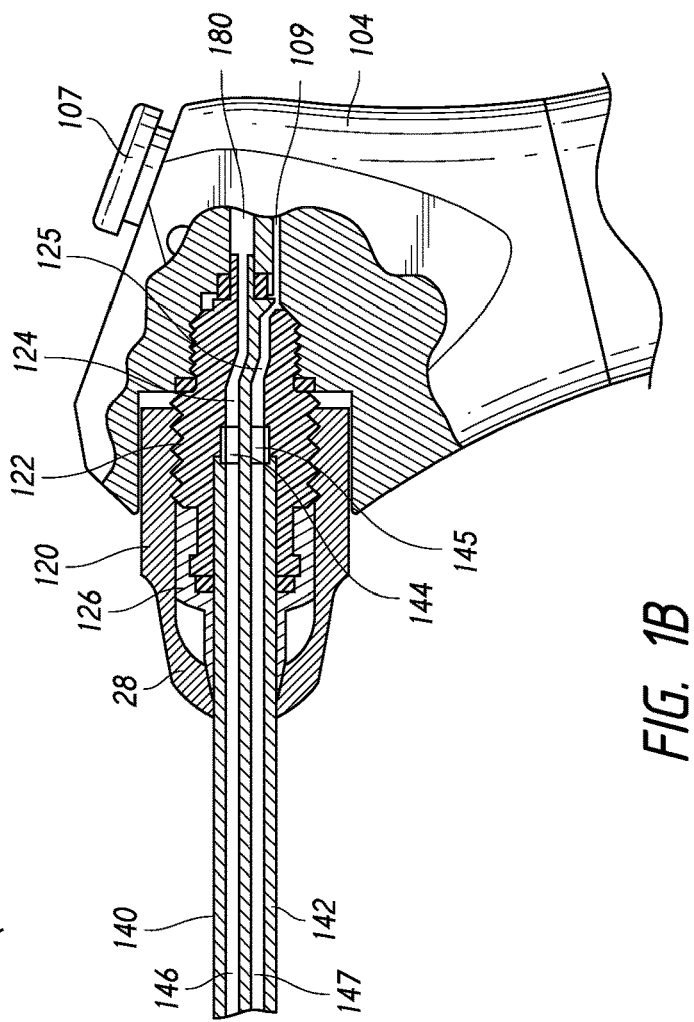
FIG. 1B is a cutaway view of the dental syringe system of FIG. 1A along A-A.

FIGS. 1A and 1B illustrate a general dental syringe system 10 which can include a dental syringe 100, a syringe tip adaptor 120, a syringe tip 140, and a tip modifier 160. The dental syringe 100 can be a handheld device which includes a conduit 101 for connecting the dental syringe 100 to a console (not shown) or other source of one or more fluids, such as air, water, or any other fluid, to the dental syringe 100. The dental syringe can also include a handpiece 102, a head unit 104, and buttons 106 and 107 designed to operate valves (not shown) within the dental syringe 100 to control the flow of fluids through a first passage 108 and a second passage 109.

In some embodiments, the dental syringe 100 shown in FIGS. 1A and 1B, which has two buttons 106 and 107 capable of operating two separate valves, can control the flow of two fluids such as air and water. As is the case with many commercial embodiments of dental syringes, dental syringe 100 can control the flow of both air along a first passage 108 and water along a second passage 109. As should be apparent, the dental syringe 100 can be used to control the flow of other types of fluids and/or fluids having different operating parameters (e.g., high pressure air and low pressure air, high pressure water and lower pressure water, etc.). Furthermore, the dental syringe 100 can be designed with greater or fewer passages, valves, and/or buttons, to control the flow of one or more fluids through the device. Additionally, the dental syringe 100 can be designed to provide other operations in addition to controlling the flow of fluids through the device. For example, in some embodiments, additional features such as illumination devices can be incorporated into or made part of the dental syringe device to facilitate use of the device during a dental procedure.

With continued reference to FIGS. 1A and 1B, the syringe tip adaptor 120 can be designed to connect the syringe tip 140 to the dental syringe 100. In some embodiments, the syringe tip adaptor 120 can include a coupling member 122 designed to couple the dental syringe 100 and the syringe tip 140. As such, coupling member can have one or more passages designed to provide fluid communication between one or more passages of the dental syringe 100 and the syringe tip 140. For example, as shown the illustrated embodiment, the coupling member 122 can have a first passage 124 and a second passage 125 designed to provide fluid communication between the first passage 108 and second passage 109 of the dental syringe 100 and the first passage 146 and second passage 147 of the syringe tip 140. The syringe tip adaptor 120 can also include a collet member 126 and chuck member 128 designed to provide additional stability for a syringe tip 140 attached to the coupling member. The collet member 126 and chuck member 128 can be designed such that, when the chuck member 128 is tightened, the collet member 126 can impart a force upon the syringe tip 140 thereby reducing the likelihood that the syringe tip 140 will rotate and/or translate when attached to the coupling member 122. In some embodiments, the coupling member can include other mechanisms for attaching the syringe tip 140 to the dental syringe 100 such as a twist-lock mechanism (e.g., a bayonet mount), a push-pull mechanism, a snap fit and other types of coupling mechanisms.

While the illustrated embodiment shows a coupling member 122 having two passages 124 and 125 designed to provide fluid communication between passages 108 and 109 of the dental syringe 100 and passages 146 and 147 of the syringe tip 140, it should be apparent that the coupling member 122, like the dental syringe 100 and syringe tip 140, can have fewer or greater numbers of passages. Additionally, the coupling member 122 can have fewer or greater passages than either of the dental syringe 100 or the syringe tip 140. This can provide the ability for the coupling member 120 to convert a dental syringe designed for a first amount of fluids (e.g., air and water) to be used with a syringe tip designed for a second amount of fluids (e.g., only water). Multiple types of syringe tip adaptors 120 can be designed to be operable with a single design of syringe tip 140. This can advantageously allow the same syringe tip 140 to be compatible with a wide range of dental syringes 100. Conversely, multiple types of syringe tip adaptors 120 can be designed to be operable with a single design of dental syringe 100 which can advantageously allow use of multiple types of syringe tips 140 with a single dental syringe 100.

With continued reference to FIGS. 1A and 1B, the syringe tip 140 can be a generally elongate member 142 which can have a first connector 144 in fluid communication with a first passage 146 and second port connector 145 in fluid communication with a second passage 147. As shown in the illustrated embodiment, the connectors 144, 145 can be designed to attach to corresponding ports located on the syringe tip adaptor 120, such as the coupling member 122, the dental syringe 100, or any other attachment member. As such, the syringe tip 140 can be designed to permit the flow of fluid from the dental syringe 100 to a target location. The syringe tip 140 can be designed to be received into the mouth of a patient during a dental procedure.

In some embodiments, the connectors 144, 145 can be integrally formed on a proximal end of the syringe tip 140. In some embodiments, the connectors 144, 145 can be attached to the elongate member 142 after the elongate member 142 is manufactured. In some embodiment embodiments, the connectors 144, 145 can be designed to attach directly to the dental syringe 100 or via other attachment mechanisms known in the dental syringe art. Furthermore, as will be discussed in greater detail below, the syringe tip 140 can include multiple features designed to enhance the capabilities of the dental syringe 100.

In some embodiments, the syringe tip 140 can be designed to alter the discharge pressure of fluids from the dental syringe 100. For example, the syringe tip 140 can be designed to decrease or increase fluid pressure ejected from the distal end of the syringe tip 140. In some embodiments, this alteration of fluid pressure can be accomplished by altering the shape of the passages such as passages 146, 147. In some embodiments, the passages can decrease in overall cross-sectional area to create an increase in fluid pressure as it flows through the syringe tip 140. Conversely, the passages can increase in overall cross-sectional area to create a decrease in fluid pressure as it flows through the syringe tip 140.

In some embodiments, the syringe tip 140 can be designed to alter the discharge pattern (i.e., spray pattern) of fluid from the dental syringe 100. For example, the syringe tip 140 can be designed to convert a single passage from the dental syringe 100 into a multiple passages. In some embodiments, the syringe tip 140 can be designed such that a fluid, such as water, is discharged from multiple openings such that, rather than having a single stream of water, a multiple stream pattern is formed. Conversely, the syringe tip 140 can be designed to convert multiple passages from the dental syringe 100 into a single passage to combine fluids from different passages of the dental syringe 100.

In some embodiments, the syringe tip 140 can be designed to provide connectors at positions other than the ends of the syringe tip 140. For example, in some embodiments, connectors, such as connectors 144, 145, can be provided at other locations along the syringe tip 140. These connectors can be connected to existing passages, such as passages 146, 147, or can be connected to additional passages. These connectors can advantageously allow additional fluids, beyond those provided by the dental syringe 100, to be used together with the syringe tip 140. This can advantageously allow a dental practitioner to incorporate less commonly used fluids with the syringe tip 140. In some embodiments, the connectors can be used to connect the syringe tip 140 to other devices such as filters or storage devices for substrates.

With continued reference to FIG. 1A, the tip modifier 160 can be designed to further modify the discharge pressures and/or discharge patterns of the fluid ejected from the dental syringe system 10. For example, in some embodiments, the tip modifier 160 can be used to further increase or further decrease the fluid pressure. In some embodiments, the tip modifier 160 can combine multiple passages of the syringe tip 140 into a single output port. This combination of two or more fluid streams can result in an increased fluid pressure. Furthermore, it can result in a beneficial combination of two or more fluids such as air and water to provide an aerated water fluid flow. As will be discussed in further detail below, in some embodiments, the syringe tip 140 can have multiple features, such as retention features, for connecting one or more tip modifiers 160 to the syringe tip 140.

Syringe Tip General Construction

Figure 2C:
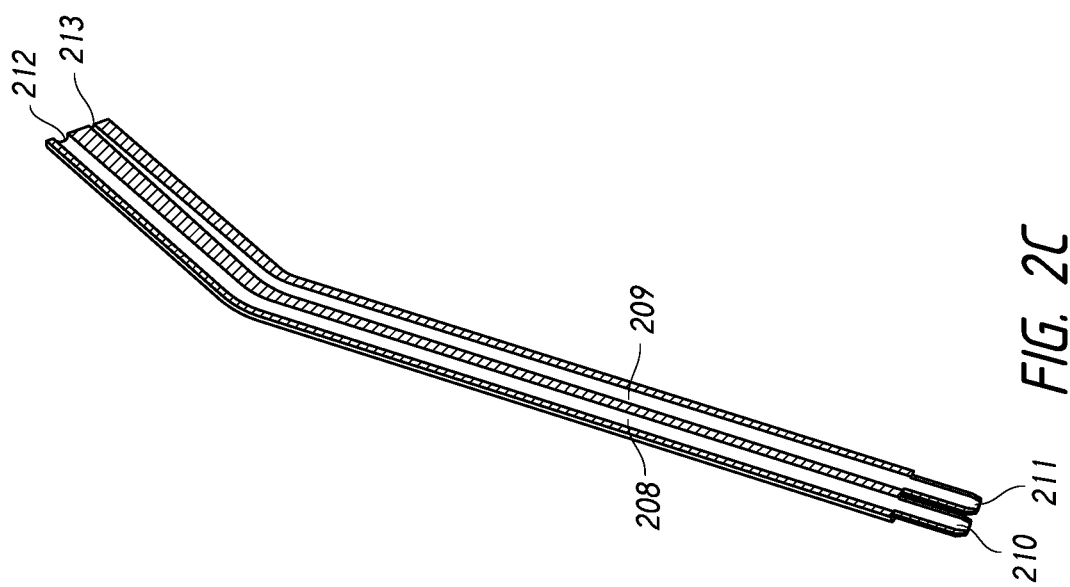
FIG. 2C is a cross-sectional view of the angled syringe tip of FIG. 2A.
Figure 2B:
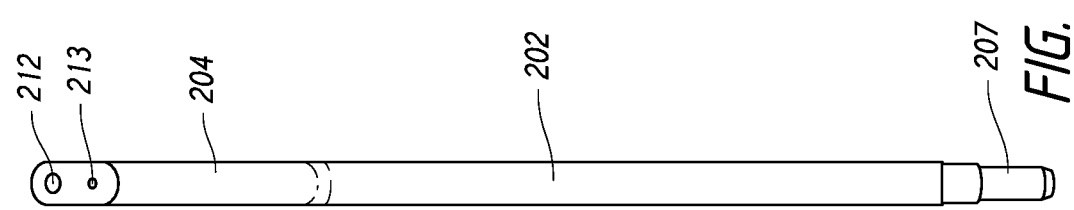
FIG. 2B is a front view of the angled syringe tip of FIG. 2A.
Figure 2A:
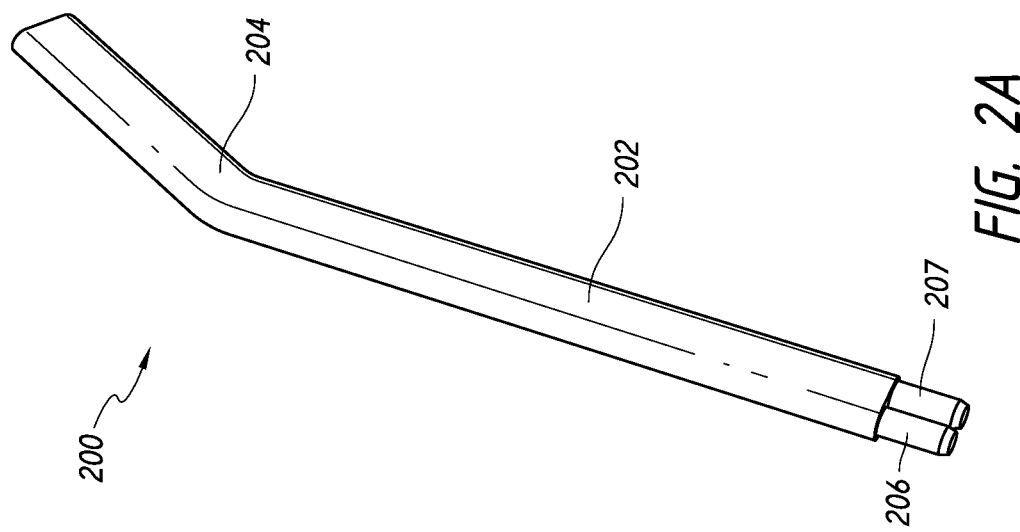
FIG. 2A is a perspective view an embodiment of an angled syringe tip having an outer core with a rounded rectangular cross-section and two connectors located at a proximal end.

With reference to FIGS. 2A-2C, an embodiment of a syringe tip 200 is shown having an elongate member 202 with a first angled portion 204 at a location between the proximal and distal ends. In the illustrated embodiment, the elongate member 202 has a rectangular cross-sectional area having rounded corner edges as shown most clearly in FIG. 2B. The syringe tip 200 can include two connectors 206, 207 located at a proximal end of the elongate member 202. These connectors 206, 207 can be designed to attach to ports of a dental syringe, adaptor, or similar device as described above with reference to FIGS. 1A and 1B. The syringe tip 202 can include a first passage 208 and a second passage 209 each having a corresponding proximal aperture or opening 210, 211 and corresponding distal aperture or opening 212, 213. In some embodiments, fluid can enter the syringe tip 200 through a proximal aperture, such as proximal apertures 210, 211, flow through the passages 208, 209, and exit from the distal apertures 212, 213. In some embodiments, the syringe tip 200 can have fewer or greater numbers of proximal and distal apertures. Furthermore, as will be discussed in further detail below, the number of proximal and distal apertures for the syringe tip 200 can be different. For example, a syringe tip can have two proximal apertures and three or more distal apertures. This can be a result of, for example, the use of sub-passages.

As more clearly shown in FIG. 2C, each passage 208, 209 can have a narrowing taper from the proximal end of the passage 208, 209 to the distal end of the passage 208, 209. That is, the proximal ends of the passages, in this case the proximal apertures 210, 211, can have cross-sectional areas which are greater than the cross-sectional areas of the distal apertures 212, 213. As the passages 208, 209 transition from the proximal end to the distal end, the passage can taper from this larger, entry area to the smaller, exit area. For example, as shown here, the diameter of the proximal aperture can be greater than the diameter of the distal aperture. Furthermore, as illustrated in FIG. 2C, the degree of taper between the passages 208, 209 can differ. For example, in the illustrated embodiment, the passage 208 tapers to a lesser degree than the passage 209 such that the distal aperture 212 has a larger cross-sectional area, in this case a larger diameter, than the distal aperture 213. This can advantageously provide different flow characteristics between the first, top passage 208 and the second, bottom passage 209 which can be particularly beneficially in situations where different types of fluids flow through different passages.

With reference to FIGS. 3A-3C, another embodiment of a syringe tip 300 is shown which is similar in design to the syringe tip 300. The syringe tip 300 can have an elongate member 302 with a first angled portion 304 at a location between the proximal and distal ends. In the illustrated embodiment, the elongate member 302 has a partially rounded rectangular cross-sectional area as shown most clearly in FIG. 3B. The syringe tip 300 can additionally include two connectors 306, 307 located at a proximal end of the elongate member 302 with an offset feature 305 located at a connecting end of the syringe tip 300 proximate the port connectors 306, 307. The offset feature 305 can extend at least some distance from the connecting end towards the distal end of the syringe tip 300. The offset feature 305 can be designed to facilitate attachment of the syringe tip 300 to a dental syringe 100, adaptor 120, or similar mechanism. For example, the dental syringe 100, adaptor 120, or similar mechanism can have a corresponding aperture with a similar offset feature thereby allowing the syringe to be connected in the proper fashion. This can reduce the likelihood of improper installation which could lead to reduced performance of the syringe tip 300 or damage to components of the dental syringe system 10 such as the dental syringe 100. The syringe tip 302 can include a first passage 308 and a second passage 309 each having a corresponding proximal aperture or opening 310, 311 and corresponding distal aperture or opening 312, 313. As more clearly shown in FIG. 3C, each passage 308, 309 can have a narrowing taper from the proximal end of the passage 308, 309 to the distal end of the passage 308, 309.

As shown above, the dental syringe tips can incorporate a bend to facilitate access to a target location. As shown in FIGS. 4A-4E, syringe tips, such as syringe tips 400A-E, can incorporate no such bending features or can incorporate multiple bending features. Such bending features can provide advantages when using a dental syringe 100 as such bending features can facilitate the provision of fluids to certain target locations. This is particularly important in dental procedures as reaching certain target locations within a patient's mouth can often present difficulties, particularly teeth around the rear of the mouth such as molars and surrounding tissue, if the syringe tip is not bent.

In some embodiments, the syringe tip can have no bending features. For example, as shown in FIG. 4A, the syringe tip 400A can have no bends such that the syringe tip 400A is straight. In some embodiments, the syringe tip can have a single bending feature. For example, as shown in FIG. 4B, the syringe tip 400B can have a single bending feature 402B having an acute angle 404B of approximately 30 degrees. As a second example, as shown in FIG. 4C, the syringe tip 400C can have a single bending feature 402C having a right, or 90 degree, angle 404C. In some embodiments, the syringe tip can have two or more bending features. As shown in FIG. 4D, the syringe tip 400D can have a first bending feature 402D with a first angle 404D and a second bending feature 406D with a second angle 408D. As shown in the illustrated embodiment, both angles 404D and 408D can be acute angles although other angles, such as right angles and obtuse angles, can also be used. In some embodiments, the syringe tip can have more than two bends. As shown in FIG. 4E, the syringe tip 400E can have a first bending feature 402E with a first angle 404E, a second bending feature 406E with a second angle, and a third bending feature 410E with a third angle 412E. As shown in the illustrated embodiment, all three angles 404E, 408E, and 412E can be acute angles although other angles, such as right angles and obtuse angles, can also be used.

Figure 4G:
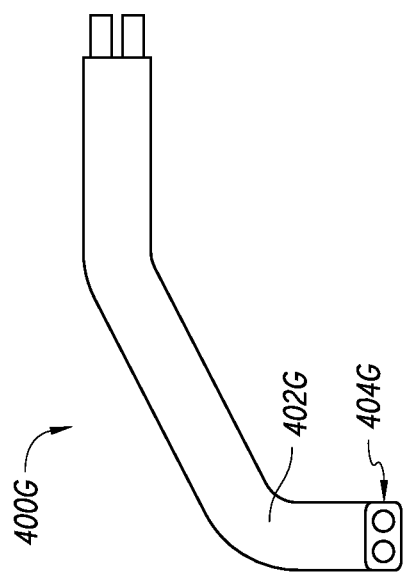
FIG. 4G is a side view of an embodiment of a syringe tip having a triple bend design, the bends being in different directions along non-parallel axes.
Figure 4F:
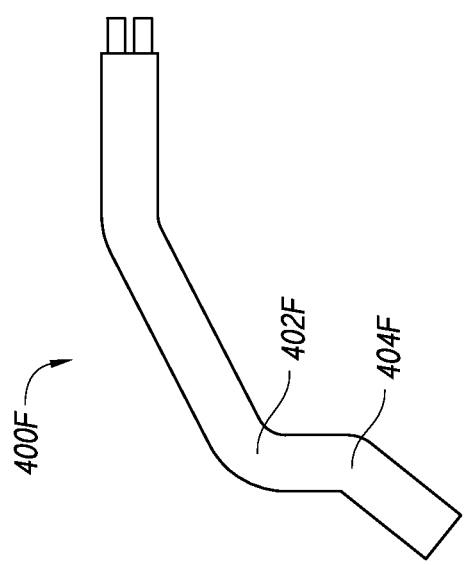
FIG. 4F is a side view of an embodiment of a syringe tip having a triple bend design, the bends being in different directions along parallel axes.

As should be apparent, the bending feature can have angles different than those shown in FIGS. 4B-4E. In some embodiments, the bending features, such as bending features 402B, 402C, 402D, 406D, 402E, 406E, and 410E, can have angles between the range of approximately 0 degrees to approximately 175 degrees, between the range of approximately 0 degrees to approximately 135 degrees, and between the range of approximately 0 degrees to approximately 90 degrees, 15 degrees, 30 degrees, 45 degrees, 60 degrees, 90 degrees, and all other angles between those ranges. Furthermore, although the bending features shown in the illustrated embodiments are directed in the same direction along the same axis, it should be appreciated that the bending features can be bends about any axis and in any direction. For purposes of clarity, this can mean, for example, that the syringe tip, such as syringe tip 400E as shown in FIG. 4F, can have a counter-clockwise bending feature 402E followed by clockwise bending feature 404E or that the syringe tip, such as syringe tip 400G as shown in FIG. 4G, can have a bending feature 402G about a first axis and a bending feature 404G about a second axis not parallel to the first axis.

Syringe Tip Components

Figure 5:
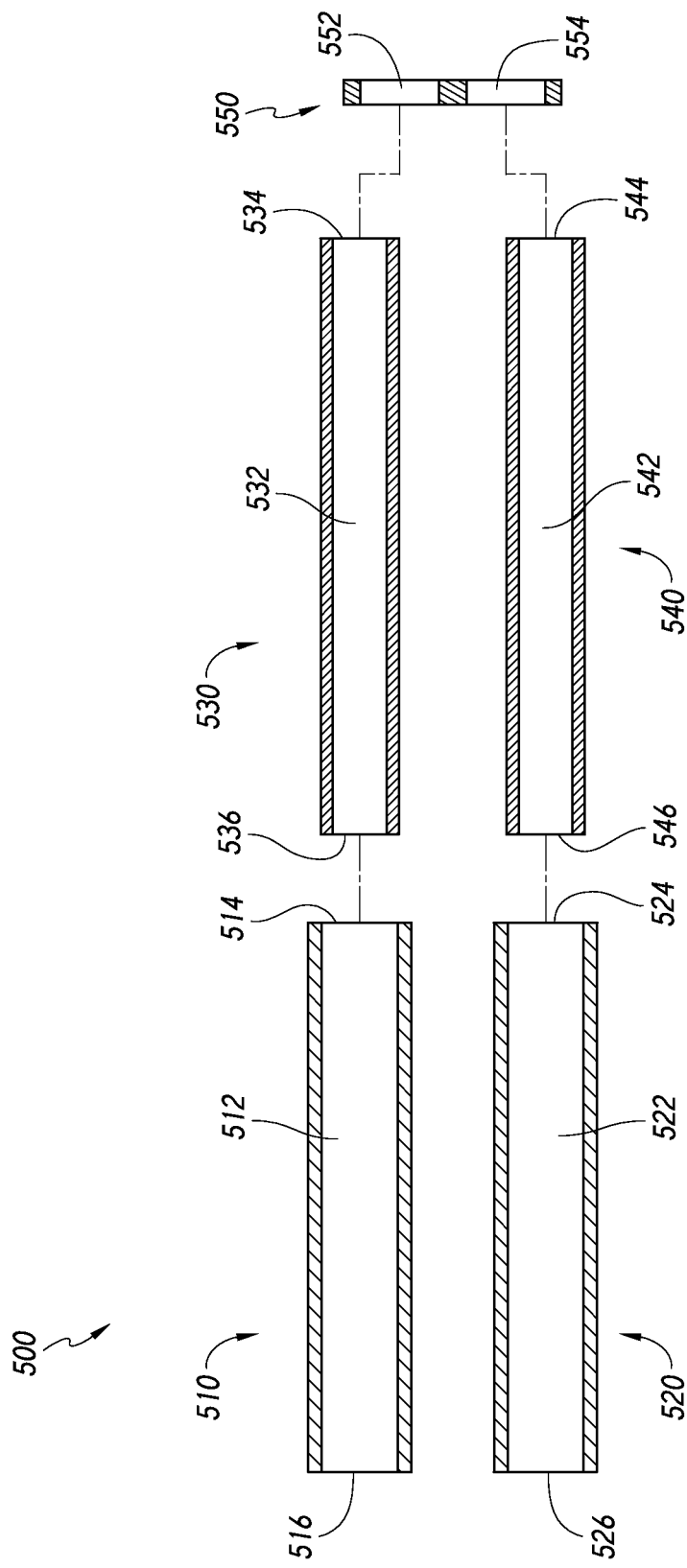
FIG. 5 is an exploded view of a syringe tip system having two outer cores, two inner cores, and a carrier.
Figure 33A:
FIGS. 33A-H are side cross-sectional views of embodiments of a syringe tip having an outer core with two narrowing taper passages, one or both of the passages having connectors and clip mechanism retention features located at various positions.
Figure 33B:
Figure 33C:
Figure 33D:
Figure 33E:
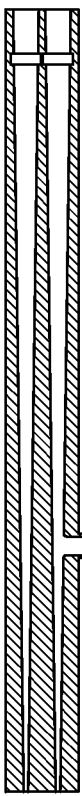
Figure 33F:
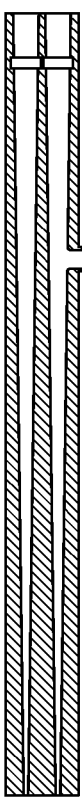
Figure 33G:
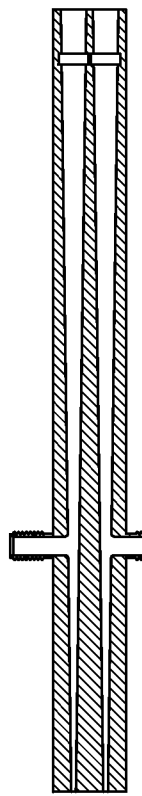
Figure 33H:
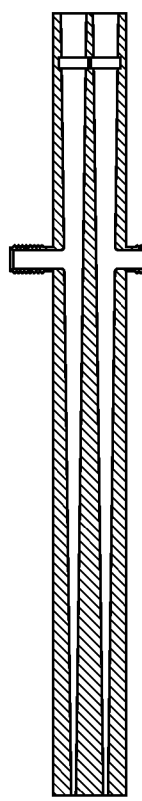
Figure 60B:
FIG. 60A is a perspective view of an embodiment of a full length, narrowing taper inner core having a threaded retention feature.
Figure 60D:
Figure 61B:
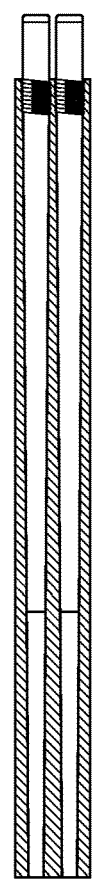
Figure 61D:
Figure 60A:
Figure 60C:
Figure 61A:
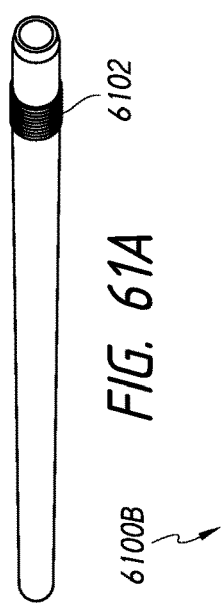
Figure 61C:

In some embodiments, the syringe tip can be manufactured from multiple components. FIG. 5 illustrates various components that can be incorporated to form a syringe tip. As illustrated in FIG. 5, the syringe tip 500 can have an elongate body which includes a first outer core 510, a second outer core 520, a first inner core 530, second inner core 540, and a carrier 550. The outer cores 510, 520 and inner cores 530, 540 can have passages 512, 522, 532, 542 respectively which can permit fluid communication between the proximal apertures or openings 514, 524, 534, 544 and distal apertures or openings 516, 526, 536, 546 of the cores 510, 520, 530, 540. In some embodiments, the inner cores 530, 540 can be inserted into passages 512, 522 of the outer cores 510, 520. As will be discussed in greater detail below, the proximal ends of the inner cores 530, 540 can protrude proximally from the proximal ends of the outer cores 510, 520 such that the proximal ends of the inner cores 510, 520 can function as connectors. In some embodiments, one or both of the inner cores 530, 540 are inserted into passages 512, 522 such that the proximal ends of the inner cores do not protrude proximally from the proximal ends of the outer cores 510, 520. In some embodiments, the carrier 550 can be used to connect the multiple components together and reduce the likelihood that the components will disconnect during use. For example, inner cores 530, 540 can be inserted into holders 552, 554 of the carrier 550.

As will be discussed in greater detail below, these components can be combined to form a syringe tip having desired characteristics for a particular dental procedure. In some embodiments, only certain of these components can be used with other components being omitted. In some embodiments, certain of these components can be integrally formed. Furthermore, any and all of these components can be bent as discussed above with respect to FIGS. 4A-4E.

This modular design can advantageously allow for interchanging of multiple components to obtain a number of different configurations and can be used, for example, to obtain a number of different discharge patterns and/or discharge pressures. As will be made apparent based on the discussion below regarding the multiplicity of features which can be incorporated into each of these components, the use of multiple components can provide a dental practitioner or other user of the device a high degree of customizability. For example, a dental practitioner can purchase multiple components having different sets of features and, after determining the desired flow characteristics for a procedure, can combine the components in a particular way to obtain a syringe tip having such desired flow characteristics. Furthermore, in some circumstances, this customization can be performed by the manufacturer who can manufacture a select variety of components and with this select variety of components produce a wide-range of syringe tips for dental practitioners. This can advantageously reduce the tooling required to produce a wide range of syringe tips.

Outer Core

The outer core can form an outer portion of the syringe tip. In some embodiments, the outer core can include some or all of the following features. As described above with respect to the system 500 above, the outer core can have one or more passages through which fluid from a dental syringe 100 can pass. In some designs, and as illustrated above with respect to FIG. 5, the outer core can have a single passage. In other designs, the outer core can have a two or more passages to permit fluid communication with two or more passages, lumens, or channels of a dental syringe 100. Although many of the figures below show an outer core having one or two passages, it should be understood that these figures are solely for illustrative purposes and should not be construed as being the sole or "preferred" embodiment of an outer core. Rather, it should be understood that the features described below can be applied to any outer core having any number of passages.

Cross-Sectional Shape

FIGS. 6A-6F and 7A-7D illustrates various cross-sectional shapes of the outer core. In some embodiments, the cross-sectional shape can be designed to reduce the likelihood of tip rotation after being connected to a dental syringe 100. FIGS. 6A-6F illustrate embodiments of an outer core having a single passage. As shown in FIG. 6A, the outer core 600A can have a body 602A with a circular cross-section and a circular passage 604A. In some embodiments, the cross-section of the outer core can have non-circular cross-sectional shapes such as ovals (not shown), squares (602B, FIG. 6B), pentagons (602C, FIG. 6C), hexagons (602D, FIG. 6D), and any other shape. Furthermore, in some embodiments, the passage can have a non-circular passage, proximal aperture, or distal aperture, such as passage 604B which has a star-shape, passage 604E which has a cross-shape, and passage 604F which has a triangular shape. Non-circular passages and apertures can be used to alter the discharge pattern and/or discharge pressure as it exits from the syringe tip. Furthermore, as described in further detail below, a fluid can be directed into multiple passages or sub-passages and can be discharged from multiple apertures on the syringe tip. The multiple passages or sub-passages can have the same or different cross-sectional shapes.

FIGS. 7A-7D illustrates embodiments of an outer core having two passages. As shown in FIG. 7A, the outer core 700A can have a body 702A with an oval cross-section and two circular passages 704A, 705A. In some embodiments, the cross-section of the outer core can have non-circular cross-sectional shapes such as rectangles (702B, FIG. 7B), rounded rectangles (702C, FIG. 7C), and an "8" shape (702D, FIG. 7D), and any other shape. Furthermore, in some embodiments, the passages may have non-circular passages, proximal apertures, or distal apertures similar to the non-circular passages 604B, 604E, 604F of FIGS. 6B, 6E, 6F respectively. The cross-sectional shape and size need not be constant throughout the length of the outer core. In some embodiments, the cross-sectional shape and size of the outer core can vary along its length. For example, the passage can have a circular or rounded rectangular cross-sectional shape which tapers, either in a narrowing or expanding manner, from a proximal end to a distal end.

Tapering

In some embodiments, the passages of the outer cores can take on different shapes. FIGS. 8A-B, 9A-9C, 10A-C, 11A-B illustrate embodiments of outer cores having two passages allowing fluid communication between corresponding proximal and distal apertures. As will be made apparent with respect to the discussion below, the passages can have no taper, have a narrowing taper, have an expanding taper, or a combination of the above.

As shown in FIG. 8A, the outer core 800A can have two passages 802A, 804A having corresponding proximal apertures or openings 806A, 808A and distal apertures or openings 810A, 812A. As shown in the illustrated embodiment, the passages 802A, 804A of outer core 800A can have cross-sectional areas which remain constant from the proximal apertures 806A, 808A to the distal apertures 810A, 812A and therefore do not taper. As shown in FIG. 8A, the passages 802A, 804A can have equivalent diameters. In other embodiments, such as outer core 800B shown in FIG. 8B, the passages 802B, 804B can have unequal diameters. For example, passage 802B can have a greater diameter than passage 804B.

Such "no-taper" passage designs can be implemented, for example, when an entry aperture or opening and an exit aperture or opening of a passage have equivalent cross-sectional areas (or diameters in the case of circular apertures). Notwithstanding any pressure and/or velocity losses that can occur as fluid flows through the passage, no-taper passages can advantageously maintain a fluid discharge pressure and/or velocity approximately equal to the fluid pressure and/or velocity discharged from the dental syringe.

As shown in FIG. 9A, the outer core 900A can have two passages 902A, 904A having corresponding proximal apertures or openings 906A, 908A and distal apertures or openings 910A, 912A. As shown in the illustrated embodiment, the passages 902A, 904A of outer core 900A can have cross-sectional areas which decrease from the proximal apertures 906A, 908A to the distal apertures 910A, 912A. Each passage 902A, 904A can have a diameter which decreases from the proximal end to the distal end. In some embodiments, the passages 902A, 904A can have equivalent degrees of narrowing taper throughout its length as shown in the FIG. 9A. As shown in FIG. 9B, in some embodiments, outer core 900B can have two passages 902B, 904B having a greater degree of taper than the taper of passages 902A, 904A. In some embodiments, such as outer core 900C shown in FIG. 9C, outer core 900C can have a first passage 902C with a lesser degree of taper compared to a second passage 904C.

Such "narrowing taper" passage designs can be implemented, for example, when an exit aperture or opening of a passage has a smaller cross-sectional area than an entry aperture or opening of a passage (or diameters in the case of circular apertures). Notwithstanding any pressure and/or velocity losses that can occur as fluid flows through the passage, the narrowing taper design can advantageously increase the pressure and/or velocity of fluids discharged from the syringe tip. Other configurations are also possible with greater or lesser degrees of taper. The greater the degree of taper, the greater the potential increase in pressure and/or velocity. Additionally, in some embodiments, the cross-sectional area of a proximal and/or distal aperture of a first passage may not be equivalent to the cross-sectional areas of the proximal and/or distal apertures of a second passage similar to that shown in outer core 800B of FIG. 8B.

As shown in FIG. 10A, outer core 1000A can have two passages 1002A, 1004A having corresponding proximal apertures or openings 1006A, 1008A and distal apertures or openings 1010A, 1012A. As shown in the illustrated embodiment, the passages 1002A, 1004A of outer core 1000A can have cross-sectional areas which increase from the proximal apertures 1006A, 1008A to the distal apertures 1010A, 1012A. As shown in the illustrated embodiment, each passage 1002A, 1004A can have a diameter which increases from the proximal end to the distal end. These passages 1002A, 1004A can have equivalent degrees of taper throughout its length as shown in the FIG. 10A. As shown in FIG. 10B, the outer core 1000B can have two passages 1002B, 1004B having a greater degree of taper than those of passages 1002A, 1004A. In other embodiments, such as outer core 1000C shown in FIG. 10C, outer core 1000C can have a first passage 1002C with a lesser degree of taper compared to a second passage 1004C.

Such an "expanding taper" passage design can be implemented, for example, when an exit aperture or opening of a passage has a larger cross-sectional area than an exit aperture or opening of a passage (or diameters in the case of circular apertures). Barring pressure and/or velocity losses that can occur as fluid flows through the passage, the expanding taper design can advantageously decrease the pressure and/or velocity of fluids discharged from the syringe tip. Other configurations are also possible with greater or lesser degrees of taper. The greater the degree of taper, the greater the potential decrease in pressure and/or velocity. Additionally, in some embodiments, the cross-sectional area of proximal and/or distal apertures of a first passage may not be equivalent to the cross-sectional areas of the proximal and/or distal apertures of a second passage similar to that shown in outer core 800B of FIG. 8B.

The no-taper, narrowing taper, and expanding taper designs can be combined as part of a single outer core. As shown in FIG. 11A, the outer core 1100A can have both a no-taper passage 1102A and a narrowing taper passage 1104A. As shown in FIG. 11B, the outer core 1100B can have both a no-taper passage 1102B and an expanding taper passage 1104B. In some embodiments, the outer core can have both a narrowing taper passage and an expanding taper passage (not shown). In embodiments having more than two passages, any combination of the above taper designs and shapes can be incorporated into a single outer core.

In some embodiments, the passage can have "staged" tapering design. FIGS. 12A, 12B, 13A and 13B illustrate embodiments of outer cores having passages with different cross-sectional shapes and areas along different portions or "stages" of the passage. As shown in FIG. 12A, the outer core 1200A can have a passage 1202A having a proximal aperture or opening 1204A and a distal aperture or opening 1206A. During a first stage or portion 1208A of the passage 1202A, the passage can have a no-taper design. During a second stage or portion 1210A of the passage 1202A, the passage can have a narrowing taper design. Greater or fewer stages can be used depending on the design requirements. For example, as shown in FIG. 12B, the outer core 1200B can have a passage 1202B having a proximal aperture or opening 1204B and a distal aperture or opening 1206B. During a first stage 1208B of the passage 1202B, the passage can have a no-taper design. During a second stage 1210B of the passage 1202B, the passage can have a narrowing taper design. During a third stage 1212B of the passage 1202B, the passage can have a no-taper design. The outer cores 1300A and 1300B of FIGS. 13A and 13B are similar to the outer cores 1200A and 1200B of FIGS. 12A and 12B with expanding taper stages 1302A, 1304B and no-taper stages 1304A, 1302B, 1306B. In other embodiments, narrowing taper stages can be used with expanding taper stages in any combination. Furthermore, any stage can be a no-taper, narrowing taper, or expanding taper design.

It should be noted that in the illustrated embodiments, the overall shape of the outer surface of the outer core remains the same with the wall thickness, the distance between the outer surface of the outer core to the surface of the passage, changing to modify the taper or shape of the passages. This can advantageously simplify the manufacturing process. In other embodiments, the outer core can have an outer surface which changes with the shape of the passages. For example, in some embodiments, the outer core can have a constant wall thickness such that, for narrowing taper passages, the outer surface of the outer core correspondingly has a narrowing taper shape or for expanding taper passages, the outer surface of the outer core can correspondingly have an expanding taper shape. Such a design can be advantageous in that it can reduce material usage. Furthermore, although the illustrations show linear tapers (i.e., tapers which increase at a constant rate), the outer cores can have non-linear tapers.

Sub-Passages

In some embodiments, the outer core can have passages which subsequently split into multiple sub-passages. FIGS. 14A, 14B, 14C and 14D illustrate embodiments of outer cores having passages which split into multiple sub-passages. As shown in FIG. 14A, the outer core 1400A can have two passages 1402A, 1404A with passage 1402A splitting into two sub-passages 1406A, 1408A at a location between the proximal end and distal end of the outer core 1400A. As shown in FIG. 14B, the outer core 1400A can have two distal apertures or openings 1410A, 1412A in fluid communication with the first passage 1402A via sub passages 1406A, 1408A and a single distal aperture or opening 1414A in fluid communication with the second passage 1404A. In some embodiments, the passages can split into more than two sub-passages. For example, as shown in FIG. 14C, the outer core 1400C can have a four apertures, 1402C, 1404C, 1406C, 1408C in fluid communication with a single passage such as 1402A via four sub-passages. In some embodiments, both passages, such as passages 1402A, 1404Ab, can split into multiple passages. For example, as shown in FIG. 14D, the outer core 1400D can have four apertures 1402D, 1404D, 1406D, 1408D in fluid communication with a first passage such as passage 1402A and two apertures 1410D, 1412D in fluid communication with a second passage such as passage 1404A.

The bottom grouping of apertures need not be restricted to a bottom passage and the top grouping of apertures need not be restricted to a top passage. In some embodiments, the bottom passage can have some or all apertures located in the top grouping of apertures and the top passage can have some or all apertures located in the bottom grouping of apertures. Furthermore, the feature of passages splitting into multiple sub-passages can be applied to outer cores having any number of passages and, as will be discussed below, passages of inner cores.

Retention Features

In some embodiments, the outer core can have retention features designed to positively engage with corresponding retention features located on other components such as inner cores, tip modifiers, adaptors, additional fluid conduits, storage devices and any other attachable component. Moreover, as will be discussed in greater detail below, such retention features can be used to connect outer core sub-components together.

As will be discussed in further detail below, retention features can include threading, clip mechanisms and other snap-lock type mechanisms, ribs, "harpoons" or angled ridges, pinned closures, bayonet mounts and other types of twist locking mechanisms, fins, dimples, magnets, hook-and-loop fasteners such as Velcro, one-way ratchet mechanisms such as zip-ties, adhesives such as a peel-and-stick adhesive, and other retention features known in the syringe tip art, or a combination of the above. In some embodiments, the retention feature can include movable components such as hinges with snap or pin closures as shown in FIGS. 94, 95, and 96, sliding sheaths, and similar retention features with movable components. In some embodiments, the outer core can be connected to other attachable components via mechanisms such as friction fits, press fits, and/or interference fits.

In some embodiments, the retention features can include a combination of the above-mentioned features.

Furthermore, as will be discussed in further detail below, retention features can be placed at various locations of the outer cores such as a distal portion, a proximal portion, and any other location. Such retention features can also be placed along different surfaces such as the interior or inner surfaces and/or the exterior or outer surfaces.

As shown in FIGS. 15A-J, the outer cores 1500A-1500J can have one or more threaded retention features at one or more locations on the interior or inner surfaces of the no-taper passages of outer cores 1500A-1500J. As shown in FIG. 15A, the outer core 1500A can have two no-taper passages 1502A, 1504A with passage 1504A having a threaded retention feature 1506A located proximate or near the proximal end of the passage 1504A. As shown in FIG. 15B, the outer core 1500A can have two no-taper passages 1502B, 1504B with both passages 1502B, 1504B having threaded retention features 1506A, 1508B located proximate or near the proximal ends of the passages 1502B, 1504B. In some embodiments, the threaded retention features 1502C, 1502D, 1504D, 1502E, 1502F, 1504F can be located at a position between the proximal and distal ends of one or more no-taper passages (FIGS. 15C and 15D) or at a position proximate or near the distal ends of one or more no-taper passages (FIGS. 15E and 15F). In some embodiments, as illustrated in FIGS. 15G-J, the outer cores 1500G, 1500H, 1500I, 1500J can have two or more threaded retention features 1502G, 1504G, 1502H, 1504H, 1506H, 1508H, 1502I, 1504I, 1506I, 1502J, 1504J, 1506J along the same passage or different passages. As should be apparent, the retention features as herein discussed can be located at any position within the passage. For example, the threaded retention features can be located at a position seven-eighths the length of the passage from the proximal end, three-quarters the length of the passage from the proximal end, two-thirds the length of the passage from the proximal end, one-half the length of the passage from the proximal end, three-eighths the length of the passage from the proximal end, one-third the length of the passage from the proximal end, one-fourth the length of the passage from the proximal end, one-eighth the length of the passage from the proximal end, any length between these, or any other length.

As shown in FIGS. 16A-F, the outer cores 1600A-1600F can have one or more threaded retention features at one or more locations on the interior surfaces of the narrowing taper passages of the outer cores 1600A-1600F. As shown in FIG. 16A, the outer core 1600A can have two narrowing taper passages 1602A, 1604A with passage 1604A having a threaded retention feature 1606A located proximate or near the proximal end of the passage 1604A. As shown in FIG. 16B, the outer core 1600A can have two narrowing taper passages 1602B, 1604B with both passages 1602B, 1604B having threaded retention features 1606A, 1608B located proximate or near the proximal ends of the passages 1602B, 1604B. In some embodiments, the threaded retention features 1602C, 1602D, 1604D can be located at a position between the proximal and distal ends of one or more no-taper passages (FIGS. 16C and 16D) or at a position proximate the distal ends of one or more no-taper passages (not shown). In some embodiments, as illustrated in FIGS. 16E and 16F, the outer cores 1600E, 1600F can have two or more threaded retention features, 1602E, 1604E, 1602F, 1604F, 1606F, 1608F along the same passage. As should be apparent and as discussed above in connection with FIGS. 15A-J, the retention features as herein discussed can be located at any position within the narrowing taper passages.

As shown in FIGS. 17A-D, the outer cores 1700A-1700D can have one or more threaded retention features at one or more locations on the interior surfaces of the expanding taper passages of the outer cores 1700A-1700D. As shown in FIG. 17A, the outer core 1700A can have two expanding taper passages 1702A, 1704A with passage 1704A having a threaded retention feature 1706A located proximate or near the proximal end of the passage 1704A. As shown in FIG. 17B, the outer core 1700A can have two expanding taper passages 1702B, 1704B with both passages 1702B, 1704B having threaded retention features 1706A, 1708B located proximate or near the proximal ends of the passages 1702B, 1704B. In some embodiments, as illustrated in FIGS. 16C and 16D, the outer cores 1700D, 1700D can have two or more threaded retention features, 1702C, 1704C, 1702D, 1704D, 1706D, 1708D along the same passage. As should be apparent and as discussed above in connection with FIGS. 15A-J, the retention features as herein discussed can be located at any position within the expanding taper passages.

While certain positions are illustrated in FIGS. 15A-J, 16A-F, and 17A-D, it should be apparent that any number of retention features, such as threaded retention features, can be used for a single outer core and can be placed at any location along an inner surface of one or more no-taper, narrowing taper, and/or expanding taper passages. In some embodiments, the threaded retention feature, and any other retention feature herein discussed, can be located at a position seven-eighths the length of the passage from the proximal end of the passage, three-fourths the length of the passage from the proximal end of the passage, two-thirds the length of the passage from the proximal end of the passage, one-half the length of the passage from the proximal end of the passage, three-eighths the length of the passage from the proximal end of the passage, one-third the length of the passage from the proximal end of the passage, one-fourth the length of the passage from the proximal end of the passage, one-eighth the length of the passage from the proximal end of the passage, any length between these, or any other length. Additionally, the threaded retention features, or any retention feature, can be located on exterior surfaces of the outer cores. Furthermore, the threaded retention features can be of any length. In some embodiments, the length can range from approximately 0.1 cm to approximately 10 cm, from approximately 0.5 cm to approximately 5 cm, from approximately 1 cm to approximately 2 cm, or any other length. In some embodiments, longer threaded retention features can be used to reduce the potential of accidental breakage or removal of an attached component.

As shown in FIGS. 18A-J, the outer cores 1800A-1800J can have one or more clip mechanism retention features 1802A, 1802B, 1804B, 1802C, 1802D, 1804D, 1802E, 1802F, 1804F, 1802G, 1804G, 1802H, 1804H, 1806H, 1808H, 1802I, 1804I, 1806I, 1802J, 1804J, 1806J at one or more locations on the interior or inner surfaces of the no-taper passages of outer cores 1800A-1800J. As shown in FIGS. 19A-F, the outer cores 1900A-1900F can have one or more clip mechanism retention features 1902A, 1902B, 1904B, 1902C, 1902D, 1904D, 1902E, 1902F, 1904F, 1906F, 1908F at one or more locations on the interior or inner surfaces of the narrowing taper passages of the outer cores 1900A-1900F. As shown in FIGS. 20A-D, the outer cores 2000A-2000D can have one or more clip mechanism retention features 2002A, 2002B, 2004B, 2002C, 2004C, 2002D, 2004D, 2006D, 2008D at one or more locations on the interior or inner surfaces of the expanding taper passages of the outer cores 2000A-2000D. As illustrated in the above figures, the clip mechanism retention feature can be an annular slot designed to engage a corresponding clip mechanism retention feature of another component. This corresponding clip mechanism retention feature can be, for example, an annular protrusion, ramps, or similar features configured to engage an annular slot. Illustrations of such corresponding retention mechanisms will be discussed in connection with inner cores below. In some embodiments, the clip mechanism retention feature can be an annular protrusion, wings, ramps, or similar features designed to engage with an annular slot of another component. Furthermore, in some embodiments, the clip mechanism retention feature can utilize non-annular features such as triangles, quadrilaterals, pentagons, hexagons, any other polygon, and other types of shapes.

For purposes of brevity, it should be noted that FIGS. 18A-J illustrate clip mechanism retention mechanisms 1802A, 1802B, 1804B, 1802C, 1802D, 1804D, 1802E, 1802F, 1804F, 1802G, 1804G, 1802H, 1804H, 1806H, 1808H, 1802I, 1804I, 1806I, 1802J, 1804J, 1806J in locations similar to the locations of threaded retention mechanisms illustrated in FIGS. 15A-J, that FIGS. 19A-F illustrate clip mechanism retention mechanisms 1902A, 1902B, 1904B, 1902C, 1902D, 1904D, 1902E, 1902F, 1904F, 1906F, 1908F in locations similar to the locations of threaded retention mechanisms illustrated in FIGS. 16A-F, and that FIGS. 20A-D illustrate clip mechanism retention mechanisms 2002A, 2002B, 2004B, 2002C, 2004C, 2002D, 2004D, 2006D, 2008D in locations similar to the locations of threaded retention mechanisms illustrated in FIGS. 17A-D.

As with the discussion of the threaded retention mechanisms above, it should be apparent that any number of retention features, such as clip mechanism retention features, can be used for a single outer core and can be placed at any location along an inner surface of one or more no-taper, narrowing taper, and/or expanding taper passages. In some embodiments, the clip mechanism retention feature can be located at a position seven-eighths the length of the passage from the proximal end of the passage, three-fourths the length of the passage from the proximal end of the passage, two-thirds the length of the passage from the proximal end of the passage, one-half the length of the passage from the proximal end of the passage, three-eighths the length of the passage from the proximal end of the passage, one-third the length of the passage from the proximal end of the passage, one-fourth the length of the passage from the proximal end of the passage, one-eighth the length of the passage from the proximal end of the passage, any length between these, or any other length. Additionally, clip mechanism retention features can be located on exterior surfaces of the outer cores. For example, the outer core can have recesses located on an outer surface for receiving a wing or clip on a carrier (as will be discussed in greater detail in connection with FIGS. 73A-75D).

Furthermore, different types of retention features can be included within the same outer core and/or within the same passage of an outer core. For example, one passage can include a threaded retention feature and clip mechanism retention feature and a second passage can include a bayonet mount retention feature.

In some embodiments, the threading of the outer cores can have injectable threading design such as injectable threading 2102A, 2102B, 2104B, 2202A, 2202B, 2204B, 2202C, 2202D, 2204D, 2302A, 2302B, 2304B, 2402A, 2402B which can be used in connection with any of the tapering passages.

As shown in FIG. 94-96, the outer core 9400 can have a hinged retention feature 9402 with a first portion 9404 and a second, attachment portion 9406. The first portion 9404 can be attached to the attachment portion 9406 via a hinge such as the living hinge 9408 illustrated in FIG. 96. Other types of hinges, such pin hinges, can also be used. The first portion 9404 can have a closure feature 9410, such as a pin, for attachment to a corresponding receiving feature 9412 on the attachment portion 9406. The hinged retention feature 9402 can have an aperture 9414 which can be used to receive a portion of the component to be connected to outer core 9400. The aperture 9414 can be sized to be about equal to the size of the component to be connected to the outer core 9400 to provide a snug fit. In some embodiments, the aperture 9414 can be sized to be smaller than the component such that an interference fit is formed. In some embodiments, the inner surface of the hinged retention feature 9402 can include retention features as herein discussed such as threading, clips, adhesives and the like.

As shown in FIGS. 97-99B, the outer cores 9700-9900 can have one or more retention features at one or more locations on the exterior or outer surfaces of the outer cores 9700-9900. As shown in FIG. 97, the outer core 9700 can have a ribbed retention feature 9702 located proximate or near the proximal end 9704 of the outer core 9700. The ribbed retention feature 9702 can include a series of ridges and valleys circumscribing the outer core extending across part of or the entirety of the outer core 9700. In the illustrated embodiment, the ribbed retention feature 9702 partially extends from the proximal end of the outer core towards the distal end. As discussed above with respect to other retention features, the ribbed retention feature 9702 can be placed at any location along the length of the outer core 9700.

In some embodiments, the ribbed retention feature, and any other retention feature herein discussed, can be located at a position seven-eighths the length of the passage from the proximal end of the passage, three-fourths the length of the passage from the proximal end of the passage, two-thirds the length of the passage from the proximal end of the passage, one-half the length of the passage from the proximal end of the passage, three-eighths the length of the passage from the proximal end of the passage, one-third the length of the passage from the proximal end of the passage, one-fourth the length of the passage from the proximal end of the passage, one-eighth the length of the passage from the proximal end of the passage, any length between these, or any other length. Additionally, the ribbed retention features, or any retention feature, can be located on interior surfaces of the outer cores. Furthermore, the ribbed retention features can be of any length. In some embodiments, the length can range from approximately 0.1 cm to approximately 10 cm, from approximately 0.5 cm to approximately 5 cm, from approximately 1 cm to approximately 2 cm, or any other length.

As shown in FIGS. 98A and 98B, the outer core 9800 can have a finned retention feature 9802 located proximate or near the proximal end 9804 of the outer core 9800. The finned retention feature 9802 can include one or more fins or protrusions extending in a longitudinal direction across part of or the entirety of the outer core 9800. As shown in the illustrated embodiment, four fins partially extend from the proximal end 9804 of the outer core towards the distal end. As discussed above with respect to other retention features, the finned retention feature 9802 can be placed at any location along the length of the outer core 9800. Additionally, the finned retention feature 9902, or any retention feature, can be located on interior surfaces of the outer core 9900 as shown in FIGS. 99A and 99B. Furthermore, the finned retention features can be of any length and can have different cross-sectional shapes such as dovetails and the like. The fins can also include other retention features, such as snap fittings. Furthermore, the fins can extend in a non-longitudinal direction.

As shown in FIG. 100, the outer core 10000 can have a harpoon retention feature 10002 located proximate or near the proximal end 10004 of the outer core 10000. The harpoon retention feature 10002 can include one or more angled ridges 10006 extending across part of or the entirety of the outer core 10000. The angled ridges 10006 can allow relatively unhindered movement of two components in one direction 10008 while hindering or impeding movement of the two components in a second direction 10010. For example, these angled ridges 10006 can allow two components to be inserted together with relative ease but render it difficult to remove the two components. As shown in the illustrated embodiment, the angled ridges partially extend from the proximal end 10004 of the outer core 10000 towards the distal end 10012. As discussed above with respect to other retention features, the harpoon retention feature 10002 can be placed at any location along the length of the outer core 10000. The harpoon retention feature, as with any retention feature as herein discussed, can be located on interior surfaces of the outer cores. Furthermore, the harpoon retention features can be of any length.

In some embodiments, the retention features can be included on the outer core after the outer core has been manufactured. This can allow for use of different retention features with different outer cores. For example, as shown in FIGS. 101A-101B, the retention feature 10100 can be separate from the outer core 10102 of the dental syringe tip. In some embodiments, the retention feature 10100 can be attached to the outer core 10102 using any of the retention features and interlock features as herein described. For example, the retention feature 10100 can be screwed onto threading existing on the outer core 10102, snapped into a snap fitting on the outer core 10102 or attached with adhesives or magnets. Furthermore, as shown in FIG. 101A-101B, in some embodiments, the retention feature 10100 can fit onto a recessed portion 10104 of the outer core 10102. In some embodiments, the retention feature 10100 can be press fit onto the outer core 10102.

It should be noted that although only exterior retention features are discussed as being attachable, interior retention features can also be separate from the outer core after the outer core has been manufactured. Accordingly, retention features along the interior surface can also be designed to be attached to the outer core using the same mechanisms as herein discussed. Of course, it should be noted that in some embodiments, the retention feature is integrated onto the component such that the retention feature is not separate from the component.

It should also be noted that these features can be applied to other components as herein discussed such as the inner core and carrier.

Connectors

In some embodiments, syringe tips can have connectors, with passages, located at various positions on the outer core. For example, as shown in FIGS. 1A-3C, syringe tips can have connectors, such as connectors 144, 145, 206, 207, 306, 307, located on a proximal end of the syringe tip. As will be described in detail below, connectors can also be located on any other part of the syringe tip such as top, bottom, and lateral surfaces of the syringe tip. Connectors can also be located on a distal end of the syringe tip. Connectors can be designed to connect or operably couple the outer core, and the syringe tip generally, to other components. For example, connectors can be used to connect the syringe tip to an adaptor or a syringe device such that the syringe tip is in fluid communication with these devices. Connectors can be designed to connect to other storage or flow devices housing fluids or substrates. Connection to such storage or flow devices can advantageously provide greater options for a dental practitioner who can potentially supplement the fluids from the dental syringe with less commonly used fluids or substrates used for the dental procedure. For example, such fluids can include anesthetics, disinfectants, abrasive materials, gels, whiteners, mouthwash, sealants, lidocaine, or any other fluid, substrate, or other material used by dental practitioners or described herein.

The shapes of the connectors can vary, for example, to ensure that the syringe tip is properly connected to the appropriate ports of a dental syringe. In some embodiments, the shape can be a circle, an oval, a square, a triangle, or any other geometric and non-geometric shape. The connectors can have retention features, such as those described herein, designed to engage corresponding retention features located on attachable components. Such retention features can be separate from or integrated onto the connector. FIGS. 25A-F and 26A-C illustrate various embodiments of connectors having varying shapes and retention features. As shown in FIG. 25A, in some embodiments, the connector 2500A can have a threaded retention feature 2502A extending partially from a connecting end 2504A towards the opposite end. In some embodiments, the threaded retention feature 2502A can extend entirely towards the opposite end. In some embodiments, and as shown in FIG. 25B, the connector 2500B can have a threaded retention feature 2502B extending from a beveled connecting edge 2504B towards the opposite end. In some embodiments, such as shown in FIG. 25C, no retention features can be used on the connector. Other types of retention features such as clip mechanisms (ramps 2502D and annular slots 2502E), protrusions 2502F for a bayonet mount, and any other retention mechanism can be used. FIGS. 26A-C illustrate embodiments of connectors 2600A-C having a tapered shaped. As with the connectors 2500A-F described above, connectors 2600A-C can have various retention mechanisms, such as ramps 2602B and annular slots 2602C, located on its exterior surface. In some embodiments, retention features can be placed along an inner surface of the passages of connectors.

FIGS. 27A-H illustrate various placements of connectors on an outer core. As shown in FIG. 27A, in some embodiments, the outer core 2700A can have two passages 2702A, 2704A and a connector 2706A along a bottom surface 2708A of the outer core 2700A. As shown in the illustrated embodiment, the connector 2706A can be located towards a distal end of the outer core 2700A. The connector 2706A can be in fluid communication with the passage 2704A. This can advantageously allow fluids or other materials entering through connector 2706A to mix with other fluids passing through passage 2704A. As shown in FIG. 27B, in some embodiments, the outer core 2700B can have two passages 2702B, 2704B and two connectors 2706B, 2708B. Connector 2706B can be located along a top surface 2710B of the outer core 2700B and be in fluid communication with passage 2702B and connector 2704B can be located along a bottom surface 2712B of the outer core 2700B. As shown in the illustrated embodiment, the connectors 2706B, 2708B can be located towards a distal end of the outer core 2700B.

In some embodiments, such as those illustrated in FIGS. 27C and 27D, connectors 2702C, 2702D, 2704D can be located towards a proximal end of the outer cores 2700C, 2700D. Furthermore, in some embodiments, such as those illustrated in FIGS. 27E and 27F, the outer cores 2700E, 2700F can have multiple connectors 2702E, 2704E, 2702F, 2704F, 2706F, 2708F located along the same passage. As should be made apparent by these figures, connectors can be located at any position along the length of the outer core. Furthermore, in embodiments having connectors in fluid communication with both passages, the connectors 2702G, 2704G, 2702H, 2704H need not be located near the same end as illustrated in FIGS. 26G and 26H.

In some embodiments, connectors can be used with outer cores having retention features. For purposes of brevity, it should be noted that FIGS. 28A-J illustrate embodiments of various connector configurations on an outer core having no-taper passages with threaded retention features, similar to the embodiments discussed in connection with FIGS. 15A-J and that FIGS. 29A-J illustrate embodiments of various connector configurations on an outer core having no-taper passages with clip mechanism retention features, similar to the embodiments discussed in connection with FIGS. 18A-J.

Furthermore, in some embodiments, connectors can be used with outer cores having tapered passages, such as narrowing taper passages and expanding taper passages, with or without retention features. For purposes of brevity, it should be noted that FIGS. 30A-I illustrate embodiments of various connector configurations for an outer core having narrowing taper passages, similar to the embodiments discussed in connection with FIGS. 9A-C, and that FIGS. 31A-C illustrate embodiments of various connector configurations on an outer core having expanding taper passages, similar to the embodiments discussed in connection with FIGS. 10A-10C. Additionally, FIGS. 32A-H illustrate embodiments of various connector configurations on an outer core having narrowing taper passages with threaded retention features, similar to embodiments discussed in connection with FIGS. 16A-F, and that FIGS. 33A-H illustrate embodiments of various connector configurations for an outer core having narrowing taper passages with clip mechanism retention features, similar to embodiments discussed in connection with FIGS. 19A-F. As should be made apparent by these multiple combinations of various features illustrated in these figures, any and all of the features herein can be combined.

Connectors need not be limited to placement on proximal ends, distal ends, top surfaces, or bottom surfaces of the outer core. In some embodiments, such as that illustrated in FIG. 34A, the outer core 3400A can include a connector 3402A located along a lateral surface 3404A, that is, a surface between the top surface 3406A and bottom surface 3408A, of the outer core 3400A. Furthermore, the connector need not be attached at a right angle as shown in the previously described figures. For example, as shown in FIGS. 34B and 34C, in some embodiments the connector 3402B can be angled towards a proximal end 3404B while in some embodiments the connector 3402C can be angled away from a proximal end 3404C.

The degree of angling of the connector can be based upon flow requirements and other design considerations. For example, angling the connector towards a proximal end can reduce the likelihood that fluid flowing from a proximal end to a distal end of the outer core will divert into the connector's passage. Additionally, angling the connector towards a proximal end can reduce the likelihood that fluid entering into the passage from the connector will flow towards a proximal end. This can potentially reduce the amount of cross-contamination between two potentially different fluid flows. Conversely, angling the connector away from a proximal end can increase the likelihood that fluid flowing from a proximal end to a distal end of the outer core will divert into the connector's passage. Additionally, angling the connector away from a proximal end can increase the likelihood that fluid entering into the passage from the connector will flow towards a proximal end. This can be particularly advantageous in situations where it is desired that some amount of fluid flows from the proximal end into the connector or if significant mixing of the potentially two fluid flows is desired. In some embodiments, the angling of the connector, as measured from the surface normal, can range between approximately 0 degrees to approximately 80 degrees in any direction, between approximately 20 degrees to approximately 60 degrees in any direction, and between approximately 30 degrees to approximately 45 degrees in any direction, any angle within these ranges, and any other angle.

In some embodiments, the outer core can include partial passages which do not run through the length of the outer core. These partial passages can be in fluid communication with a connector located at some position on the outer core. For example, as illustrated in FIG. 35A, in some embodiments the outer core 3500A can have a partial passage 3502A in fluid communication with connector 3504A. As illustrated in FIG. 35B, in some embodiments the outer core 3500B can have two partial passages 3502B, 3504B in fluid communication with connectors 3506B, 3508B respectively. This two partial passage design can be advantageous in designs where it is desired that fluid flowing from a proximal end to a distal end of the outer core is diverted outwards. For example, a filter can be connected to connectors 3506B, 3508B.

In some embodiments, as discussed above, the connector can be located on a proximal end as shown in FIGS. 36A, 36B, 37A, 37B, 38A, and 38B with an outer core having various tapering configurations and retention features.

Connection of Outer Cores/Interlock Features

In some embodiments, the outer core can have interlock features so that multiple outer cores can be combined. The outer core can have one or more interlock features to allow the outer core to be connected to one or more outer cores. As illustrated in FIGS. 39A and 39B, the outer core 3900 can have an interlock feature 3902 along its bottom surface 3904 and outer core 3906 can have a corresponding interlock feature 3908 along its top surface 3910. As shown more clearly in FIG. 39B, the interlock feature 3902 can have a female dovetail shape designed to interlock with a male dovetail shape of interlock feature 3908. While the interlock feature 3902 extends longitudinally along the length of the outer core 3900, in some embodiments, the interlock feature 3902 can extend in other directions. For example, as shown in FIG. 102, in some embodiments, the outer core 10200 can have an interlock feature 10202 which extends transversely (i.e., side-to-side) and the outer core 10204 can have corresponding interlock features 10206 such that the outer core 10200 can be connected by transversely sliding the outer core 10200 with another outer core having a corresponding connector. In some embodiments, the interlock features, such as interlock features 3902, 3908, 10202, 10206, can extend partially across surfaces of the outer core. In some embodiments, this can inhibit further translation of one outer surface with respect to the other.

In other embodiments, such as that illustrated in FIGS. 40A and 40B, the outer core 4000 can have an interlock feature 4002 with multiple recesses along its bottom surface 4004 and outer core 4006 can have a corresponding interlock feature 4008 with multiple protrusions along its top surface 4010. These protrusions of interlock feature 4002 can be designed to fit within the recesses of interlock feature 4008 via, for example, a dowel-fit or press fit. Other types of interlock features can also be used. Furthermore, interlock features can be placed along other surfaces of the outer core such as lateral surfaces.

As illustrated in FIG. 103, the outer core 10300 can have more than one interlock feature, such as interlock features 10302, 10304, 10306, 10308, to allow for connection in multiple orientations or connection to one or more outer cores. The multiple interlock features can be of the same type or can be of different types. As illustrated in FIG. 103, multiple types of interlock features 10302, 10304, 10306, 10308 such as a female dovetail 10302, a snap fitting 10304, a pin or dowel 10306 and a male dovetail 10308, are included on a single outer core 10300. This can be used to ensure that only certain combinations of outer cores are attached together.

In some embodiments, the interlock features can be designed to allow the components to be locked in place such that removal is difficult and/or can cause the components to no longer be connectable. For example, the interlock features can be designed to deform upon being connected for the first time or can have certain geometries which render removal difficult, such as a V-shape which locks or clips in upon attachment. In some embodiments, the interlock features herein described can be designed to allow the components to be easily disconnected and reconnected.

In some embodiments, magnets and/or hook-and-loop fasteners such as Velcro can be used to connect outer cores together. In some embodiments, no interlock features are present and the two or more outer cores can be attached via other attachment mechanisms such as adhesives, welding, or the like. For example, a peel-and-stick adhesive can be used as described above.

In some embodiments, outer cores having different tapering, such as no-taper, narrowing tapers, and expanding tapers, can be attached together such as illustrated with outer cores 4100A, 4102A, 4100B, 4102B, 4200, 4202, 4300, 4302, 4400, 4402 in FIGS. 41A-44. Furthermore, in some embodiments, outer cores having two or more passages can also have interlock features. For example, as shown in FIG. 45, an outer core 4500 having two passages can have an interlock feature 4502 for attaching the outer core 4500 to a second outer core 4504 having an interlock feature 4506.

In some embodiments, such as is illustrated in FIG. 104, a first outer core 10400 can have an interlock features 10402 having passages 10404 and a second outer core 10406 can have corresponding interlock features 10408 having apertures 10410. The passages 10404 and apertures 10410 can allow fluid communication between passages 10412, 10414 of the first and second outer cores 10400, 10406. In some embodiments, only certain portions of the interlock feature can have such passages.

In some embodiments, as shown in FIG. 105, the outer core can be manufactured in a helical, serpentine, or similar shape. This can advantageously allow multiple outer cores and/or inner cores to be connected together. For example, as shown in FIG. 105, two helical outer cores 10500, 10502 can be combined into a double helix. As should be apparent, more than two outer cores and/or inner cores can be connected together in this way.

Coatings

In some embodiments, the outer core can also include coatings such as latex, silicon, wax, paraffin, carbon-coated spider silk, adhesives and other similar coatings which can enhance the retention and the seal between attached components. The coatings can have anti-microbial or hydrophobic properties. Furthermore, as will be discussed in further detail below, such coatings can also provide an indication as to whether the outer core has been used before. Such coatings can be placed on part of the outer core, such as the coating 10600 placed on outer core 10602 as shown in FIG. 106, or the entirety of the outer core. In some embodiments, such coatings can be placed on part of or the entirety of the retention feature, connectors, and/or interlock features. Such coatings can also be used on the inner cores and/or the carriers which will be discussed below in greater detail.

Inner Cores

The inner core can be designed to be placed within at least a portion of the outer core. As such, in some embodiments, the inner core can have a cross-sectional shape that matches that of the outer core. In some embodiments, the inner core can have a circular cross-sectional shape. In some embodiments, the inner core can have a non-circular cross-sectional shape, such as an oval, or similar shape, rectangle, square, pentagon, hexagon, or other polygonal shape. In some embodiments, the inner core can include some or all of the following features.

Wall Thickness & Passage Design

In some embodiments, the inner core can be designed to fit at least partially within a passage of the outer core. Accordingly, the inner core can have an elongate body correspondingly shaped to be received within a passage and a passage running therethrough similar to the passages described with respect to the outer cores above.

For example, as shown in FIG. 46, in some embodiments an inner core 4600 can have an elongate body 4602 with a constant cross-sectional shape and diameter (i.e., a "no-taper" elongate body). In some embodiments, the no-taper elongate body of the inner core can be sized to be received within a no-taper passage of an outer core. In some embodiments, the inner core 4600 can have a constant wall thickness throughout its length such that the passage 4606 generally has a cross-sectional shape which follows that of the outer surface 4604. In some embodiments, such as shown in FIGS. 47A and 48A, the inner cores 4700A, 4700B can have a variable wall thickness throughout its length such that the passages 4706A, 4706B have cross-sectional shapes and tapers which can differ from the cross-sectional shapes and tapers of the elongate bodies 4702A, 4702B of the inner cores 4700A, 4700B. This can advantageously allow the inner core to be used to modify the discharge pattern and/or discharge pressure of the syringe tip.

As shown in FIG. 48, in some embodiments, the inner core 4800 can have an elongate body 4802 with a decreasing cross-sectional shape and diameter from its proximal end 4806 to its distal end 4808 (i.e., a "narrowing taper" elongate body). In some embodiments, the narrowing taper elongate body of the inner core can be sized to be received within a narrowing taper passage of an outer core. In some embodiments, the narrowing taper inner core can have a constant wall thickness such that the passage 4810 generally has a cross-sectional shape which follows that of the outer surface 4804. In some embodiments, such as shown in FIG. 49, the inner core 4900 can have a variable wall thickness throughout its length. As such, the inner core 4900 can have a no-taper passage 4902 or a passage with a different taper. As should be apparent, an inner core can have an elongate body with an increasing cross-sectional shape and diameter from its proximal end to its distal end (i.e., an "expanding taper" elongate body). Additionally, in some embodiments, the tapering of the elongate body can be staged to be received within a staged passage such as those discussed in connection with FIGS. 12A-B and 13A-B. Other cross-sectional shapes and sizes can also be used.

Furthermore, in some embodiments, similar to the outer cores, the inner cores can have passages with staged tapering as described with respect to FIGS. 12A, 12B, 13A, and 13B. In some embodiments, similar to the outer cores, the inner cores can have passages which separate into multiple sub passages such as described with respect to FIGS. 14A-D. In some embodiments, the inner core can have additional openings which can correspond to connectors described in connection with FIGS. 25A-38B. In some embodiments, the inner core can have connectors similar to those on the outer core. In some embodiments, the inner core can be designed to block certain of the connectors to prevent flow into and out of certain of the connectors.

Channeled Passages

In some embodiments, the inner cores can have one or more grooves or channels located along the outer surface of the inner core. These grooves or channels can form a passage or passages when the inner core is placed into an outer core. This can advantageously facilitate the introduction of fluids into the syringe tip from locations other than the ends of the syringe tip. For example, these passages can be in fluid communication with connectors located on lateral surfaces of the outer core such as those described above.

As illustrated in FIGS. 107A and 107B, the inner core 10700 can have a first channel 10702 formed on an outer surface 10704 of the inner core 10700. As shown in the illustrated embodiment, the first channel 10702 can spiral around the outer surfaces. Other channel designs, such as longitudinally extending or straight channels, can also be used. The inner core 10700 can also have a passage 10706 extending through the inner core 10700. When the inner core 10700 is inserted into the outer core 10708, the outer surface 10704 of the inner core 10700 can be designed to sealingly contact the inner surface of the outer core 10708 such that fluid passages are defined by the channel 10702 and the inner surface of the outer core 10708. Accordingly, the combination of the inner core 10700 with the outer core 10708 can advantageously result in a dental syringe tip with two fluid passages—one located through the center of the inner core 10700 and a second along the outer surface of the inner core 10700. Fewer or greater numbers of fluid pathways can be created using this structure.

In some embodiments, similar to the sub-passages described above, the channels located on the outer surface can split into two or more sub-channels. Additionally, in some embodiments, two or more channels can combine to create a combined fluid flow. Furthermore, as illustrated in FIG. 108, multiple channeled passages 10800, 10802 can combine to form a single passage 10804. This can advantageously permit combined fluid flows through a single channeled passage.

Retention Features

In some embodiments, the inner core can have an elongate body without any retention features. Such embodiments can be used, for example, with outer cores having no retention features. In these embodiments, the inner core can be retained within a passage of the outer core, for example, via a frictional fit, adhesives, welding, or similar. Embodiments of such inner cores of varying lengths are illustrated in FIGS. 50A-54D.

As shown in FIGS. 50A and 50B, the inner core 5000 can have a no-taper elongate body 5002 which can have beveled proximal and/or distal edges 5004, 5006 designed to facilitate insertion into no-taper passages 5012A, 5012B of an outer core 5010. As shown, the distal beveled edge 5002 can be placed flush with, or generally near, the distal end 5014 of the passages 5012A, 5012B of the outer core 5010 such that the inner core 5000 travels the full length of the passages 5012A, 5012B. Furthermore, a proximal portion 5008 of the inner core 5000 can project proximally from the proximal end 5016 of the passages 5012A, 5012B. This proximal portion 5008, and any protruding portion of any of the inner cores described herein, can function similar to a connector and can have all of the features of the connector as described above with respect to FIGS. 25A-F and 26A-C.

In some embodiments, as shown in FIGS. 51A and 51B, 52A, and 42B, the inner cores 5100, 5200 can be partial length such that it extends only partially into the passages of the outer cores 5110, 5210. In some embodiments, the inner core can be designed such that it is inserted into seventh-eighths the length of the passage, three-quarters the length of the passage, two-thirds the length of the passage, one-half the length of the passage, three-eighths the length of the passage, one-third the length of the passage, one-fourth the length of the passage, one-eighth the length of the passage, one sixteenth the length of the passage, or any other length of the passage. Partial length inner cores can be particularly advantageous in embodiments of the syringe tip in which the syringe tip is bent after assembly. Decreasing the length of the inner core can reduce the likelihood that the passage of the inner core can be pinched after the syringe tip is bent. Furthermore, in some embodiments, the inner core can be an extended length that is designed to protrude distal from the distal end of the outer core.

As shown in FIGS. 53A and 53B, the inner core 5300 can have a narrowing taper elongate body 5302 which can have beveled proximal and/or distal edges 5304, 5306 designed to facilitate insertion into no-taper passages 5312A, 5312B of an outer core 5310. The inner core 5300 can be a full length inner core. As shown in FIGS. 53C and 53D, the inner core 5300B can have similar features to inner core 5300 but with an elongate body having a greater degree of taper. Furthermore as shown in FIGS. 54A-D, in some embodiments, the narrowing taper inner cores 5400, 5400B can be partial length and can have features similar to those no-taper elongate body, partial-length inner core embodiments described in connection with FIGS. 51A-B and 52A-B.

In some embodiments, the inner core can have one or more retention features located at various positions. Such embodiments can be used, for example, with outer cores having corresponding retention features. For example, in some embodiments, the inner cores can have threaded retention features as shown in FIGS. 55A-61D.

As shown in FIGS. 55A and 55B, the inner core 5500 can have a no-taper elongate body 5502 which can have beveled proximal and distal edges 5504, 5506 designed to facilitate insertion into no-taper passages 5512A, 5512B of an outer core 5510. As shown, the distal beveled edge 5502 can be placed flush with, or generally near, the distal end 5514 of the passages 5512A, 5512B of the outer core 5510 such that the inner core 5500 travels the full length of the passages 5512A, 5512B. Furthermore, a proximal portion 5508 of the inner core 5500 can project proximally from the proximal end 5516 of the passages 5512A, 5512B. This proximal portion 5508 can function similar to a connector and can have all of the features of the connector as described above with respect to FIGS. 25A-F and 26A-C. The inner core can have a threaded retention feature 5509 located near the proximal portion 5508 configured to engage a corresponding threaded retention feature on the outer core 5510. As shown in FIGS. 56A-B and 57A-B, in some embodiments, partial length inner cores, 5600, 5700 such as those described in connection with FIGS. 51A-B and 52A-B, can have threaded retention features 5602, 5702. For purposes of brevity, it will simply be noted that the threaded, partial-length inner cores 5600, 5700 can share features similar to those of partial-length inner cores 5100, 5200.

In some embodiments, the inner cores can have multiple retention features at various locations. As shown in FIGS. 58A and 58B, the inner core 5800 which shares features similar to inner core 5500, can have multiple threaded retention features 5802, 5804 with one threaded retention feature 5802 located at a distal end and a threaded retention feature 5804 located near a proximal end. Multiple threaded designs can provide advantages such as and enhanced fit with reduced likelihood of disengagement of the inner core from the outer core.

In some embodiments, the distal end of an inner core can protrude distal from the distal end of the passage of the outer core in which the inner core is inserted. For example, as shown in FIGS. 59A and 59B, the inner core 5900 can have a distal end 5902 which extends beyond the distal end 5912 of the outer core 5910. In some embodiments, such as that shown in FIG. 59A, the inner core 5900 can have a threaded retention feature 5904 at the distal end 5902 and a threaded retention feature 5906 near a proximal end. Since the threaded retention feature 5904 extends beyond the outer core 5910, the threaded retention feature 5904 can advantageously be used to securely attach other components, such as tip modifiers, to the inner core 5900. As shown in FIGS. 60A-D and 61A-D, in some embodiments, narrowing taper inner cores, 6000, 6000B, 6100, 6100B, such as those described in connection with FIGS. 53A-D and 54A-D, can have threaded retention features 6002, 6002B, 6102, 6102B. For purposes of brevity, it should be noted that threaded, partial-length inner cores 6000, 6000B, 6100, 6100B can share features similar to those of partial-length inner cores 5300, 5300B, 5400, 5400B.

In some embodiments, the inner cores can have clip mechanism retention features as shown in FIGS. 62A-68D. For purposes of brevity, it will be noted that, in some embodiments, inner core 6200 can share features similar to those described with respect to inner cores 5000, 5500, inner core 6300 can share features similar to those described in connection with inner cores 5100, 5600, inner core 6400 can share features similar to those described w in connection with inner cores 5200, 5700, inner core 6500 can share features similar to those described in connection with inner cores 5800, inner core 6600 can share features similar to those described in connection with inner cores 5900, inner core 6700 can share features similar to those described in connection with inner cores 5300, 6000, inner core 6700B can share features similar to those described in connection with inner cores 5300B, 6000B, inner core 6800 can share features similar to those described in connection with inner cores 5400, 6100, in some embodiments, inner core 6800B can share features similar to those described in connection with inner cores 5400B, 6100B. As should be made apparent, clip mechanism retention features 6202, 6302, 6402, 6502, 6504, 6602, 6604, 6606, 6702, 6702B, 6802, 6802B can be used.

In some embodiments, the clip mechanism on the inner core can be an annular protrusion, such as retention mechanism 6902 on inner core 6900. In some embodiments, the clip mechanism retention feature on the inner core can be a ramp 6902B on inner core 6900B which is beveled towards a distal end 6904B of the inner core 6900B to facilitate insertion into a passage of an outer core. In some embodiments, the clip mechanism retention mechanism 6902, 6902B can deform when first inserted into the passage and return to its original shape once received within the corresponding clip mechanism retention feature of the outer core.

As discussed above, in some embodiments, the inner core can include other types of retention features which correspond to those of the outer core as described above. For example, retention features such as snap-lock type mechanisms, ribs, "harpoons" or angled ridges, pinned closures, bayonet mounts and other types of twist locking mechanisms, fins, dimples, magnets, hook-and-loop fasteners such as Velcro, one way ratchet mechanisms such as zip-ties, adhesives such as a peel-and-stick adhesive, and other retention features known in the syringe tip art, or a combination of the above. In some embodiments, the retention feature can include movable components such as hinges with snap or pin closures, sliding sheath connectors, and similar retention features with movable components. In some embodiments, a combination of these features can be used.

Carriers

The carrier can serve as a connector which can provide additional stability for the outer core and/or inner cores. The carrier can be designed to retain any number of inner cores or other components prior to insertion into the outer core. It can be designed to attach to the outer cores to reduce the likelihood of separate outer cores detaching from either the inner cores or each other. Additionally, it can provide additional sealing capabilities.

Carrier Retention Features

In some embodiments, the carrier can include any number of holders designed to retain multiple inner cores. In some embodiments, such as that shown in FIGS. 70A and 70B, the carrier 7000 can have two holders 7002, 7004 designed to receive two inner cores. In the illustrated embodiment, the carrier 7000 lacks retention features in the holders such that an inner core can be retained within the holder via, for example, a press fit, adhesives, welding, or the like. Of course, similar to the inner core and outer core, in some embodiments, the carrier can have holders with retention features configured to engage corresponding retention features located on inner cores or other attachable components. Such retention features can be any of those herein described with respect to the outer core and inner core. In some embodiments, this can include the use of hook-and-loop fasteners such as Velcro, magnets, and the like. In some embodiments, the carrier can have a hinged design similar to that described above with respect to FIGS. 94-96. The entirety of the carrier can be of this hinged design.

For example, as shown in FIGS. 71A-D, in some embodiments, carriers 7100A, 7100B can have threaded retention features on an inner surface of the holders 7102A, 7102B, 7104B. Other retention features can also be used. For example, as shown in FIGS. 72A-D, in some embodiments, carriers 7200A, 7200B can have clip mechanism retention features on an inner surface of the holders 7202A, 7202B, 7204B. While only two retention mechanisms were discussed with respect to the carrier, it should be understood that any other types of retention features as described herein, such as bayonet mounts and the like, can be used. Furthermore, it should be understood that, the holders of the carriers need not have similar retention mechanisms or only have a single retention mechanism per holder. In some embodiments, the holders can have more than one retention mechanism and/or have dissimilar retention mechanisms.

In some embodiments, the carrier can include additional features designed to allow the carrier to be attached to the outer cores. For example, as shown in FIGS. 73A-75D, carriers 7300, 7400A, 7400B, 7500A, 7500B which can have features similar to those described in connection with carriers 7000, 7100A, 7100B, 7200A, 7200B, can include clips 7302, 7302A, 7302B, 7302A, 7302B along a face of the carrier 7300, 7400A, 7400B, 7500A, 7500B. In some embodiments, clips, such as clips 7302, 7302A, 7302B, 7302A, 7302B, can be designed to attach corresponding recesses on an outer core.

Combined Carriers

As with all other components described herein, in certain embodiments, carriers can be integrally formed with other components, such as outer cores and inner cores, such that they form a monolithic unit. For example, in some embodiments, such as illustrated in FIG. 76, a carrier 7600 can include inner cores 7602, 7604 which can be of any type as described herein. In some embodiments, such as illustrated in FIGS. 77A and 77B, the carrier 7700 can be detached into a first unit 7702 and a second unit 7704. The first unit 7702 can have a portion of the carrier 7700 and an inner core 7706 integrally formed thereon and the second unit 7704 can have a portion of the carrier 7700 and an inner core 7708 integrally formed thereon. In some embodiments, the first unit can include an interlock feature 7710, such as the illustrated protrusions or dowels, and the second unit can include a corresponding interlock feature 7712, such as the illustrated recesses, designed to allow the first unit 7702 and second unit 7704 to be connected. In other embodiments, the interlock features 7710, 7112 can be dovetails or similar devices such as those described above in connection with outer cores. In other embodiments, no interlock feature is provided and the two units 7702, 7704 can be combined via adhesives such as a peel-and-stick adhesive, welding, magnets, hook-and-loop fasteners such as Velcro, or similar. In some embodiments, the carriers can be connected using any other retention feature or interlock feature as herein described such as sliding sheaths, snap-fits, and the like. While the inner cores described herein are integrally formed on the carriers, it should be noted that the inner cores need not be integrally formed and can instead be separate pieces. Accordingly, in some embodiments, the carrier can be a multi-piece design, such as carrier 7700, with one or more holders and no inner cores integrally formed thereon or can have a combination of holders and integrally formed inner cores.

For example, as shown in FIGS. 78A-80, in some embodiments, the carrier 7800 can have an inner core 7802 integrally formed thereon with a holder 7804 free to receive a separate inner core such as inner core 7806 or inner core 7808. As shown in the illustrated embodiment, in some embodiments the holder 7804 can have a threaded retention feature or any other type of retention feature. As shown in FIGS. 79-80, the inner core shape can be any of those described herein, such as full-length narrowing taper inner core 7902 and partial-length narrowing taper inner core 8002. Furthermore, as illustrated in FIG. 81, other types of retention features, such as clip mechanism retention feature 8102 can be used in open holders 8104 of such combined connector and inner cores. Moreover, as illustrated in FIG. 82, the integrally formed inner cores 8202, 8204 can be of different size and shape and can have passages 8206, 8208 that is narrower about the carrier region.

As illustrated in FIGS. 83-93, the outer core, inner core, and carrier can be combined in multiple ways.

Multi-piece Components

In some embodiments, components of the syringe tip, such as the outer core, the inner core, and the carrier, can include multiple sub-components allowing certain portions to be interchangeable. For example, as illustrated in FIG. 109, the outer core 10900 can have a first sub-component 10902 and a second sub-component 10904 forming a straight section 10905, a third sub-component 10906 forming a first bend section 10908, and a fourth sub-component 10910 forming a second bend section 10912. The multiple sub-components 10902, 10904, 10906, 10910 can be attached using any of the above-mentioned retention features, connectors, and interlock features. Moreover, the connection mechanism between different sub-components can differ. For example, some sub-components can be connected using a press-fit or clip retention mechanism and other sub-components can be connected using threading.

One advantage of using multiple sub-components is the ability to easily modify the shape of the component. For example, as illustrated in FIG. 109, the third sub-component 10906 can be rotated relative to the first, second and fourth sub-components 10902, 10904, 10910 and the fourth sub-component 10910 can be rotated relative to the first, second, and third sub-components 10902, 10904, 10906. This can be achieved, for example, by using a connection mechanism such as the clip retention mechanism, press fit, or any other connection mechanism allowing for rotation of connected components in relation to each other. Accordingly, the bend sections 10908, 10912 of the outer core 10900 can be adjusted to accommodate the needs of the end user without having to swap to a different outer core. This can be particularly advantageous since dental professionals often work on different areas of a patient's mouth within a short period of time. The enhanced adjustability can be a significant advantage to enhance comfort for both the end user and the patient and reduce the amount of time taken for a procedure.

A second significant advantage of using multiple sub-components is the ability to easily manufacture and stock syringe tips and components having different performance characteristics. For example, as illustrated in FIG. 109, the syringe tip has a first sub-component 10902 and a second sub-component 10904 forming a straight section 10905 of the device. Removal of the first sub-component 10902 can, for example, result in an outer core with different performance characteristics such as a higher pressure. Accordingly, an end user need not stock two separate outer cores but rather can stock a single outer core and add or remove a sub-component if needed to alter the performance characteristics.

Additionally, as illustrated in FIG. 109, the syringe tip has a third sub-component 10906 and a fourth sub-component 10910 forming bend sections 10908, 10912 of the outer core 10900. An end user can add or remove sub-components to alter the number of bend sections for the outer core to suit the type of procedure being performed.

Furthermore, other types of sub-components can be used to alter other performance characteristics of the outer core such as those characteristics as herein discussed. For example, some sub-components can provide a narrowing or expanding taper passage. In some embodiments, some sub-components can be used to create sub-passages. In some embodiments, some sub-components can be used to provide different retention and/or interlock features. In some embodiments, some sub-components can provide additional connectors. Other types of performance characteristics can also be modified by use of such sub-components.

As should be apparent, such advantages also translate to the manufacturer and distributor who can increase production of sub-components which are in higher demand and decrease production of sub-components which are in lower demand. Additionally, this can facilitate manufacturing as shorter sub-components can be easier to manufacture within prescribed tolerances.

While sub-components have been described in detail with respect to outer cores, sub-components can also be used for inner cores and/or carriers. Furthermore, while sub-components were described as being part of a "straight" section or a "bend" section, sub-components need not be limited to being either straight or bent. Rather, sub-components can also include one or more straight sections and one or more bend sections.

Sealing Devices

In some embodiments, sealing devices can be used on any component to enhance the seal and reduce the potential for leakage between connected components. In some embodiments, components of the syringe tip can include a groove along an end intended to be placed in connection with another component. This groove can be designed to receive an o-ring or similar sealing device, such as a caulking, to enhance the seal between two attached components. For example, as illustrated in FIG. 110 the outer core 11000 can have a groove 11002 located at a proximal end 11004 to receive a sealing device 11006 which can project beyond the outer core 11000. By projecting beyond the outer core 11000, the sealing device 11006 can be placed against the other component, such as the dental handpiece or adaptor, to form a seal between the outer core 11000 and the other component. This can significantly enhance the seal between the components and reduce the potential for leakage. This can thereby reduce the chance for cross-contamination of multiple fluid passages for example.

In some embodiments, the sealing device 11006, such as an o-ring, can be retained in the groove 11002 via a friction fit. In some embodiments, the sealing device 11006 can be adhered to the component such as via use of an adhesive. In some embodiments, an adhesive or similar can be used to attach the o-ring or other sealing device, such as caulking, to the component without need for a groove. In some embodiments, the adhesive itself can serve as a sealing device. The sealing devices can be placed along any other portion of the outer core or any other component as herein described. For example, the sealing device can be used on the inner core and/or the carriers.

Construction

The multiple components of the syringe tip can be manufactured using multiple manufacturing techniques. For example, in some embodiments, some components, such as the outer core, inner core, and carrier can be manufactured using manufacturing techniques such as injection molding, extrusion or pultrusion, overmolding, machining, a combination of these techniques or similar manufacturing techniques. Due to the multiple unit construction, it is possible that certain components can be produced using one manufacturing technique and other components can be produced using a second manufacturing technique. For example, outer cores having no-taper passages and carriers may be cost-effectively manufactured using extrusion or pultrusion techniques whereas a more intricate design for an inner core can be manufactured using injection molding techniques where it may be more difficult to produce using extrusion or pultrusion techniques. This can effectively reduce the costs of manufacturing the devices. As should be apparent, all components can also be manufactured using the same manufacturing technique.

In some embodiments using a coating as described above, the coating can be applied by processes such as dipping, spraying, painting, or similar processes of applying a coating to a device. Accordingly, this step can be performed after a component has been manufactured using the techniques listed above. In some embodiments, this step can also be performed concurrently. For example, the coating and the component can be co-extruded.

The multiple components of the syringe tip can be manufactured from multiple materials. For example, in some embodiments, some components, such as the outer core, the inner core, and the carrier, can be manufactured from materials such as plastics, elastomers, metals, and the like.

In some embodiments, some components, such as the outer core, the inner core, and/or the carrier, can be manufactured from biodegradable materials which can facilitate disposal and reduce the impact to the environment. For example, the biodegradable materials used can be home compostable, industrial compostable, landfill degradable, and/or marine degradable. In some embodiments, the material can be semi-water soluble. The biodegradable materials can also be made of a renewable material. Examples of such biodegradable materials include biopolymers and/or bios-resins manufactured from agricultural materials. These agricultural materials can be manufactured from waste agricultural materials to reduce the impact to the environment. Such biopolymers can be based on polyhydroxyalkanoates (PHA) and other linear polyesters. Other such biopolymers can be based on polyactic acids (PLA) and other thermoplastic aliphatic polyesters. In some embodiments, the components can be manufactured partially from biodegradable materials or from a combination of different biodegradable materials. For example, some components, such as the outer core, inner core, and the carrier, can be manufactured from plastics such as polyvinyl chloride with biodegradable additives. In some embodiments, some components can be manufactured from plastics with additives that enhance the biodegradability of the plastic. In some embodiments, the outer core can be manufactured from plastics having greater rigidity than the other components. In some embodiments, the outer core can be manufactured from translucent materials which can advantageously allow a user of the device to view the flow of fluids through the device. Furthermore, in some embodiments, the outer core can be manufactured from phosphorescent materials which can advantageously allow the outer core to provide illumination when placed within a dark space (e.g., a patient's mouth).

In some embodiments, components of the device, such as the outer core, inner core, and/or the carrier, can be manufactured from materials having anti-microbial properties to reduce or inhibit the accumulation of bacteria, viruses, fungi, and/or parasites on the component. This can advantageously enhance the shelf-life of such components. As discussed above, the anti-microbial material can also be placed on the components via a coating.

In some embodiments, components of the device, such as the outer core, inner core, and/or the carrier, can be provided with a hydrophobic coating.

In some embodiments, the inner core can be manufactured from the same material as the outer core. In some embodiments, the inner core can be manufactured from materials different from those used for the outer core. For example, in some embodiments, the inner core can be manufactured from materials allowing for more significant deformation, such as soft plastics whereas the outer core can be manufactured from materials having greater rigidity. Use of a softer plastic for the inner core can advantageously provide a more significant sealing effect to reduce the likelihood of fluid leakage after combination of the outer core and inner core.

In some embodiments, the carrier can be manufactured from the same material as the outer core or inner core. In some embodiments, the carrier can be manufactured from materials different from those used for the outer core or inner core. For example, in some embodiments, the carrier can be manufactured from materials providing greater sealing characteristics, such as rubbers. Use of rubber for the carrier can advantageously provide a seal which reduce the likelihood of fluid leakage after combination of the outer core, inner core, and carrier.

Furthermore, in some embodiments, other devices which can be used in conjunction or separately with the dental tip system described herein can be manufactured from one or more of the materials described above. For example, portions or the entirety of devices such as injectors, prophy heads, prophy cups, prophy brushes, saliva injectors, low pressure and high pressure suction tools, dental bibs, trays, covers and dental cups, can be manufactured from biodegradable materials.

As described above in connection with FIG. 4, in some embodiments, the syringe tips can have one or more bending features. In some embodiments, the syringe tips can be manufactured with the bending features during the initial phase of manufacturing such as via injection molding. In some embodiments, the bending features can be added after the initial phase of manufacturing. For example, the syringe tip can be extruded or pultruded into a straight member and subsequently bent to have one or more bending features. The step of bending can include heating the syringe tip to increase the malleability of the syringe tip. In some embodiments, this step of bending can occur after one or more components of a syringe tip have been connected. In other embodiments, this step of bending can occur before any components are connected together.

As should be apparent from the disclosure, the multiplicity of components described herein can be combined either by the end-user or the manufacturer to prepare a complete syringe tip. Preparation of the syringe tip, depending on the types of components used, can include the followings steps.

As a first step, multiple outer cores can be attached together to form an outer core assembly. Attachment of the multiple outer cores can be accomplished using interlock features as described herein such as sliding connectors, snap fits, slots, and pins. In embodiments where the outer cores do not have interlock features, the multiple outer cores can be attached using other attachment techniques such as described above including adhesives, welding, magnets and hook-and-loop fasteners. As should be apparent, in embodiments where only a single outer core is used, this step can be omitted.

As a second step, multiple carrier units can be attached together to form a carrier unit. As should be apparent, in embodiments where a carrier is not used or where only a single carrier is used, this step can be omitted.

As a third step, one or more inner cores can be attached to one or more carriers to form a carrier assembly. Attachment of the one or more inner cores to the carrier can be accomplished using retention features as described herein such as sliding connectors, snap fits, slots, and pins. In some embodiments, attachment of the one or more inner cores can be accomplished using other attachment techniques such as described above including adhesives, welding, magnets and hook-and-loop fasteners. As should be apparent, in embodiments where the inner core is formed integrally with the carrier or where no carrier or inner core is used, this step can be omitted.

As a fourth step, the one or more inner cores can be inserted into and attached to the passages of the outer cores or outer core assembly. Attachment of the one or more inner cores can be accomplished using retention features as described herein such as sliding connectors, snap fits, slots, and pins. In some embodiments, attachment of the one or more inner cores can be accomplished using other attachment techniques such as described above including adhesives, welding, magnets and hook-and-loop fasteners. As should be apparent, in embodiments where no inner core is used, this step can be omitted.

Color Coding

In some embodiments, components of the syringe tip, such as the outer core, inner core, and/or carrier can be wholly or partially a particular color. In some embodiments, the color coding can be used to indicate whether the components of the syringe tip are in the proper orientation and alignment prior to the end user's assembling the components. For example, one end of the device can be provided with a first color and a second end of the device can be provided with a second color.

In some embodiments, the color coding can be used to refer to particular fluids or ports to which the particular component is to connect. For example, a first inner core can be colored blue for attachment to a water port and a second inner core can be colored green for attachment to an air port. These colors can be chosen to correspond to international and/or national standards or conventions to facilitate the use of the components by any end user.

Colors can also be used to indicate to an end user the particular characteristics of the component. For example, a component which produces a high pressure fluid flow can be colored red whereas a component which produces a low pressure fluid flow can be colored blue. As should be apparent, colors can also be mixed and particular patterns can be produced on a component to provide more information regarding the properties of the component.

Tamper Resistance

In some embodiments, components of the syringe tip, such as the outer core, inner core, and/or carrier can include features which reduce the potential for tampering or reuse of components. This is particularly important for disposable components of the syringe tips. It is important that the end-user and patient know that they are using a new and sterile component. As mentioned above, one advantage of disposable components is the reduction of contaminants, such as bodily fluids, bacteria, and viruses, from one patient being spread to other patients. While conventional sterilization procedures can reduce harmful contaminants from spreading from one patient to the next, there still lies a risk that some contaminants remain even after sterilization. Complete disposal of certain disposable components, particularly those which are placed in close proximity with a patient, reduces this risk. Accordingly, certain features can be provided to inform the end user and patient that the device is new and sterile.

As discussed above, components of the syringe tip can have a coating placed over at least part of the component. This coating can be designed to indicate when components have been attached or removed. In some embodiments, the coating can deform or be displaced upon attachment to another component such that, when the component is removed, an end user or patient can easily visually detect the used status of the component.

In some embodiments, the retention features on the outer core and corresponding retention features on the inner core can deform upon first use. In some embodiments, the deformation can render removal of the attached components more difficult. Furthermore, if removed, the retention features can be less effective upon reattachment of a component.

Additionally, as mentioned above, in some embodiments, a peel-and-stick adhesive can be used. As a reuse deterrent, the adhesive can be designed so that components are less effectively attached if the adhesive was previously used.

In some embodiments, components of the syringe tip can have additional portions which change in color upon exposure to certain chemicals. For example, the component can change from its original color to another color upon exposure to chemicals used for serialization such as alcohol, glutaraldehyde hydrogen peroxide and other sterilization products. This can deter attempts to sterilize and reuse the disposable component. In some embodiments, the component can have patterns or other types of indicators which emerge upon exposure to such chemicals such that an end user and patient can readily notice when a product is not new. In some embodiments, these indicators can emerge upon exposure to other fluids, such as saliva, or temperatures higher than temperatures the syringe tip would be exposed to during shipping, handling, and regular use.

Product Usage Monitoring

In some embodiments, the syringe tip can include a near-field communication (NFC) device. The NFC device can be used to communicate with a receiver such as a personal computer, a smartphone, or other electronic device capable of receiving a signal from an NFC device. The NFC device can be a passive device, such as a tag, sticker or similar, integrated into or placed on the component. Use of a passive device can advantageously reduce the complexity of the component and not require an active power source to be used. Rather, such passive devices can be "powered" by the receiver when the receiver is placed in proximity of the NFC device. In some embodiments, the NFC device can be an active device which uses an active power source.

In some embodiments, the receiver can, for example, transmit such information to the end-user to indicate current supply of components so that the end-user can determine whether it is appropriate to restock these components. This can beneficially reduce the likelihood that the end-user runs out of components prior to receiving a new shipment. Furthermore, such a feature can provide real-time data to the end-user to indicate which components are used more frequently. This can advantageously allow the end-user to stock a greater number of certain components.

The receiver can also provide such information to manufacturers, distributors, and other parties. This can beneficially inform such parties of the current stock of products so that the party can send a reminder to the end-user to resupply their stock of certain components. This can also provide valuable information to manufacturers by providing the manufacturer with information regarding component usage. With such information, a manufacturer can modify its tooling to increase produce the more frequently used components and decrease production of less frequently used products. Furthermore, such information can also be used to track shipments and the location where a product is eventually used. This can beneficially provide distributors and other parties with enhanced knowledge for purposes of targeting specific markets.

In some embodiments, the storage unit in which the components are shipped can contain a receiver and transmit data regarding use of the components. In some embodiments, the component with the NFC device can communicate with devices on the end-user, such as a smartphone or other wireless device.

In some embodiments, the component can include other sensor devices, such as a fingerprint sensor. The fingerprint sensor can be used in conjunction with the NFC device to provide more accurate monitoring of component usages.

Light Transmission

In some embodiments, the syringe tip can be designed to direct light from a first location to one or more output locations. For example, the syringe tip can include a light transmitter designed to direct light from a proximal end to a distal end of the syringe tip to illuminate the target site within the mouth of a patient. Such transmission of light can occur even in syringe tips having multiple bends. In some embodiments, a material capable of transmitting light, such as an optical fiber, hydrogel, or any other type of material and structure capable of directing light, can be used. In some embodiments, the optical fiber can be manufactured from glass, plastic, or similar materials capable of transmitting light. In some embodiments, the optical fiber can be integrated into the outer core and/or the inner core. In some embodiments, the optical fiber can be removable from the outer core and/or the inner core. For example, the optical fiber can be integrated into the inner core which is removable from the outer core. In some embodiments, the inner core itself can be the light transmitting device. In some embodiments, multiple optical fibers can be used. This can advantageously allow the direction of light to multiple output locations.

In some embodiments, a light source can be included in the syringe tip such that light can be provided regardless of the functionality of other devices, such as the dental syringe, used during the operation. In some embodiments, the syringe tip does not include a light source but rather redirects light from another device.

Scents

In some embodiments, components of the syringe tip can include scented materials. For example, the outer core can be manufactured from a scented plastic. In some embodiments, scents such as apple, basil, cinnamon, chamomile, coconut, geranium, juniper, lavender, mandarin, patchouli, rose, sandalwood, ylang ylang and other scents can be used. This can advantageously provide a therapeutic benefit to all dental patients as syringe tips are used in virtually all dental visits. Furthermore, the syringe tips are placed near a patient's nose such that the scent can easily be detected. The scent emitted from the tip can be used to relax the patient and can thereby reduce the likelihood of potential injuries caused by the patient due to stress or anxiety during a dental procedure.

Any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

It should be emphasized that many variations and modifications may be made to the herein-described embodiments, the elements of which are to be understood as being among other acceptable examples. All such modifications and variations are intended to be included herein within the scope of this disclosure and protected by the following claims.

What is claimed is:

1. A syringe tip for attachment to a dental syringe, the syringe tip comprising:
   an outer core comprising an elongate member having a proximal end and a distal end, the outer core having a first proximal aperture at the proximal end, a first distal aperture at the distal end, and a first passage connecting the first proximal aperture with the first distal aperture and defining a first interior surface of the outer core, the outer core also having a second proximal aperture at the proximal end, a second distal aperture at the distal end, and a second passage connecting the second proximal aperture with the second distal aperture and defining a second interior surface of the outer core, the first and second passages extending parallel to each other through the outer core;
   a first inner core comprising an elongate member having a proximal end and a distal end, the first inner core having a first proximal aperture at the proximal end, a first distal aperture at the distal end, and a first passage connecting the first proximal aperture and the first distal aperture;
   wherein the first inner core is configured to be received and retained within the first passage of the outer core; and
   a second inner core comprising an elongate member having a proximal end and a distal end, the second inner core having a second proximal aperture at the proximal end, a second distal aperture at the distal end, and a second passage connecting the second proximal aperture and the second distal aperture;
   wherein the second inner core is configured to be received and retained within the second passage of the outer core;
   wherein at least one of the outer core and the first inner core has a connector providing a third passage through a top, bottom, or lateral surface of the least one of the outer core and the first inner core such that the third passage is in fluid communication with the first passage of the at least one of the outer core and the first inner core;
   wherein the connector is positioned at a location other than a proximal and distal end of the at least one of the outer core and the first inner core;
   the syringe tip further comprising a carrier with two holders configured to receive the first and second inner core, the carrier having a clip mechanism that engages a corresponding recess on the outer core.

2. The syringe tip of claim 1, wherein the first proximal aperture of the outer core has a first diameter and the first distal aperture of the outer core has a second diameter not equal to the first diameter and wherein the first passage of the outer core tapers from the first diameter to the second diameter.

3. The syringe tip of claim 1, wherein the outer core further comprises a retention feature proximate at least one of the proximal end and the distal end and the first inner core comprises a corresponding retention feature configured to engage with at least a part of the outer core's retention feature.

4. The syringe tip of claim 3, wherein the retention feature comprises at least one of threads, a slot, a snap fitting, a twist-lock mechanism, fins, dimples, a hinge, an adhesive, and a coating along the interior surface of the outer core.

5. The syringe tip of claim 1, wherein the first inner core extends at least partially into the first passage of the outer core.

6. The syringe tip of claim 1, wherein the syringe tip has at least one bending feature.

7. The syringe tip of claim 1, wherein at least one of the first outer core and first inner core are provided with a coating of material on a proximal end so as to enhance the seal between the outer core and first inner core and a component to be attached.

8. The syringe tip of claim 1, wherein at least one of the outer core and the first inner core comprise an anti-microbial material.

9. The syringe tip of claim 1, wherein at least one of the outer core and the first inner core comprises a light transmitter to direct light from a first location to a second location.

10. The syringe tip of claim 1, wherein the first inner core comprises a light transmitter, the first inner core comprising a plastic.

11. The syringe tip of claim 1, wherein the syringe tip further comprises a sealing device.

12. The syringe tip of claim 1, wherein the syringe tip further comprises an adhesive with a cover, the cover being removable to expose the adhesive.

13. A syringe tip for attachment to a dental syringe, the syringe tip comprising:
   an outer core comprising an elongate member having a proximal end and a distal end, the outer core having a first passage and a second passage that are spaced apart and parallel to each other, each of the first and second passages having a proximal aperture at a proximal end of the outer core, and a distal aperture at a distal end of the outer core; and
   a set of connectors at the proximal end of the elongate member, the set of connectors configured to connect to ports of at least one of a dental syringe or an adaptor;
   wherein for each of the first and second passages, the proximal aperture has a first diameter and the distal aperture has a second diameter not equal to the first diameter;
   wherein the first and second passages continuously taper from the proximal aperture to the distal aperture;
   wherein the outer core has an additional connector providing a third passage through a top, bottom, or lateral surface of the outer core such that the third passage is in fluid communication with the first passage of the outer core;
   wherein the additional connector is positioned at a location other than the proximal and distal end of the outer core; and
   the syringe tip further comprising a carrier with two holders configured to receive the first and second inner core, the carrier having a clip mechanism that engages a corresponding recess on the outer core.

14. A syringe tip for attachment to a dental syringe, the syringe tip comprising:
- an outer core comprising an elongate member having a proximal end and a distal end, the outer core having first and second proximal apertures at the proximal end, first and second distal apertures at the distal end, and first and second passages connecting the first and second proximal apertures with the first and second distal apertures and defining first and second interior surfaces of the outer core, the first and second passages spaced apart and extending parallel to each other; and
- a carrier assembly comprising a carrier and a first inner core, the first inner core coupled with the carrier, the carrier assembly further comprising a second inner core, the first inner core configured to be inserted into the first passage of the outer core and the second inner core configured to be inserted into the second passage of the outer core; the carrier having a clip mechanism that engages a corresponding recess on the outer core,
- wherein the first passage continuously tapers from the first proximal aperture to the first distal aperture and the second passage continuously tapers from the second proximal aperture to the second distal aperture;
- wherein the outer core has a connector providing a third passage through a top, bottom, or lateral surface of the outer core such that the third passage is in fluid communication with the first passage of the outer core;
- wherein the connector is positioned at a location other than a proximal and distal end of the outer core.

* * * * *

UNITED STATES PATENT AND TRADEMARK OFFICE
CERTIFICATE OF CORRECTION

PATENT NO. : 11,013,585 B2
APPLICATION NO. : 14/459130
DATED : May 25, 2021
INVENTOR(S) : Berkely et al.

It is certified that error appears in the above-identified patent and that said Letters Patent is hereby corrected as shown below:

On the Title Page

On Page 2, Column 1, Item (56), Line 59, under U.S. Patent Documents, delete "Rlitano" and insert Riitano--.

On Page 2, Column 1, Item (56), Line 62, under U.S. Patent Documents, delete "Bukowski" and insert --Bukowski et al.--.

In the Claims

In Column 46, Claim 7, Lines 17-18, delete "the first" and insert --the--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*